(12) United States Patent
Yoshikawa et al.

(10) Patent No.: US 10,225,560 B2
(45) Date of Patent: Mar. 5, 2019

(54) CODING METHOD FOR CODING MOVING IMAGE

(71) Applicant: Sovereign Peak Ventures, LLC, Plano, TX (US)

(72) Inventors: Satoshi Yoshikawa, Osaka (JP); Hisao Sasai, Osaka (JP)

(73) Assignee: Sovereign Peak Ventures, LLC, Plano, TX (US)

( * ) Notice: Subject to any disclaimer, the term of this patent is extended or adjusted under 35 U.S.C. 154(b) by 237 days.

(21) Appl. No.: 15/088,275

(22) Filed: Apr. 1, 2016

(65) Prior Publication Data

US 2016/0219281 A1 Jul. 28, 2016

Related U.S. Application Data

(63) Continuation of application No. PCT/JP2015/002977, filed on Jun. 15, 2015.
(Continued)

(30) Foreign Application Priority Data

May 13, 2015 (JP) .................................. 2015-098594

(51) Int. Cl.
*H04N 19/167* (2014.01)
*H04N 19/44* (2014.01)
(Continued)

(52) U.S. Cl.
CPC .......... *H04N 19/167* (2014.11); *H04N 19/23* (2014.11); *H04N 19/30* (2014.11); *H04N 19/44* (2014.11); *H04N 19/46* (2014.11); *H04N 19/537* (2014.11)

(58) Field of Classification Search
CPC ...... H04N 19/167; H04N 19/23; H04N 19/30; H04N 19/46; H04N 19/537; H04N 19/44
See application file for complete search history.

(56) References Cited

U.S. PATENT DOCUMENTS

| | | | |
|---|---|---|---|
| 7,536,706 B1 * | 5/2009 | Sezan | G06F 17/30817 725/112 |
| 2002/0109703 A1 * | 8/2002 | Okamura | G06T 17/005 345/619 |

(Continued)

FOREIGN PATENT DOCUMENTS

| | | |
|---|---|---|
| JP | 11-306364 | 11/1999 |
| JP | 2000-069442 | 3/2000 |

(Continued)

OTHER PUBLICATIONS

Extended European Search Report, dated Jun. 6, 2017, from the European Patent Office (EPO) for the corresponding European Patent Application No. 15824306.3.

(Continued)

*Primary Examiner* — Joseph Suh
(74) *Attorney, Agent, or Firm* — Ascenda Law Group, PC

(57) ABSTRACT

In a coding method, a background image is extracted from a target frame included in a moving image. A plurality of kinds of pieces of metadata, indicating a feature of at least one object included in the target frame, are extracted from the target frame. The plurality of kinds of pieces of metadata are hierarchically disposed in each kind, and coded information is generated. The coded information includes background image information, specifying the background image, and meta-information, indicating a part of or all the pieces of metadata corresponding to a hierarchy selected from the plurality of kinds of pieces of metadata.

14 Claims, 47 Drawing Sheets

Related U.S. Application Data

(60) Provisional application No. 62/027,584, filed on Jul. 22, 2014.

(51) Int. Cl.
*H04N 19/537* (2014.01)
*H04N 19/46* (2014.01)
*H04N 19/30* (2014.01)
*H04N 19/23* (2014.01)

(56) References Cited

U.S. PATENT DOCUMENTS

| | | | | |
|---|---|---|---|---|
| 2008/0120538 | A1* | 5/2008 | Kurz | G06F 17/30893 715/255 |
| 2010/0118025 | A1* | 5/2010 | Smith | G06Q 30/02 345/418 |
| 2011/0058609 | A1* | 3/2011 | Chaudhury | H04N 19/23 375/240.16 |
| 2013/0139080 | A1* | 5/2013 | Thies | G06F 3/048 715/764 |
| 2013/0346566 | A1* | 12/2013 | Kwon | H04N 21/4622 709/219 |
| 2014/0081921 | A1* | 3/2014 | Pichumani | G06F 17/30852 707/667 |
| 2014/0122729 | A1* | 5/2014 | Hon | H04L 67/04 709/228 |
| 2014/0130099 | A1* | 5/2014 | Kunisetty | H04N 21/4667 725/50 |
| 2014/0176708 | A1* | 6/2014 | Ramakrishnan | G06K 9/00771 348/143 |
| 2015/0227436 | A1* | 8/2015 | Wilson | G06F 11/1453 707/692 |
| 2015/0304554 | A1* | 10/2015 | Matsubara | H04N 5/23293 348/239 |
| 2016/0036882 | A1* | 2/2016 | Jin | H04L 65/602 709/231 |
| 2016/0231883 | A1* | 8/2016 | Zambetti | G06F 1/169 |

FOREIGN PATENT DOCUMENTS

| | | |
|---|---|---|
| JP | 2004-165768 | 6/2004 |
| JP | 2005-323021 | 11/2005 |

OTHER PUBLICATIONS

Olivier Steiger et al., "MPEG-7 Description of Generic Video Objects for Scene Reconstruction", Signal Processing Laboratory, Swiss Federal Institute of Technology, CH-1015 Lausanne, Switzerland; In Visual Communications and Image Processing (VCIP) 2002, Proceedings of SPIE, vol. 4671, pp. 947-958, San Jose, California, Jan. 21-23, 2002.

"Overview of the MPEG-4 Standard", MPEG-4 Overview—(V. 17—Pisa Version), International Organisation for Standardisation, ISO/IEC JTC1/SC29/WG11, Coding of Moving Pictures and Audio, N3931, pp. 1-67, Jan. 2001.

Y. Tomioka et al., "Overview of the MPEG-7 Standard", MPEG-7 Overview (Version 2.0), International Organisation for Standardisation, ISO/IEC JTC1/SC29/WG11, Coding of Moving Pictures and Audio, "MPEG-7 Overview V2.0", AN088, MPEG00/N3349, pp. 1-40, Mar. 2000, Noordwijkerhout (The Netherlands).

International Search Report of PCT application No. PCT/JP2015/002977 dated Aug. 11, 2015.

Benjamin Bross et al., "High Efficiency Video Coding (HEVC) text specification draft 10 (for FDIS & Last Call)", JCTVC-L1003_v34, Jan. 14-23, 2013.

* cited by examiner

FIG. 3
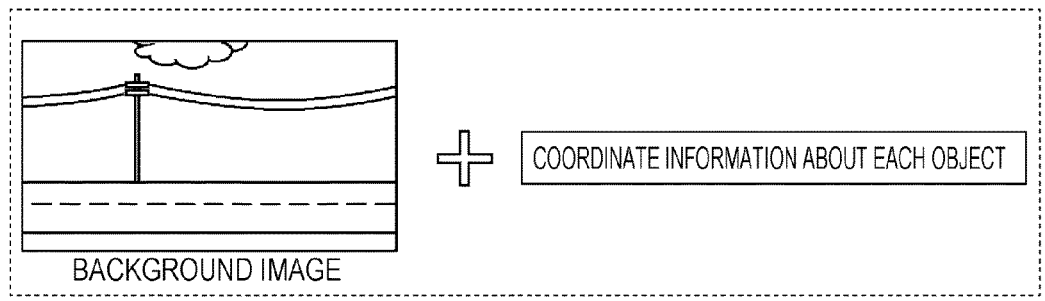
CODED INFORMATION / BACKGROUND IMAGE + COORDINATE INFORMATION ABOUT EACH OBJECT
DECODING
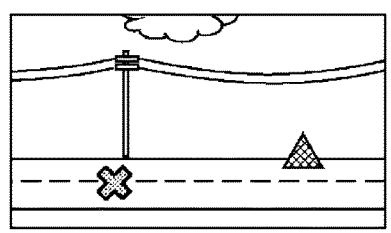
DECODED IMAGE FIG. 5
CODED INFORMATION
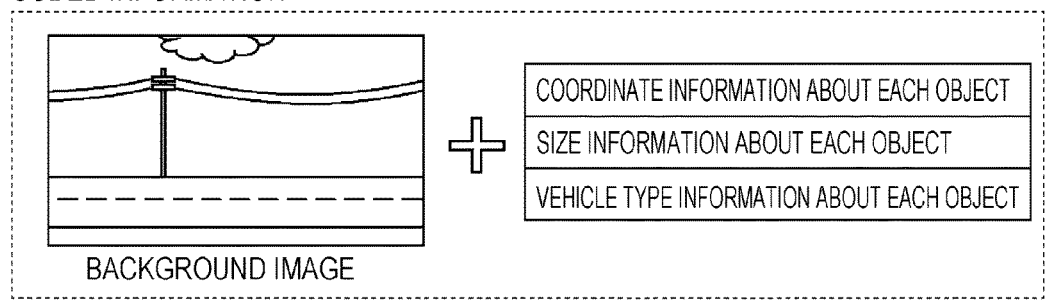
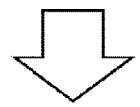
DECODING
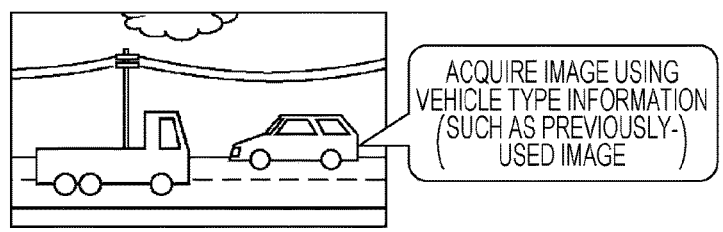

FIG. 6
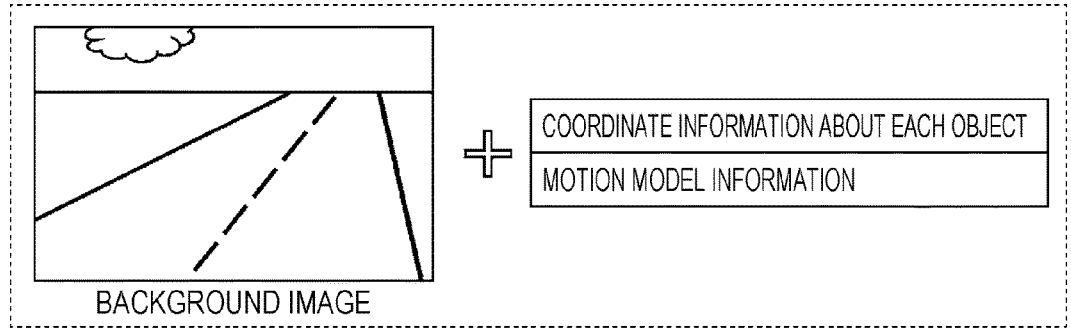
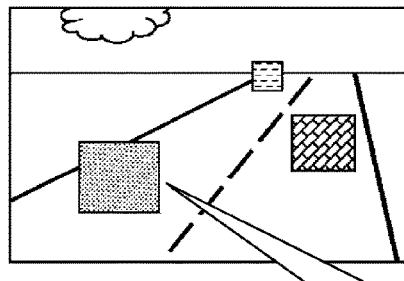

FIG. 7
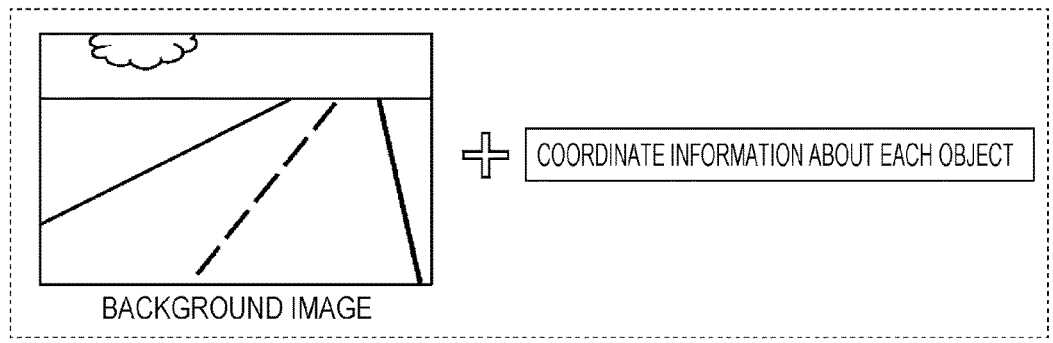
CODED INFORMATION
BACKGROUND IMAGE + COORDINATE INFORMATION ABOUT EACH OBJECT
DECODING
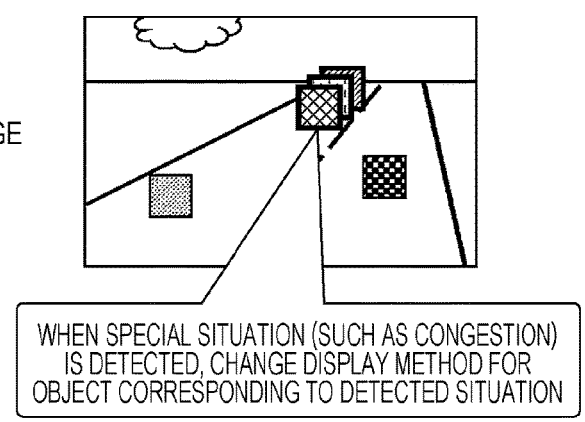
DECODED IMAGE
WHEN SPECIAL SITUATION (SUCH AS CONGESTION) IS DETECTED, CHANGE DISPLAY METHOD FOR OBJECT CORRESPONDING TO DETECTED SITUATION

FIG. 14

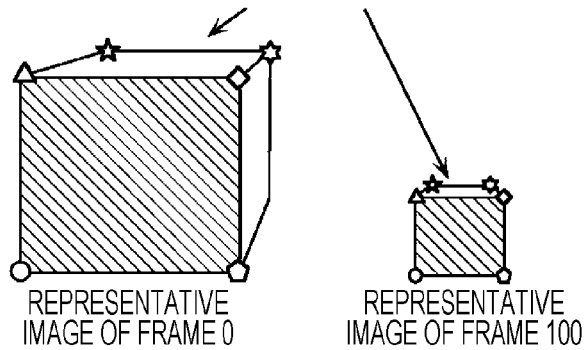

EXTRACT CORRESPONDING POINT
OF EACH REPRESENTATIVE IMAGE

REPRESENTATIVE
IMAGE OF FRAME 0

REPRESENTATIVE
IMAGE OF FRAME 100

USE RELATIONSHIP BETWEEN
CORRESPONDING POINTS
(COORDINATE INFORMATION AND SIZE
INFORMATION ARE ALSO USABLE)

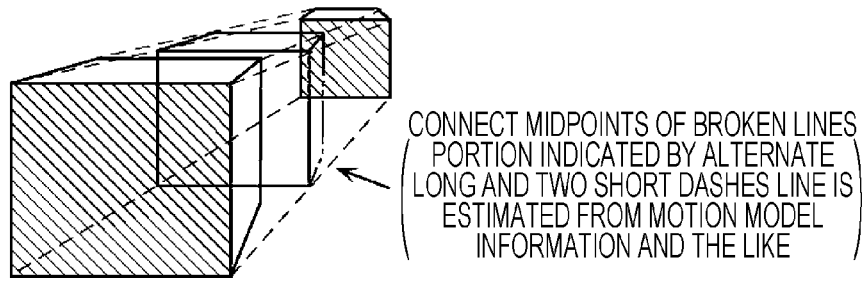

CONNECT MIDPOINTS OF BROKEN LINES
(PORTION INDICATED BY ALTERNATE
LONG AND TWO SHORT DASHES LINE IS
ESTIMATED FROM MOTION MODEL
INFORMATION AND THE LIKE)

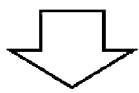

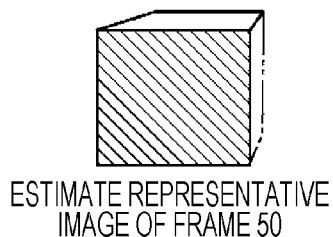

ESTIMATE REPRESENTATIVE
IMAGE OF FRAME 50

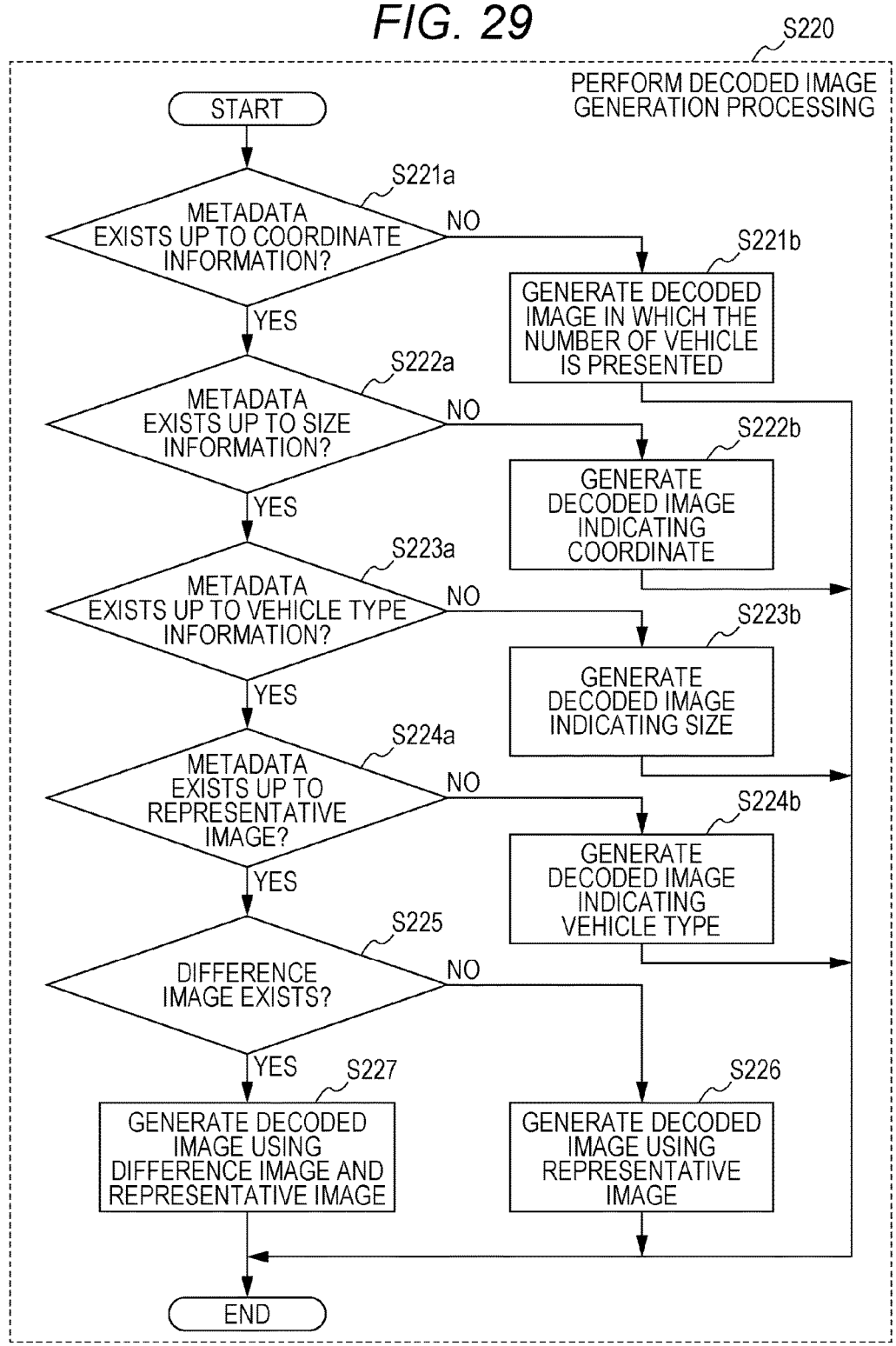

FIG. 38

| |
|---|
| VIDEO STREAM (PID = 0x1011 MAIN VIDEO) |
| AUDIO STREAM (PID = 0x1100) |
| AUDIO STREAM (PID = 0x1101) |
| PRESENTATION GRAPHICS STREAM (PID = 0x1200) |
| PRESENTATION GRAPHICS STREAM (PID = 0x1201) |
| INTERACTIVE GRAPHICS STREAM (PID = 0x1400) |
| VIDEO STREAM (PID = 0x1B00 SUB VIDEO) |
| VIDEO STREAM (PID = 0x1B01 SUB VIDEO) |

FIG. 49

| CONFORMING STANDARD | DRIVING FREQUENCY |
|---|---|
| MPEG4.AVC | 500MHz |
| MPEG2 | 350MHz |
| ⋮ | ⋮ |

CODING METHOD FOR CODING MOVING IMAGE

BACKGROUND

1. Technical Field

The present disclosure relates to a method and an apparatus for coding a moving image and decoding the coded moving image.

2. Description of the Related Art

In order to improve the coding efficiency, various studies have been made on an HEVC (High Efficiency Video Coding) standard which is the latest video coding standard (see, for example, NPL 1). The standard is one of ITU-T (International Telecommunication Union Telecommunication Standardization Sector) standards called H.26x and one of ISO/IEC standards called MPEG-x, and has been studied as a successor to the video coding standard called H.264/AVC or MPEG-4 AVC.

A remote picture can be acquired with the progress of a network technology or a video compression technology.

CITATION LIST

Non-Patent Literature

NPL 1: Joint Collaborative Team on Video Coding (JCT-VC) of ITU-T SG 16 WP 3 and ISO/IEC JTC 1/SC 29/WG 11 12th Meeting: Geneva, CH, 14-23 Jan. 2013, JCTVC-L1003_v34 "High Efficiency Video Coding (HEVC) text specification draft 10 (for FDIS & Last Call)"

However, in the coding method and decoding method of NPL 1, there is a problem in that there is a large amount of data of decoding target information generated by coding.

SUMMARY

One non-limiting and exemplary embodiment provides a coding method and a decoding method that are capable of decreasing the data amount of the decoding target information generated by the decoding.

In one general aspect, the techniques disclosed here feature a coding method for coding a moving image in each frame, the coding method including: extracting a background image from a target frame included in the moving image; extracting a plurality of kinds of pieces of metadata indicating a feature of at least one object included in the target frame from the target frame; disposing hierarchically the plurality of kinds of pieces of metadata in each kind; and generating coded information including background image information specifying the background image, and meta-information indicating a part of or all the pieces of metadata corresponding to a hierarchy selected from the plurality of kinds of pieces of metadata.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

It should be noted that general or specific embodiments may be implemented as a system, a method, an integrated circuit, a computer program, a storage medium, or any selective combination thereof.

BRIEF DESCRIPTION OF THE DRAWINGS

FIG. 3 is a view illustrating another example of the input image, the coded information, and the decoded image of the first exemplary embodiment;

FIG. 5 is a view illustrating yet another example of the input image, the coded information, and the decoded image of the first exemplary embodiment;

FIG. 6 is a view illustrating yet another example of the input image, the coded information, and the decoded image of the first exemplary embodiment;

FIG. 7 is a view illustrating yet another example of the input image, the coded information, and the decoded image of the first exemplary embodiment;

FIG. 14 is a view illustrating a specific example of metadata estimation processing of the first exemplary embodiment;

FIG. 29 is a detailed flowchart illustrating decoded image generation processing of the second exemplary embodiment;

FIG. 38 is a diagram illustrating a structure of multiplexed data;

FIG. 49 is a diagram illustrating an example of a lookup table in which a video data standard and a driving frequency are associated with each other;

Figure 1:
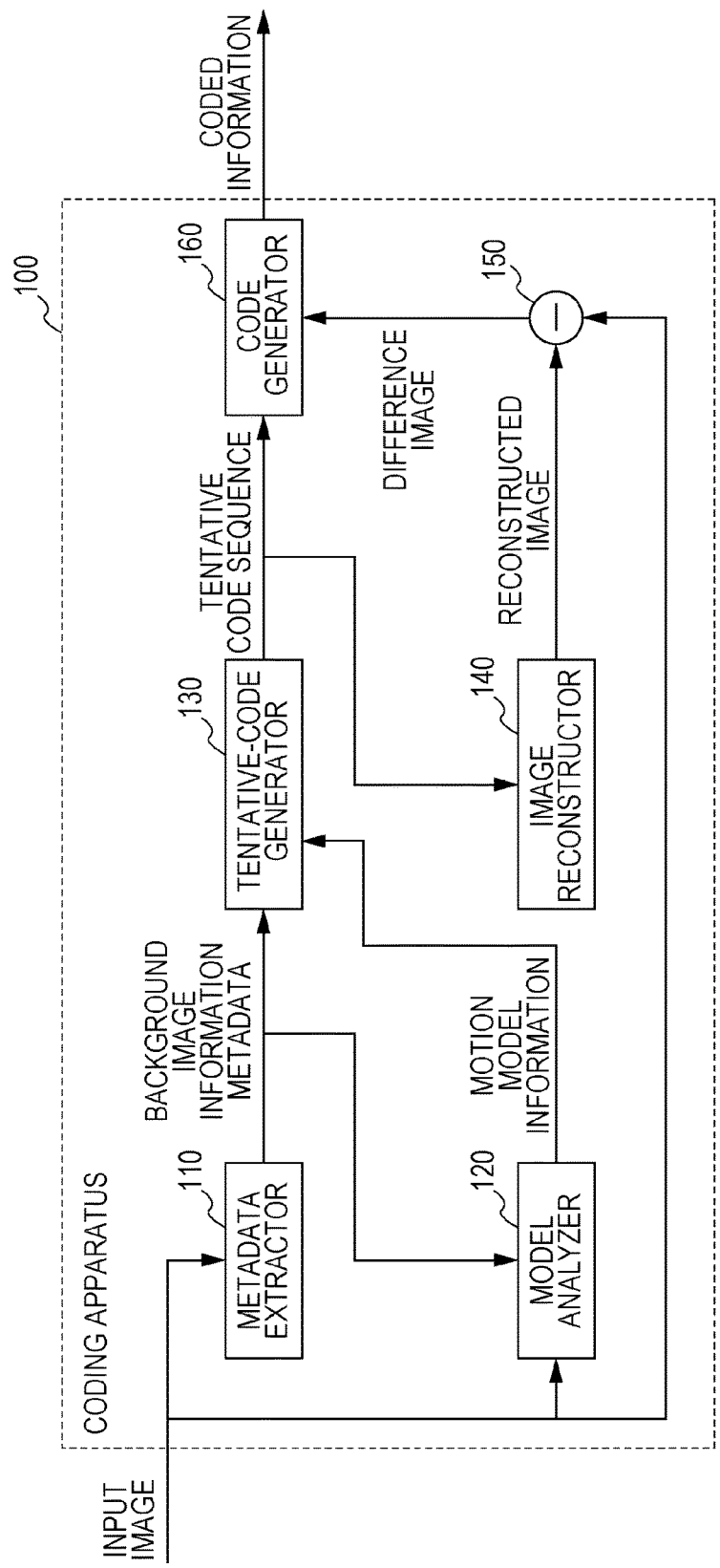
FIG. 1 is a block diagram illustrating a configuration of a coding apparatus according to a first exemplary embodiment.

DESCRIPTION OF EMBODIMENTS (Underlying Knowledge of the Present Disclosure)

The inventor found that the following problems are generated in the coding method and decoding method of NPL 1 described in "2. Description of the Related Art".

For example, it is assumed that the method of NPL 1 is adopted to a system transmitting and receiving the moving image. That is, a transmission apparatus transmits the moving image coded by the coding method of NPL 1 to a remote reception apparatus. The reception apparatus decodes the coded moving image by the decoding method of NPL 1. In this case, the transmission apparatus is the coding apparatus and the reception apparatus is the decoding apparatus.

New information obtained by picture analysis using a computer vision can be utilized in the reception apparatus. Specifically, examples of the new information include information indicating a congestion degree obtained by analyzing a picture (moving image) of a monitoring camera in a downtown, information indicating who exists in a site captured with a monitoring camera, and information indicating where people gather around.

A reception apparatus has a picture analyzing function in the system in which the monitoring camera is used. Accordingly, the transmission apparatus transmits a bit stream, which is obtained by performing video compression on the picture of the monitoring camera, to the reception apparatus. The reception apparatus decodes the bit stream, and analyzes the moving image obtained by the decoding. For example, the video analysis is face recognition processing or attitude recognition processing. The video analysis includes many applications of the system, and corresponds to a market of the system.

Depending on a communication environment between the transmission apparatus and the reception apparatus, there is a phenomenon in which the moving image is not transmitted to reception apparatus or a phenomenon in which image quality degrades in the video compression. In such cases, the event may have an influence on the video analysis in the reception apparatus. The bit stream in which a data amount is more than information required by the reception apparatus is transmitted. For example, even if the reception apparatus requires only the information indicating the congestion degree, the bit stream having a large amount of data including another piece of information is transmitted from the transmission apparatus to the reception apparatus.

It is also assumed that, in a system, the transmission apparatus transmits only information obtained by a sensor or information obtained by performing the picture analysis to the reception apparatus. For example, for the fixed information required from the reception apparatus, the transmission apparatus performs the picture analysis, and only the required information obtained by a result of the picture analysis is transmitted to the reception apparatus. Therefore, the reception apparatus needs not to analyze the moving image, but the data amount of the information transmitted to the reception apparatus can be decreased. In this case, although the data amount can largely be decreased, it becomes difficult for the reception apparatus to reconstruct the picture because of a small amount of data. Additionally, it is necessary for the transmission apparatus to acquire the information required by each reception apparatus using the picture analysis, and a load on processing increases.

The data amount of the transmitted information increases in the conventional system that transmits and receives the information about the moving image. That is, the data amount of the decoding target information generated by the coding increases in the case where the coding and decoding are associated with the transmission and reception of the information. When the data amount is suppressed, the picture analysis is required in response to a request of each reception apparatus, which leads to a problem in that the load on the processing increases on the transmission apparatus side.

In order to solve the problems, one aspect of the present disclosure provides a coding method for coding a moving image in each frame, the coding method including: extracting a background image from a target frame included in the moving image; extracting a plurality of kinds of pieces of metadata indicating a feature of at least one object included in the target frame from the target frame; disposing hierarchically the plurality of kinds of pieces of metadata in each kind; and generating coded information including background image information specifying the background image, and meta-information indicating a part of or all the pieces of metadata corresponding to a hierarchy selected from the plurality of kinds of pieces of metadata. For example, the kind of the metadata belonging to a first hierarchy is a coordinate of the object in the target frame. For example, the kind of the metadata belonging to a second hierarchy is a size of the object in the target frame. For example, the kind of the metadata belonging to a third hierarchy is a classification name of a subject that is projected as the object in the target frame. Each of the coordinate, size, and classification name is the kind of the metadata indicating the feature of the object. The coordinate of the object in the target frame is expressed by the metadata of the coordinate, and the size of the object located in the coordinate is expressed by the metadata of the size. A form of the object, which is located in the coordinate indicated by the metadata of the coordinate and adjusted to the size indicated by the metadata of the size, is expressed by the metadata of the classification name such as a vehicle type.

The generated coded information includes the background image information and the meta-information indicating the part of or all the pieces of metadata corresponding to the hierarchy selected from the plurality of kinds of pieces of metadata. Accordingly, when receiving the coded information, the decoding apparatus which is the reception apparatus specifies the background image using the background image information included in the coded information, and derives at least one kind of metadata using the meta-information. The decoding apparatus superimposes the object expressed by at least one kind of metadata on the specified background image. For example, the object is abstractly expressed such that the object is expressed as a point based on coordinate information, such that the object is expressed as a rectangle based on the coordinate information and the size, such that the object is expressed as a fitting image based on the coordinate information, the size, and a representative image. The object is superimposed on the specified background image while an abstraction level which is a degree of an abstract expression is changed in each hierarchy. The object is superimposed on at least one object. Therefore, the decoded image close to the target frame can be generated, and the data amount of the coded information can be suppressed.

The plurality of kinds of pieces of metadata are hierarchically disposed in each kind. That is, the pieces of metadata corresponding to the kind of at least one object are collectively disposed in each kind of metadata. For example, the pieces of metadata corresponding to the coordinate of at least one object are collectively disposed, and the pieces of metadata corresponding to the size of at least one object are collectively disposed. Also, the pieces of metadata corresponding to the classification name of the subject of at least one object are collectively disposed.

From among the plurality of kinds of pieces of metadata, only the metadata, which is required by the decoding apparatus which is the reception apparatus, up to the hierarchy corresponding to a level at which the object is specifically expressed can easily be transmitted. For example, when the kind belonging to the hierarchy corresponding to the level required by the decoding apparatus is the coordinate, only the pieces of metadata corresponding to the coordinate of at least one object can collectively and easily be transmitted. Therefore, in the decoding apparatus, only the coordinate of the object can generate the decoded image expressed in the background image. For example, when the kind belonging to the hierarchy corresponding to the level required by the decoding apparatus is the size, only the pieces of metadata corresponding to the coordinate and size of at least one object can collectively and easily be transmitted. Therefore, in the decoding apparatus, only the coordinate and size of the object can generate the decoded image expressed in the background image. Accordingly, the picture analysis needs to be performed in response to the request of each decoding apparatus (reception apparatus), but the load on the processing can be reduced. Because all the plurality of kinds of pieces of metadata need not to be transmitted according to the level required by the decoding apparatus, the data amount of the transmitted information can further be suppressed.

The plurality of kinds of pieces of metadata may further include a total number of the objects included in the target frame.

The coding method may further include estimating estimation target metadata using one of a plurality of estimation techniques, the estimation target metadata being one of the plurality of kinds of pieces of extracted metadata. At this point, in generating the coded information, the coded information including information about the estimation technique used to estimate the estimation target metadata as the meta-information is generated. For example, in estimating the estimation target metadata, a coordinate of the estimation target metadata is estimated by performing interpolation or extrapolation on a coordinate of the identical object in at least a reference frame included in the moving image. For example, in estimating the estimation target metadata, motion model information indicating changes in spatial position and size of the object in the moving image is generated, and the coordinate of the estimation target metadata and the size of another kind of metadata in the plurality of kinds of pieces of metadata are estimated based on the interpolation or extrapolation and the motion model information.

In the coded information, because the information about the estimation technique is included as the meta-information, the data amount of the information about the estimation technique can be decreased compared with the metadata, and therefore the data amount of the coded information can further be suppressed.

The coding method may further include determining whether a residual between estimated metadata obtained by estimating the estimation target metadata and the estimation target metadata is less than or equal to a predetermined threshold. At this point, a correction parameter compensating for the residual is included in the coded information when the residual is greater than the predetermined threshold.

Because the correction parameter is included in the coded information, the estimated metadata can be corrected so as to be brought close to the estimation target metadata even for the large residual between the estimated metadata and the estimation target metadata.

The coding method may further include: generating a reconstructed image by reconstructing the target frame based on the background image information and the meta-information; and including, in the coded information, a difference image indicating a difference between the target frame and the reconstructed image. For example, in generating the reconstructed image, the coordinate of the object is specified using the metadata belonging to the first hierarchy, the size of the object is specified using the metadata belonging to the second hierarchy, an associated image associated with the classification name of the subject is specified using the metadata belonging to the third hierarchy, the background image is specified using the background image information, and the reconstructed image is generated by superimposing the specified associated image having the specified size on the specified coordinate in the specified background image.

Because the difference image is included in the coded information, the decoded image close to the target frame can be obtained using the reconstructed image and the difference image even for the large difference between the reconstructed image and the target frame.

In generating the reconstructed image, the associated image may be acquired from a server through a network.

Therefore, the associated image indicating the form of the vehicle, which is associated with the classification name such as the vehicle type, can easily be acquired, and the reconstructed image can properly be generated.

Another aspect of the present disclosure provides a decoding method for decoding a coded moving image in each piece of coded information corresponding to a frame, the decoding method including: specifying a background image of a target frame from background image information included in the coded information; deriving at least one kind of metadata from meta-information included in the coded information, the metadata indicating a feature of one object included in the target frame and being hierarchically disposed in each kind; and generating decoded image by superimposing the one object expressed by the at least one kind of metadata on the specified background image, wherein the metadata indicates the feature of the object with respect to at least the one object included in the target frame. For example, the kind belonging to a first hierarchy in the coded information is a coordinate of the object in the target frame. For example, the kind belonging to a second hierarchy in the coded information is a size of the object in the target frame. For example, the kind belonging to a third hierarchy in the coded information is a classification name of a subject that is projected as the object in the target frame.

Therefore, the coded information in which the data amount is suppressed, namely, what is called scalability is ensured can properly be decoded according to the level required for the decoded image.

The decoded image may be generated by superimposing the object having a different abstraction level in each hierarchy of the metadata on the background image.

The meta-information may further include a total number of the objects included in the target frame.

In deriving the at least one kind of metadata, the metadata may be derived by estimating the metadata using information about an estimation technique, the information being included as the meta-information. For example, in estimating the metadata, a coordinate of the metadata is estimated by performing interpolation or extrapolation on a coordinate of the identical object in at least a reference frame included in the coded moving image. More specifically, in estimating the metadata, motion model information indicating changes in spatial position and size of the object in the coded moving image is extracted from the coded information, and the coordinate of the metadata and the size of another kind of metadata in the at least one kind of metadata are estimated based on the interpolation or extrapolation and the motion model information.

Therefore, the coded information in which the data amount is further decreased can properly be decoded.

In deriving the at least one kind of metadata, whether a correction parameter exists in the coded information may be determined, and the metadata may be derived by correcting the estimated metadata obtained by estimating the metadata based on the correction parameter when the correction parameter exists in the coded information.

Therefore, the metadata can correctly be derived.

The decoding method may further include determining whether a difference image exists in the coded information. At this point, in generating the decoded image, a reconstructed image is generated by superimposing the at least one object on the background image, and the decoded image is generated by adding the difference image to the reconstructed image. For example, in generating the reconstructed image, the coordinate of the object is specified using the metadata belonging to the first hierarchy, the size of the object is specified using the metadata belonging to the second hierarchy, an associated image associated with the classification name of the subject is specified using the metadata belonging to the third hierarchy, the background image is specified using the background image information, and the reconstructed image is generated by superimposing the specified associated image having the specified size on the specified coordinate in the specified background image.

Therefore, the decoded image can be brought closer to the original image.

In generating the reconstructed image, the associated image may be acquired from a server through a network.

Therefore, the associated image indicating the form of the vehicle, which is associated with the classification name such as the vehicle type, can easily be acquired, and the reconstructed image can properly be generated.

These comprehensive or specific aspects may be implemented using a system, a method, an integrated circuit, a computer program, or a computer-readable recording medium such as a CD-ROM, or using any given combination of a system, a method, an integrated circuit, a computer program, and a computer-readable recording medium.

Hereinafter, exemplary embodiments will specifically be described with reference to the drawings.

Note that each of exemplary embodiments below describes a comprehensive or specific example of the present disclosure. Numerical values, shapes, materials, elements, arranged positions and connection forms of the elements, steps, the order of the steps, and the like described in the following exemplary embodiments are merely examples, and do not limit the present disclosure. Also, among elements described in the following exemplary embodiments, elements that are not included in an independent claim which represents the highest concept are described as optional elements.

First Exemplary Embodiment

FIG. 1 is a block diagram illustrating a configuration of a coding apparatus according to the present exemplary embodiment.

Coding apparatus 100 generates coded information by coding each input image, such as a picture or a frame, included in a moving image. Coding apparatus 100 includes metadata extractor 110, model analyzer 120, tentative-code generator 130, image reconstructor 140, subtractor 150, and code generator 160.

Metadata extractor 110 extracts a background image from the input image. Metadata extractor 110 outputs background image information in order to specify the background image. Metadata extractor 110 extracts a plurality of kinds of pieces of metadata indicating a feature of each of objects in each input image from the input image. Metadata extractor 110 outputs the pieces of metadata. Metadata extractor 110 also outputs the number of objects included in the input image as the metadata.

Model analyzer 120 analyzes a motion model of the object in the moving image based on at least one of the plurality of kinds of pieces of metadata of the object included in each of a series of input images and the background image specified by the background image information. Model analyzer 120 outputs motion model information indicating an analysis result to tentative-code generator 130.

Tentative-code generator 130 generates and outputs a tentative code sequence based on the plurality of kinds of pieces of metadata of each of the objects included in the input image, the background image information, and the motion model information about each object.

Image reconstructor 140 generates a reconstructed image based on the tentative code sequence.

Subtractor 150 generates a difference image by subtracting the reconstructed image from the input image.

Code generator 160 generates and outputs coded information based on the tentative code sequence and the difference image.

An outline of processing performed by coding apparatus 100 will be described with reference to FIGS. 2 to 7.

Coding apparatus 100 codes the moving image obtained by the capturing with a camera installed on, for example, a road. At this point, coding apparatus 100 generates the coded information by coding the moving image in each input image included in the moving image. More specifically, the moving image is a picture acquired from a fixed camera capturing a road such as an expressway. In this case, the object is an image of a vehicle which is a subject. For example, the plurality of kinds of pieces of metadata of the object include coordinate information indicating the coordinate of the vehicle in the input image, size information indicating the size of the vehicle in the input image, and a representative image of the vehicle. The metadata is not limited to the pieces of information about the above kinds. The representative image means an image used to express the object such as the vehicle. The representative image may be an image of a subject acquired with a camera, or an image of a subject retained in an external server. The representative image may be an image drawn by a predetermined method.

Figure 2:
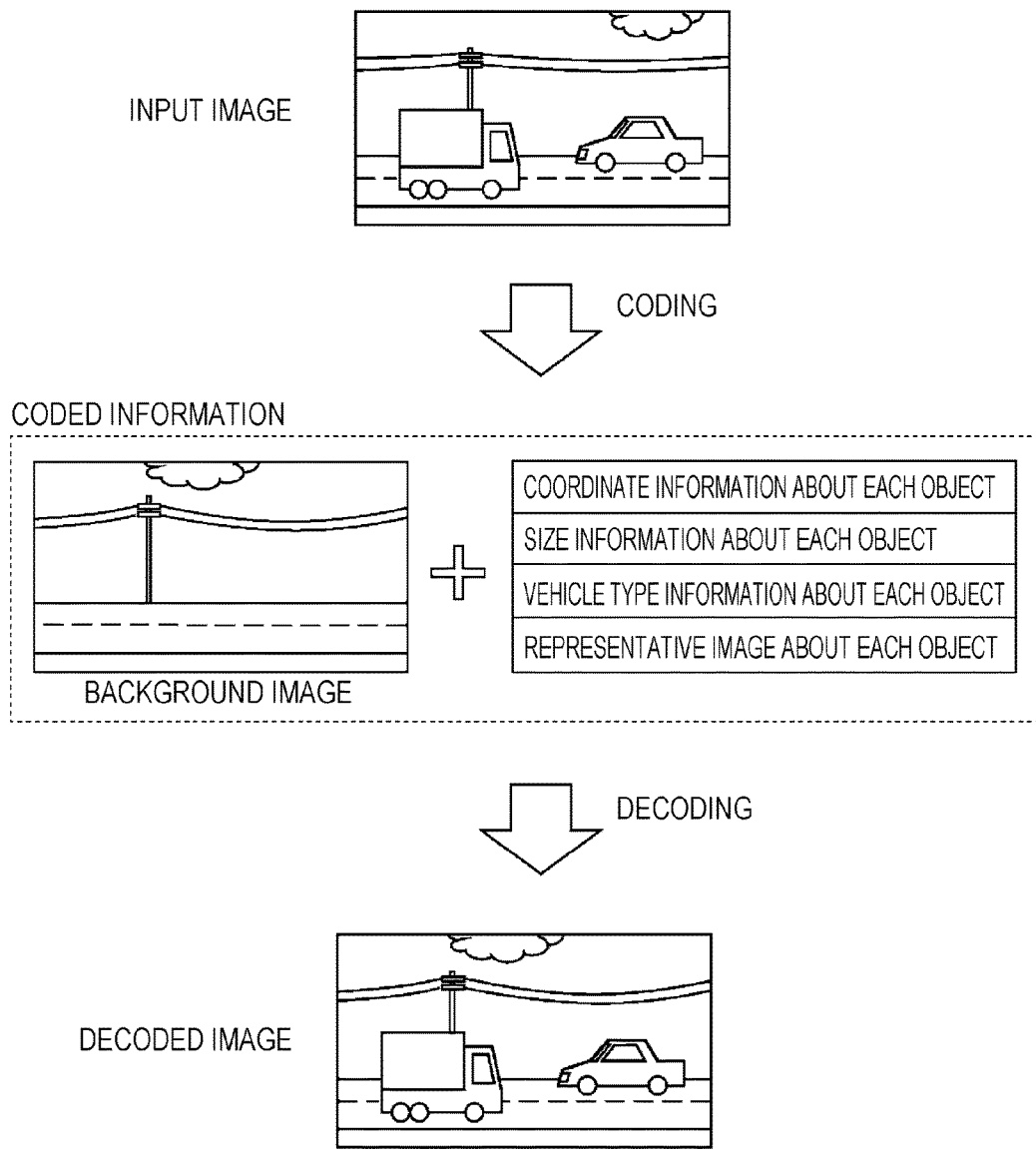
FIG. 2 is a view illustrating an example of an input image, coded information, and a decoded image of the first exemplary embodiment.

FIG. 2 is a view illustrating an example of an input image, coded information, and a decoded image.

The coded information indicates the background image of the input image and the metadata of each object. For example, as illustrated in FIG. 2, a background including the road on which the vehicle runs is projected on the background image. For example, each object included in the input image is the vehicle (specifically, the image of the vehicle which is the subject). More specifically, the plurality of kinds of pieces of metadata of each object include the coordinate information about the vehicle, the size information about the vehicle, the vehicle type information about the vehicle, and the representative image about the vehicle. The coordinate information about the vehicle indicates the coordinate of the vehicle in the input image. The size information about the vehicle indicates the size of the vehicle. The vehicle type information about the vehicle indicates the vehicle type which is the classification name of the vehicle. The representative image about the vehicle is the vehicle representative image.

In decoding the coded information, the object is expressed as the image based on the plurality of kinds of pieces of metadata of the object, and the object is superimposed on the background image, thereby generating the decoded image.

FIG. 3 is a view illustrating another example of the input image, the coded information, and the decoded image.

Coding apparatus 100 may transmit, to the decoding apparatus, the coded information indicating only the coordinate information from among the plurality of kinds of pieces of metadata of each object indicated by the coded information in FIG. 2.

In decoding the coded information, the object is expressed as the image based on the coordinate information about the object, and the object is superimposed on the background image, thereby generating the decoded image. At this point, the coded information does not indicate the size information, the vehicle type information, and the representative image. Accordingly, the decoding apparatus generates the decoded image in which a cross or a triangular mark is projected in the coordinate indicated by the coordinate information about the object.

Figure 4:
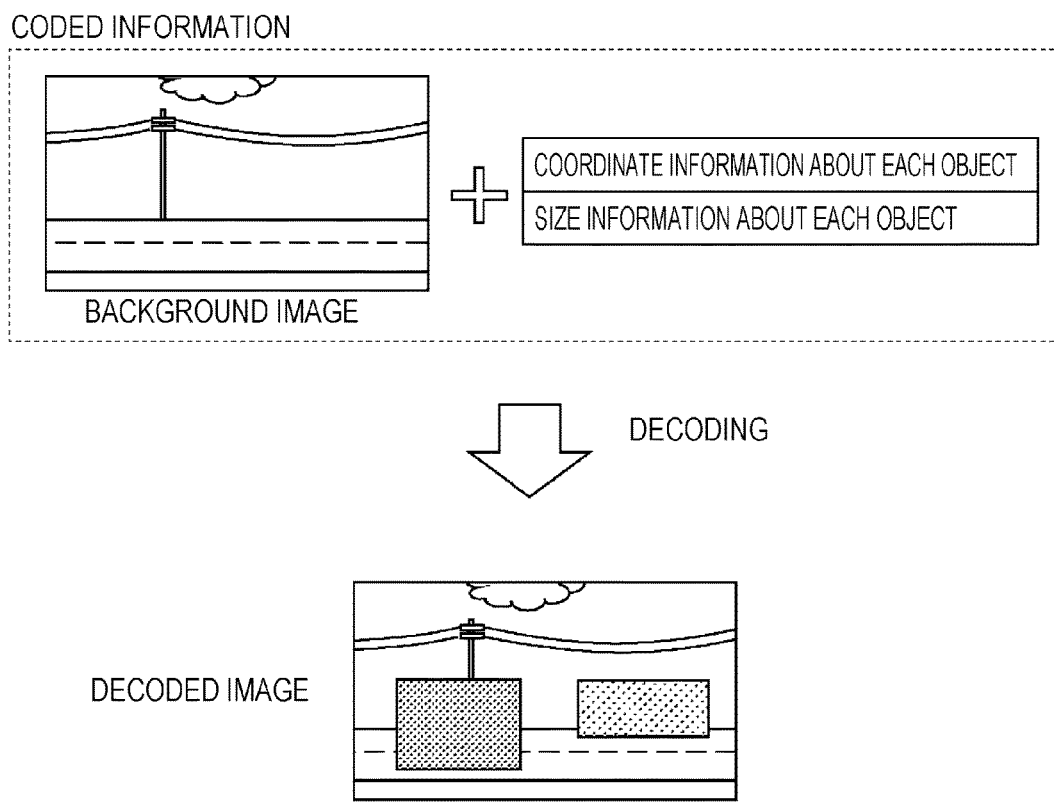
FIG. 4 is a view illustrating still another example of the input image, the coded information, and the decoded image of the first exemplary embodiment.

FIG. 4 is a view illustrating still another example of the input image, the coded information, and the decoded image.

Coding apparatus 100 may transmit, to the decoding apparatus, the coded information indicating only the coordinate information and size information from among the plurality of kinds of pieces of metadata of each object indicated by the coded information in FIG. 2.

In decoding the coded information, the object is expressed as the image based on the coordinate information and size information about the object, and the object is superimposed on the background image, thereby generating the decoded image. At this point, the coded information does not indicate the vehicle type information and the representative image. Accordingly, the decoding apparatus generates the decoded image in which the rectangular image having the size indicated by the size information is projected in the coordinate indicated by the coordinate information about the object.

FIG. 5 is a view illustrating yet another example of the input image, the coded information, and the decoded image.

Coding apparatus 100 may transmit, to the decoding apparatus, the coded information indicating only the coordinate information, size information, and vehicle type information from among the plurality of kinds of pieces of metadata of each object indicated by the coded information in FIG. 2.

In decoding the coded information, the object is expressed as the image based on the coordinate information, size information, and vehicle type information about the object, and the object is superimposed on the background image, thereby generating the decoded image. At this point, the coded information does not indicate the representative image. Accordingly, the decoding apparatus generates the decoded image in which the image of the vehicle type indicated by the vehicle type information is projected in the coordinate indicated by the coordinate information about the object. The image of the vehicle type is an associated image that is associated with the vehicle type indicated by the vehicle type information to indicate a general form of the vehicle type. In generating the decoded image, the associated image is adjusted to the size indicated by the size information.

FIG. 6 is a view illustrating yet another example of the input image, the coded information, and the decoded image.

Coding apparatus 100 may transmit, to the decoding apparatus, the coded information indicating only the coordinate information from among the plurality of kinds of pieces of metadata of each object indicated by the coded information in FIG. 2. At this point, coding apparatus 100 may includes the motion model information in the coded information.

In decoding the coded information, the object is expressed as the image based on the coordinate information and motion model information about the object, and the object is superimposed on the background image, thereby generating the decoded image. That is, the decoding apparatus generates the decoded image in which the rectangular image having the size corresponding to the motion model information is projected in the coordinate indicated by the coordinate information about the object.

FIG. 7 is a view illustrating yet another example of the input image, the coded information, and the decoded image.

Coding apparatus 100 may transmit, to the decoding apparatus, the coded information indicating only the coordinate information from among the plurality of kinds of pieces of metadata of each object indicated by the coded information in FIG. 2.

In decoding the coded information, the object is generated as the image based on the coordinate information about the object, and the object is superimposed on the background image, thereby generating the decoded image. That is, the decoding apparatus generates the decoded image in which the rectangular image having the predetermined size is projected in the coordinate indicated by the coordinate information about the object. At this point, when detecting a special situation (such as congestion), the decoding apparatus may change a method for displaying the rectangular image of the object corresponding to the situation.

As illustrated in FIGS. 2 to 7, in the present exemplary embodiment, the coded information includes the background image information specifying the background image, and the meta-information indicating the part of or all the pieces of metadata corresponding to a hierarchy selected from the plurality of kinds of pieces of extracted metadata.

Figure 8:
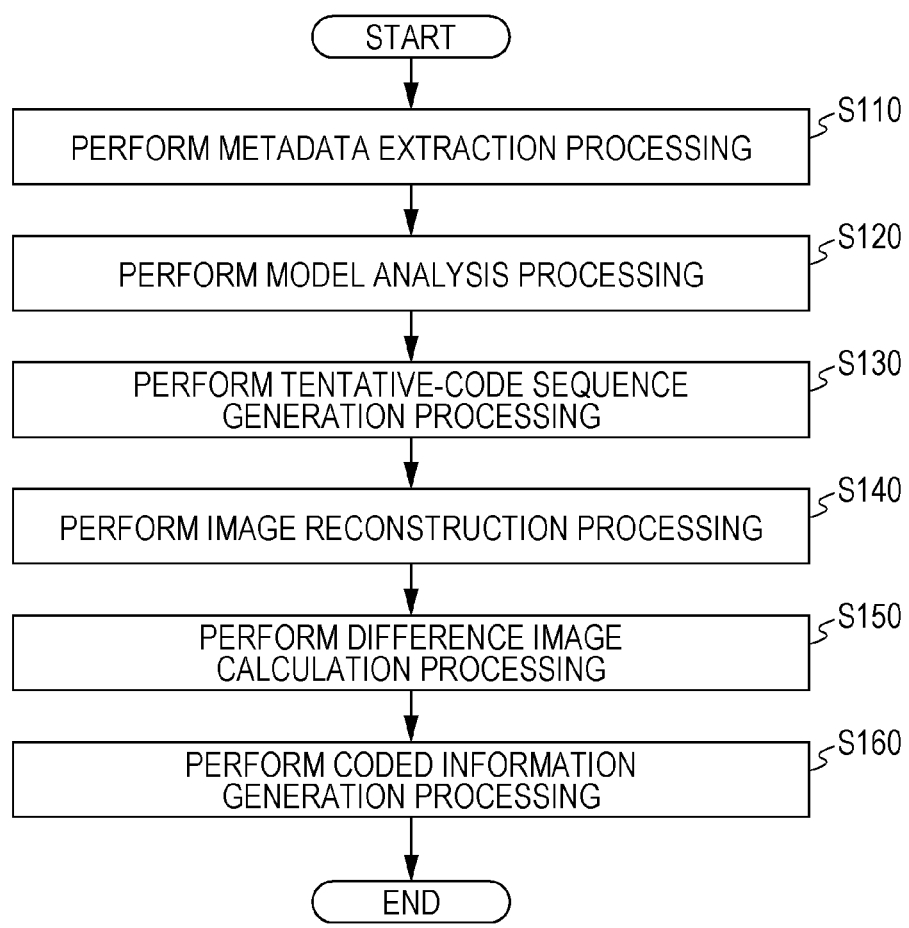
FIG. 8 is a flowchart illustrating a whole processing operation of the coding apparatus of the first exemplary embodiment.

FIG. 8 is a flowchart illustrating a whole processing operation of coding apparatus 100.

Metadata extractor 110 of coding apparatus 100 performs metadata extraction processing (step S110). That is, metadata extractor 110 extracts the background image from the input image, and extracts the plurality of kinds of pieces of metadata of each object included in the input image. In extracting the metadata, metadata extractor 110 extracts the objects included in the input image using template matching, an HOG (Histogram of Oriented Gradients) feature amount, SIFT (Scale-Invariant Feature Transform), or the like. Metadata extractor 110 extracts the information about the coordinate or size of each object in the input image as the metadata.

Model analyzer 120 performs model analysis processing using the metadata obtained in step S110 and the input image (step S120). That is, model analyzer 120 generates the motion model information indicating motion or the like of the object in the moving image. Then, tentative-code generator 130 performs tentative-code sequence generation processing of generating the tentative code sequence necessary for the reconstruction of the input image from the metadata obtained in step S110 and the motion model information obtained in step S120 (step S130). Then, image reconstructor 140 performs image reconstruction processing of reconstructing the input image using the tentative code sequence generated in step S130 (step S140). Then, subtractor 150 performs difference image calculation processing of generating the difference image by subtracting the reconstructed image generated in step S140 from the input image (step S150). Then, code generator 160 performs coded information generation processing of generating the coded information from the tentative code sequence generated in step S130 and the difference image acquired in step S150 (step S160).

Coding apparatus 100 repeatedly performs the series of the pieces of processing on each of the input images included in the moving image.

The metadata extraction processing in step S110 may be performed on all the input images included in the moving image. After the metadata extraction processing is performed on one input image, the metadata extraction processing may intermittently be performed so as to be repeatedly skipped for a predetermined number of input images. The metadata extraction processing may be performed on the input image according to the content of the input image. In the case where the metadata extraction processing is performed on all the input images, the correct metadata can be acquired for each of all the input images, and the quality of the image reconstructed using the generated tentative code sequence can be improved. In the case where the metadata extraction processing is intermittently performed as described above, the number of times that metadata extraction processing is performed can largely be decreased, and the processing amount of coding apparatus 100 can largely be decreased. In the case where the metadata extraction processing is performed according to the content of the input image, a trade-off between the decrease in processing amount and the improvement of the image quality can properly be achieved. That is, while the number of times that metadata extraction processing is performed is decreased, the quality of the image reconstructed using the generated tentative code sequence can be improved.

In the metadata extraction processing, metadata extractor 110 may use information or the like acquired by a sensor external to coding apparatus 100. For example, the transmission apparatus configured to transmit information indicating a position, speed, or the like is mounted on the vehicle, and the reception apparatus on the road receives the information. In this case, metadata extractor 110 may use the information received by the reception apparatus. Metadata extractor 110 may analyze input information obtained with a millimeter-wave radar except a picture sensor, and use the metadata obtained based on the analysis. Metadata extractor 110 may perform the analysis using the input images obtained with a plurality of cameras. This allows for acquisition of the metadata which cannot be extracted from the input image obtained with one camera (imaging apparatus), for example, the metadata of the vehicle that is not captured because the vehicle is hidden behind the large vehicle in one input image.

Figure 9:
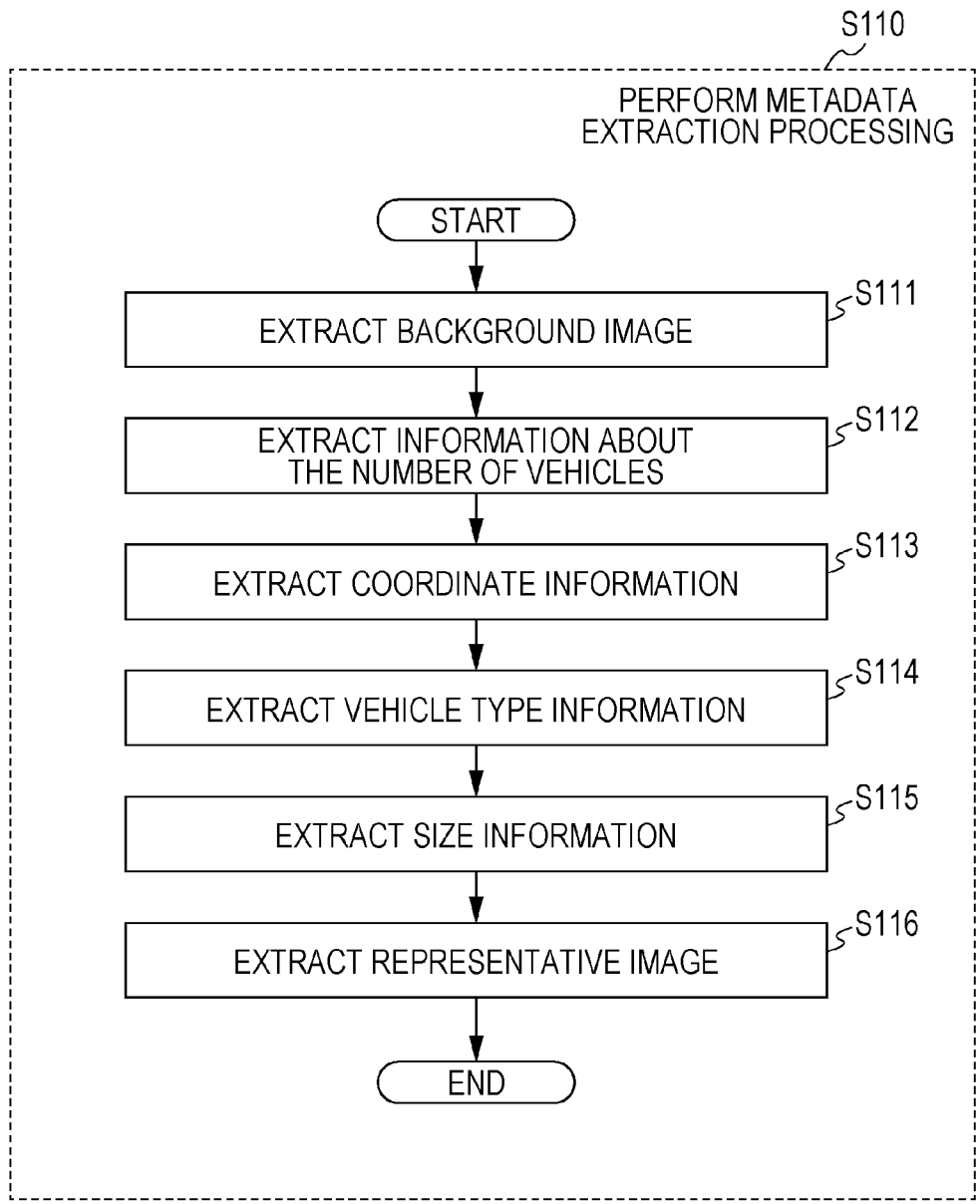
FIG. 9 is a detailed flowchart illustrating an example of metadata extraction processing of the first exemplary embodiment.

FIG. 9 is a detailed flowchart illustrating the metadata extraction processing in step S110.

Metadata extractor 110 extracts the background image from the input image (step S111). At this point, metadata extractor 110 extracts the input image in which the object does not exist, as the background image, from the input images included in the moving image.

Metadata extractor 110 may calculate an average value, a median, or the like of pixel values of the identical coordinate in the plurality of input images (for example, a plurality of frames). In this case, metadata extractor 110 extracts an average image, a median image, or the like, which is obtained by the calculation, as the background image. Therefore, even in a case of a moving image in which an object exists in any input image, the background image can be generated from the moving image. Metadata extractor 110 may divide the input image into some small areas, determine whether the object exists in each small area, and extract only the small area where the object does not exist. In this case, metadata extractor 110 generates the background image by arraying a plurality of small areas extracted from each of the plurality of frames. Therefore, even in the case of the moving image in which the object exists in any input image, the background image can be generated from the moving image.

Then, metadata extractor 110 extracts information about a number of vehicles indicating the number of vehicles (such as a passenger car or a track), which are the object included in the input image, as the metadata from the input image (step S112). Then, metadata extractor 110 extracts the coordinate information indicating a center coordinate of the object (step S113). Then, metadata extractor 110 identifies the vehicle type of the object such as a track, a standard-size automobile, or a light automobile, and extracts the vehicle type information indicating the vehicle type (step S114). Then, metadata extractor 110 extracts the size information indicating the size of the object (step S115). Then, metadata extractor 110 extracts the representative image indicating the object (step S116). For example, the representative image is the image in which only the object is cut out from the input image.

For example, the series of pieces of processing in steps S112 to S116 with respect to the object can be performed by recognizing the object using the HOG. At this point, accuracy of the object recognition processing can be improved using the temporally preceding and subsequent input images or the pieces of metadata extracted from the input images.

Metadata extractor 110 outputs the background image information indicating the extracted background image. The background image information may be the extracted background image or the information identifying or selecting the background image. That is, metadata extractor 110 searches the image similar to the extracted background image from an image group. Metadata extractor 110 outputs information selecting the image similar to the background image from the image group as the background image information. The image group may include a plurality of background images extracted in past or a plurality of previously existing images. Metadata extractor 110 acquires the image group from a memory in coding apparatus 100 or an external storage such as a cloud storage. In this case, the background image information indicates a numerical value such as an index number. Accordingly, the background image information can be expressed with an extremely small amount of data compared with the image, and the data amount of the background image information can be decreased. The background image is not necessarily extracted for each input image, but the background image may be extracted at constant timing, for example, once every several seconds. Therefore, the image having a small change, for example, the background image is prevented from being frequently coded and transmitted, and the data amount of the background image information can be decreased.

The number of background images extracted in step S111 is not limited to one, but the plurality of images may be extracted as the background image in consideration of a depth in the input image. Therefore, in performing image reconstruction processing using the metadata, a depth state can properly be reproduced, and the quality of the reconstructed image can be improved.

Figure 10:
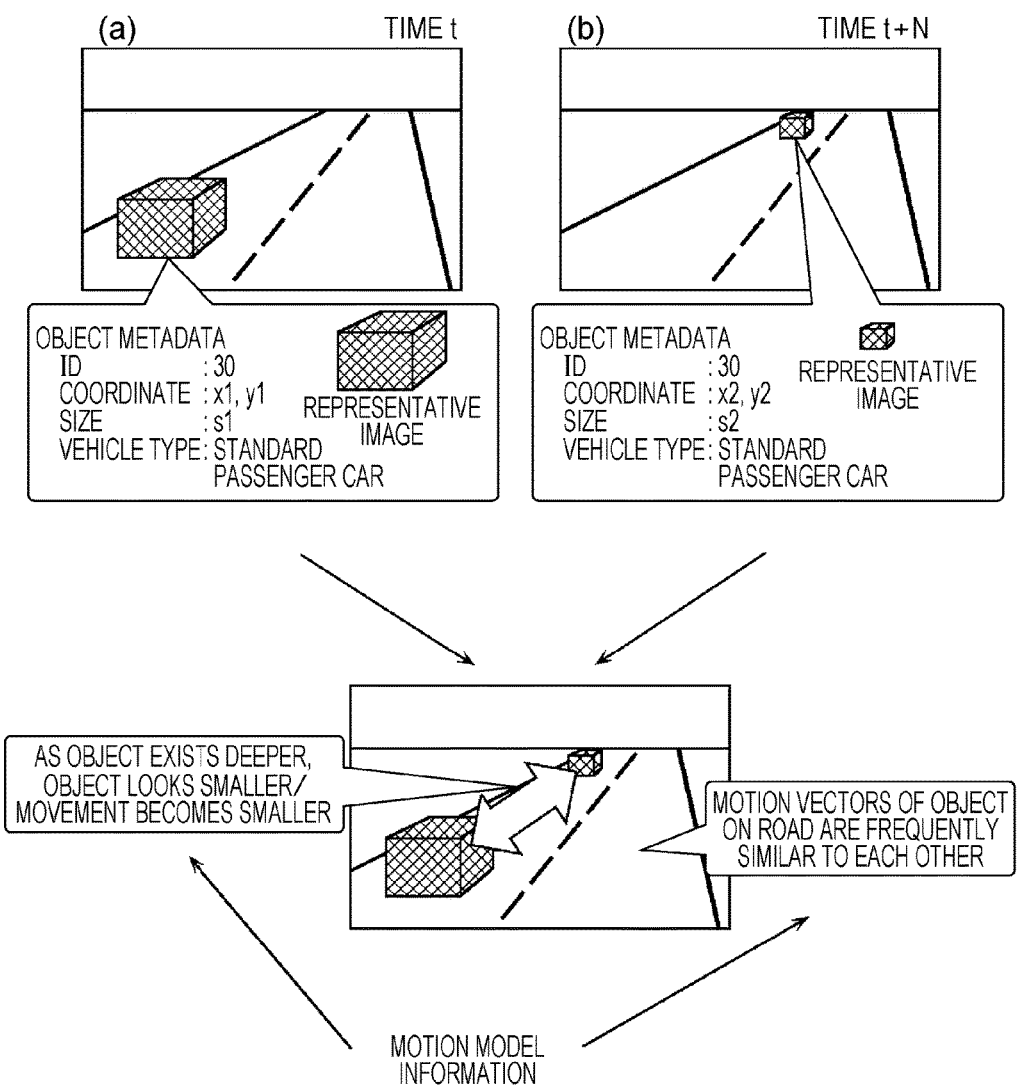
FIG. 10 is a view illustrating model analysis processing performed by a model analyzer of the first exemplary embodiment.

FIG. 10 is a view illustrating the model analysis processing performed by model analyzer 120.

The motion model analyzed in step S120 of FIG. 8 is a constant rule in an image space. Examples of the constant rule include that the object is projected smaller as the object exists deeper in the input image and that motion vectors of the object are always similar to each other in a specific area.

For example, as illustrated in (a) of FIG. 10, the object exists at a front of the road in the image at imaging time t. On the other hand, as illustrated in (b) of FIG. 10, the object exists at a back of the road in the image at imaging time (t+N). In the images, the object looks smaller as the object exists deeper in an environment in which the road extends from the front toward the depth. Because each traffic lane of the road is one-way traffic, a direction of the motion vector of each object on the road agrees with a travel direction on the road. Model analyzer 120 extracts a model associated with a motion predictable from the environment as the motion model. Model analyzer 120 generates and outputs information indicating the motion model as the motion model information.

At this point, model analyzer 120 generates the motion model information expressed using information such as an affine transform matrix or a projective transform matrix. Moreover, model analyzer 120 may deal with various matrices used to express the motion model information as a variable of a temporal component. That is, model analyzer 120 deals with speed or acceleration of the object on the road as transform components of the various matrices. Therefore, in the case where many vehicles move on the road at constant speed, the motion model information is expressed by the speed, which allows the speed to be applied to a new object. As a result, the data amount can be decreased.

Figure 11:
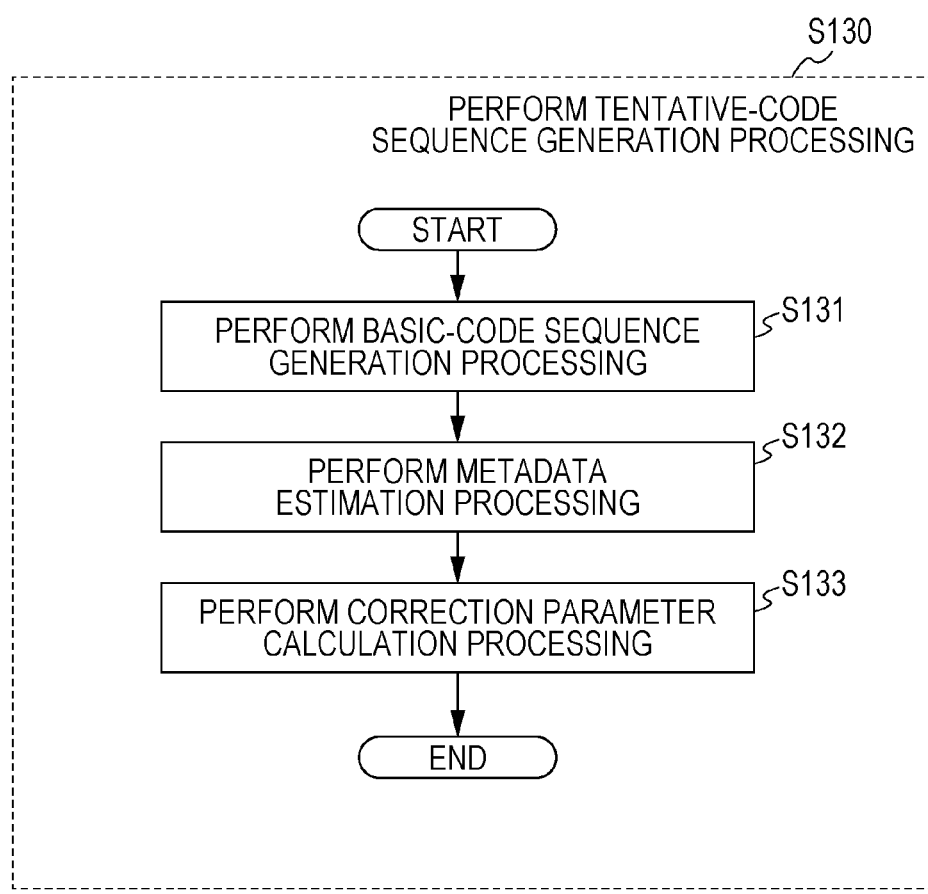
FIG. 11 is a detailed flowchart illustrating tentative-code sequence generation processing of the first exemplary embodiment.

FIG. 11 is a detailed flowchart illustrating the tentative-code sequence generation processing in step S130 of FIG. 8.

Tentative-code generator 130 performs basic-code sequence generation processing of generating the basic code sequence using the metadata acquired in step S110 (step S131). Then, tentative-code generator 130 performs metadata estimation processing (step S132). In the metadata estimation processing, tentative-code generator 130 estimates another piece of metadata from the metadata acquired in step S110 by performing temporal or spatial interpolation processing. Therefore, the amount of metadata can be decreased. Tentative-code generator 130 performs correction parameter calculation processing of calculating a parameter in order to correct an error of the metadata (hereinafter, referred to as estimated metadata) obtained through the metadata estimation processing in step S132 (step S133). Hereinafter, the calculated parameter is referred to as a correction parameter.

Figure 12:
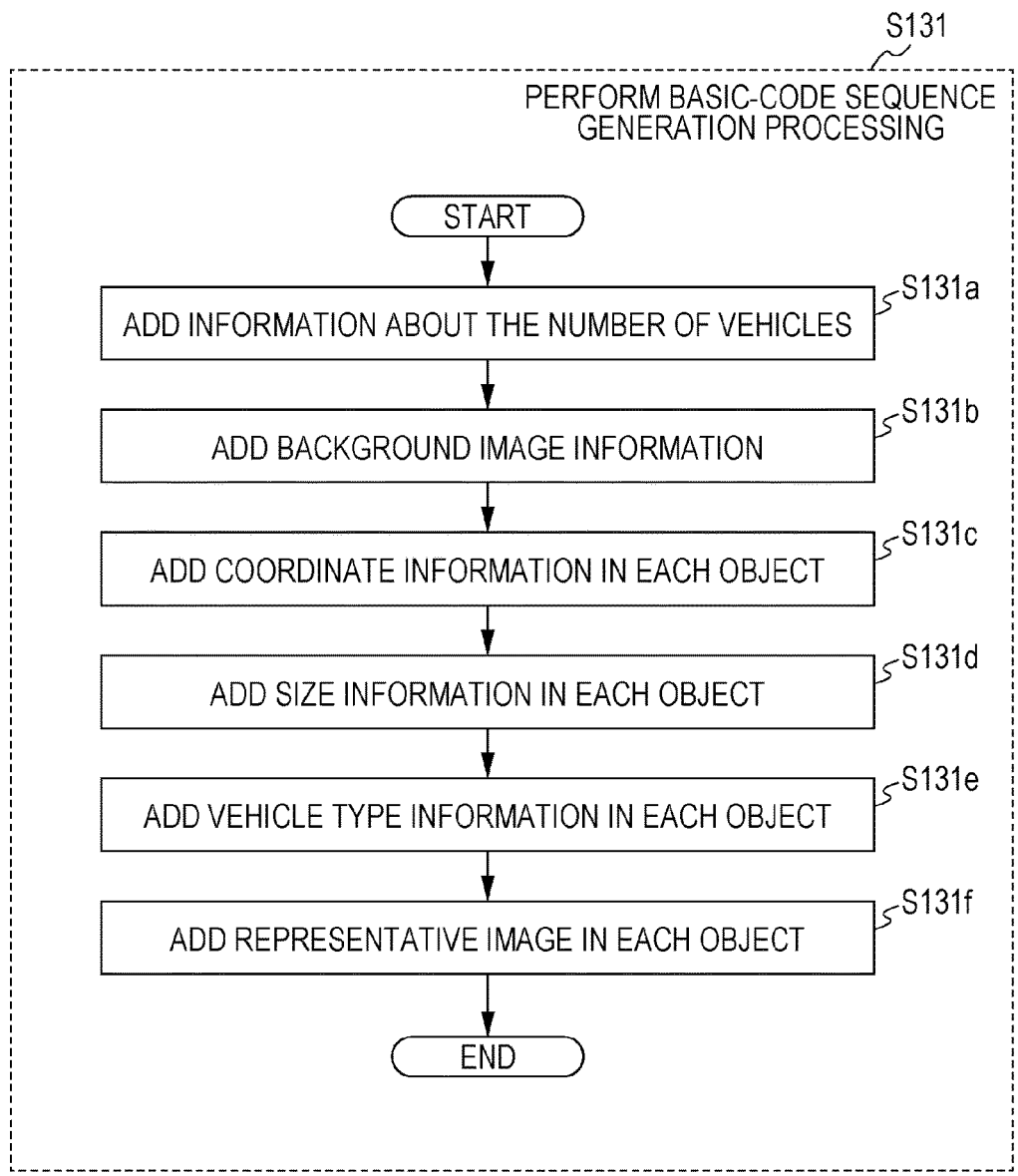
FIG. 12 is a detailed flowchart illustrating basic-code sequence generation processing of the first exemplary embodiment.

FIG. 12 is a detailed flowchart illustrating the basic-code sequence generation processing in step S131 of FIG. 11.

Tentative-code generator 130 adds the information about the number of vehicles extracted in step S112 of FIG. 9 to an empty basic code sequence (step S131a). Then, tentative-code generator 130 adds the background image information to the basic code sequence subjected to the processing in step S131a in order to specify the background image extracted in step S111 of FIG. 9 (step S131b).

Then, tentative-code generator 130 adds the coordinate information about the object extracted in step S113 of FIG. 9 to the basic code sequence subjected to the processing in step S131b while associating the coordinate information with an object ID which is an identifier of the object (step S131c). The processing in step S131c is performed in each object included in the input image.

Then, tentative-code generator 130 adds the vehicle type information about the object extracted in step S114 of FIG. 9 to the basic code sequence subjected to the processing in step S131c while associating the vehicle type information with the object ID which is the identifier of the object (step S131d). The processing in step S131d is performed in each object included in the input image.

Then, tentative-code generator 130 adds the size information about the object extracted in step S115 of FIG. 9 to the basic code sequence subjected to the processing in step S131d while associating the size information with the object ID which is the identifier of the object (step S131e). The processing in step S131e is performed in each object included in the input image.

Then, tentative-code generator 130 adds the representative image indicating the object extracted in step S116 of FIG. 9 to the basic code sequence subjected to the processing in step S131e while associating the representative image with the object ID which is the identifier of the object (step S131f). The processing in step S131f is performed in each object included in the input image.

Figure 13:
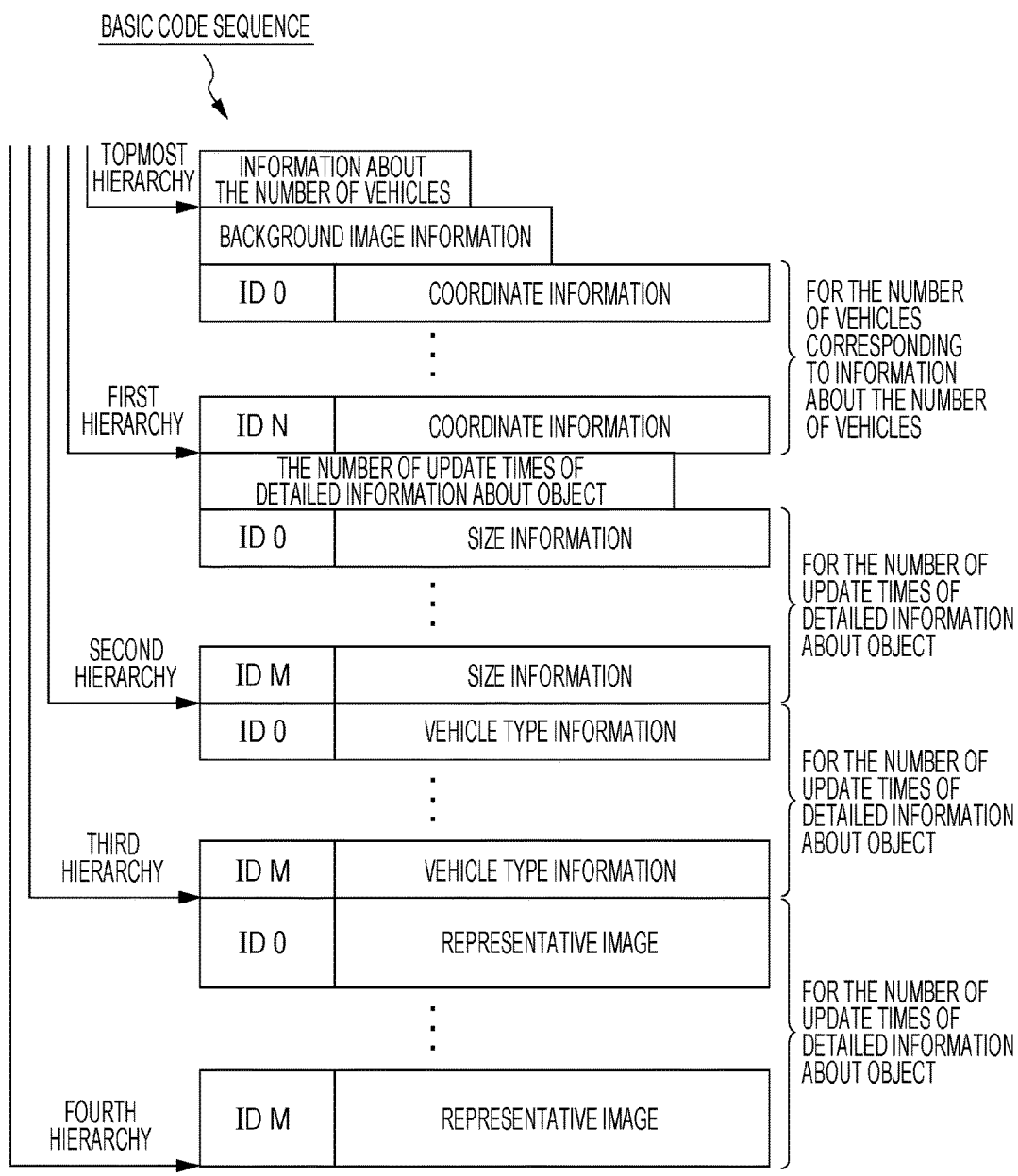
FIG. 13 is a view illustrating an example of a basic code sequence generated by basic-code sequence generation processing of the first exemplary embodiment.

FIG. 13 is a view illustrating an example of the basic code sequence generated through the pieces of processing in steps S131a to S131f of FIG. 12.

The basic code sequence includes the information about the number of vehicles, the background image information, the coordinate information, the size information, the vehicle type information, and the representative image as the metadata. The coordinate information, the size information, the vehicle type information, and the representative image are associated with each object ID. That is, in the basic code sequence, the pieces of metadata corresponding to the kind of at least one object are collectively disposed in each hierarchical kind of metadata.

With the basic code sequence thus configured, the decoding apparatus which is the reception apparatus can acquire only the information about the number of vehicles when a traffic volume on the road needs to be roughly recognized. When what kind of vehicle runs needs to be recognized, the decoding apparatus may acquire the pieces of information from the information about the number of vehicles to the vehicle type information. That is, in the basic code sequence, the pieces of metadata of the kind belonging to the hierarchy are collectively disposed in each of the hierarchies from a topmost hierarchy to a fourth hierarchy. Accordingly, the scalability of the basic code sequence can be ensured. At this point, the pieces of information that can be acquired in the hierarchies differ from each other in the information amount, and the object is expressed in such an abstract manner as coordinate display and rectangular display toward a shallow hierarchy.

In each of steps S131a to S131f, the metadata and the like need not to be added to the basic code sequence. For example, tentative-code generator 130 needs not to add the background image information to the basic code sequence in step S131b. Specifically, the background image information exists in the basic code sequence of the temporally preceding frame of a processing target input image (hereinafter, referred to as a processing target frame), and the background image information is also used in the processing target frame. In such cases, tentative-code generator 130 needs not to add the background image information. In the case where the background image information is not added to the processing target frame, the background image in the preceding frame is directly used with respect to the processing target frame in decoding the coded information. Therefore, the background image information can be reused, and the data amount of the coded information can be decreased.

The size information, vehicle type information, and representative image about the object may be added only when the pieces of information are changed. For example, one of the size information, the vehicle type information, and the representative image is updated from the preceding frame only in (M+1) pieces of objects out of (N+1) pieces of objects included in the processing target frame. In this case, tentative-code generator 130 adds (M+1) pieces to the basic code sequence as "the number of update times of the detailed information about the object". Tentative-code generator 130 adds the pieces of size information, the pieces of vehicle type information, and representative images about only the (M+1) pieces of objects to the basic code sequence.

The metadata estimation processing in step S132 of FIG. 11 will be described in detail below. Tentative-code generator 130 estimates the metadata in the processing target frame using the metadata included in the basic code sequence of the preceding or subsequent frame of the processing target frame. For example, the metadata of the object identical to the object included in the processing target frame exists in the basic code sequence of each of the plurality of preceding or subsequent frames of the processing target frame. In this case, tentative-code generator 130 estimates the metadata of the object included in the processing target frame by performing the interpolation processing or extrapolation processing on the pieces of metadata existing in the basic code sequences. In some cases, the metadata of the identical object exists only in the basic code sequence of one frame. In such cases, tentative-code generator 130 may estimate the metadata of the object included in the processing target frame from the motion model information acquired in step S120 of FIG. 8 or the metadata of the spatially or temporally surrounding object. The spatially surrounding object means the object existing in the processing target frame. The temporally surrounding object means the object existing in the frame that differs from the processing target frame in a decoding time or a display time.

FIG. 14 is a view illustrating a specific example of the metadata estimation processing.

For example, the coordinate information about the object identified using an object ID "20" exists in the basic code sequence of each of a 0th frame (frame 0) and a 100th frame (frame 100). In this case, tentative-code generator 130 estimates the coordinate information about the object having an object identifier "20" in a 50th frame (frame 50). That is, tentative-code generator 130 uses a coordinate (x0, y0) of the object in the 0th frame and a coordinate (x100, y100) of the object in the 100th frame. Tentative-code generator 130 estimates a coordinate (x'50, y'50) of the object having the object ID "20" in the 50th frame through the interpolation processing, such as linear interpolation, in which the coordinates are used.

When estimating the representative image, tentative-code generator 130 extracts corresponding points of the objects included in the 0th and 100th frames using SIFT (Scale-Invariant Feature Transform) or the like. The objects included in the 0th and 100th frames are identified using the identical object ID. Tentative-code generator 130 predicts a state where a structure in the image is transformed. Based on a prediction result, tentative-code generator 130 estimates the representative image in the frame among the 0th to 100th frames using the image of the object in each of the 0th and 100th frames. At this point, in the case where the corresponding point of the object is not found due to an occlusion area of the subject, the corresponding point may be estimated from an area where the corresponding point is found and the motion model information.

Tentative-code generator 130 estimates the metadata through the above processing.

Figure 15:
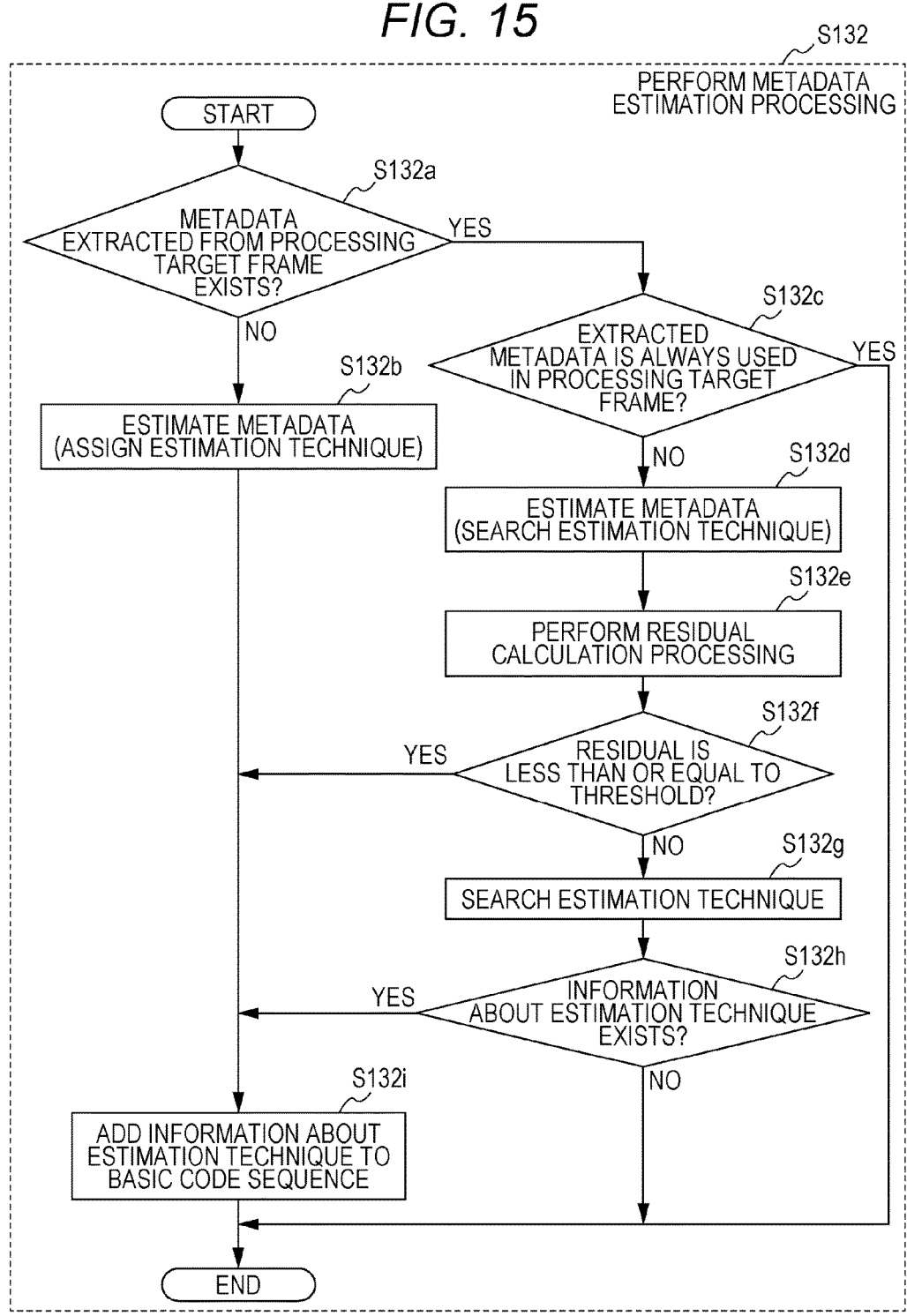
FIG. 15 is a detailed flowchart illustrating the metadata estimation processing of the first exemplary embodiment.

FIG. 15 is a detailed flowchart illustrating the metadata estimation processing in step S132 of FIG. 11.

Tentative-code generator 130 determines whether the metadata extracted in step S110 of FIG. 8 exists in the frame in which the metadata is estimated, namely, the basic code sequence of the processing target frame (step S132a). When determining that the extracted metadata does not exist in the basic code sequence of the processing target frame (No in step S132a), tentative-code generator 130 estimates the metadata of the processing target frame using the metadata in the preceding or subsequent frame of the processing target frame (step S132b). For example, metadata extractor 110 does not extract the pieces of metadata from all the frames, but extracts the metadata from, for example, each odd-numbered frame. At this point, tentative-code generator 130 determines that the extracted metadata does not exist in the basic code sequence of each even-numbered frame. Tentative-code generator 130 estimates the metadata of the even-numbered frame.

On the other hand, when determining that the extracted metadata exists in the basic code sequence of the processing target frame (Yes in step S132a), tentative-code generator 130 determines whether the extracted metadata is used (step S132c). That is, tentative-code generator 130 determines whether the estimated metadata may be used in the processing target frame.

When determining that the estimated metadata cannot be used, namely, when determining that the extracted metadata is used (Yes in step S132c), tentative-code generator 130 uses the extracted metadata. The preparation of the frame in which the estimated metadata is not used can perform the decoding processing from the frame in decoding the coded information. That is, the frame can be set to a random access point. On the other hand, when determining that the estimated metadata can be used, namely, when determining that the extracted metadata is not always used (No in step S132c), tentative-code generator 130 estimates the metadata (step S132d). That is, tentative-code generator 130 searches the estimation technique, such as the interpolation technique, which estimates the metadata most approximate to the metadata extracted from the processing target frame.

Then, tentative-code generator 130 performs residual calculation processing of calculating, as the residual, a difference between the estimated metadata and the metadata extracted from the processing target frame (step S132e). Then, tentative-code generator 130 determines whether the calculated residual is less than or equal to a threshold (step S132f). When the residual is larger than the threshold (No in step S132f), tentative-code generator 130 searches metadata estimation technique (step S132g). As a result of the search in step S132g, tentative-code generator 130 determines whether information about the estimation technique exists (step S132h). The information about the estimation technique means information necessary for the interpolation processing or the estimation. For example, the information about the estimation technique may be a numerical formula used in the interpolation or an index allocated to each technique such as the frequently-used linear interpolation or spline interpolation. The information about the estimation technique may be the motion model information indicating a change in size of the object in each coordinate. In the present exemplary embodiment, the metadata may be included in the meta-information, and information about the estimation technique for the metadata may be included as the metadata.

When determining in step S132h that the information about the estimation technique exists (Yes in step S132h), tentative-code generator 130 adds the information about the estimation technique to the basic code sequence (step S132i). When determining in step S132f that the residual is less than or equal to the threshold (Yes in step S132f), tentative-code generator 130 adds the information about the estimation technique searched in step S132d to the basic code sequence (step S132i). When adding the information about the estimation technique to the basic code sequence, tentative-code generator 130 deletes the metadata, which is included in the basic code sequence and extracted from the processing target frame.

When estimating the metadata in step S132b, tentative-code generator 130 adds the information about the estimation technique used in the estimation to the basic code sequence (step S132i).

Figure 16:
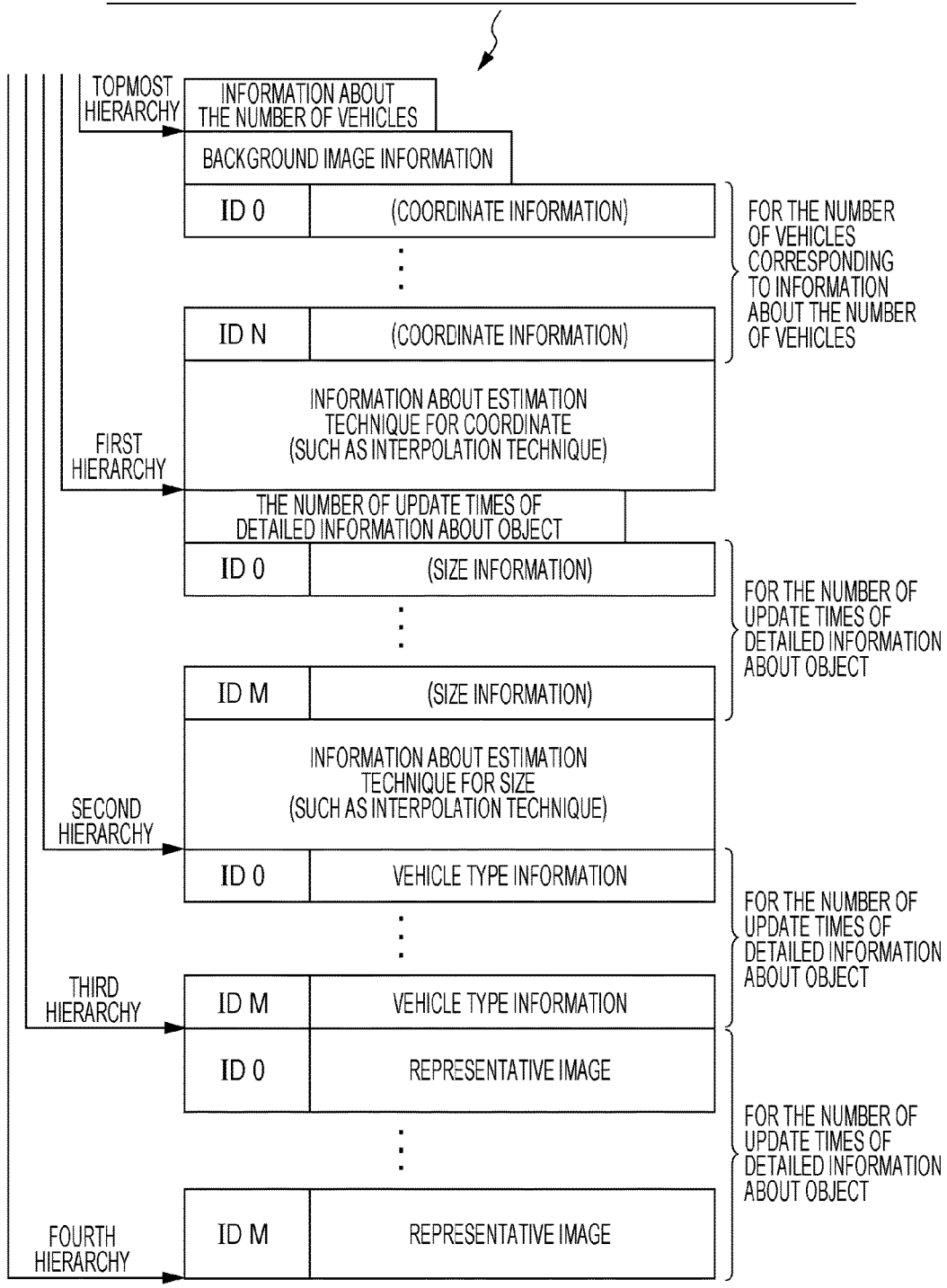
FIG. 16 is a view illustrating a basic code sequence to which information about an estimation technique of the first exemplary embodiment is added.

FIG. 16 is a view illustrating the basic code sequence to which the information about the estimation technique is added.

As illustrated in FIG. 16, for example, the information about the estimation technique for the coordinate and the information about the estimation technique for the size are added to the basic code sequence. For example, the pieces of information about the estimation technique indicate the coordinate or size interpolation technique. For example, in the case where the pieces of metadata are extracted only from the plurality of frames having numbers indicated by integral multiples of 100, the metadata of the 50th frame is estimated based on the metadata included in each of the basic code sequences of the 0th and 100th frames. The estimated metadata obtained by the estimation is added to the basic code sequence of the 50th frame.

In steps S132b and S132d of FIG. 15, the metadata may be estimated in each frame or the pieces of metadata may collectively be estimated for the plurality of frames. In the case where the metadata is estimated in each frame, the metadata close to the metadata of the frame can be estimated. Accordingly, the quality of the estimated metadata can be improved. For example, in the case where a linear change in coordinate of the object emerges on the plurality of frames, the pieces of metadata may collectively be estimated for the plurality of frames. In this case, the pieces of metadata can be estimated for the plurality of frames by one kind of interpolation technique such as the linear interpolation. Therefore, the information about the estimation technique stored in the basic code sequence of each of the plurality of frames can be reduced, and the increase in data amount of the basic code sequence can be suppressed. Specifically, in the case where the pieces of metadata are collectively estimated for the plurality of frames, metadata extractor 110 estimates the metadata only from the plurality of frames having the numbers indicated by integral multiples of 50. In this case, tentative-code generator 130 performs the estimation in step S132b using the pieces of metadata extracted from the 0th and 50th frames. Tentative-code generator 130 performs the linear interpolation on the coordinate information about the identical object in the 0th and 50th frames. Therefore, tentative-code generator 130 collectively estimates the pieces of metadata of the first to 49th frames by the linear interpolation.

It is not necessary to estimate all the kinds of pieces of metadata. For example, in the plurality of kinds of pieces of metadata of the object to which the identical object ID is allocated, the vehicle type information is obviously identical even if the vehicle type information is extracted from the frames at different times. Accordingly, the vehicle type information needs not to be estimated. It is not necessary to perform the search for the information about the estimation technique and the addition of the information about the estimation technique to the basic code sequence, so that the data amount of the basic code sequence can be decreased, and therefore the processing amount can also be decreased.

Tentative-code generator 130 may determine that the metadata extracted from the processing target frame is always used at a rate of one frame to predetermined N (N is an integer of 2 or more) frames in step S132c. In the case where a scene changes from the processing target frame such that the image of the processing target frame changes largely from the preceding frame, tentative-code generator 130 may determine that the metadata extracted from the processing target frame is always used.

Without making the determination in step S132c, tentative-code generator 130 may use the estimated metadata in any processing target frame with no use of the metadata extracted from the processing target frame. Therefore, the data amount of the basic code sequence can further be decreased.

Figure 17:
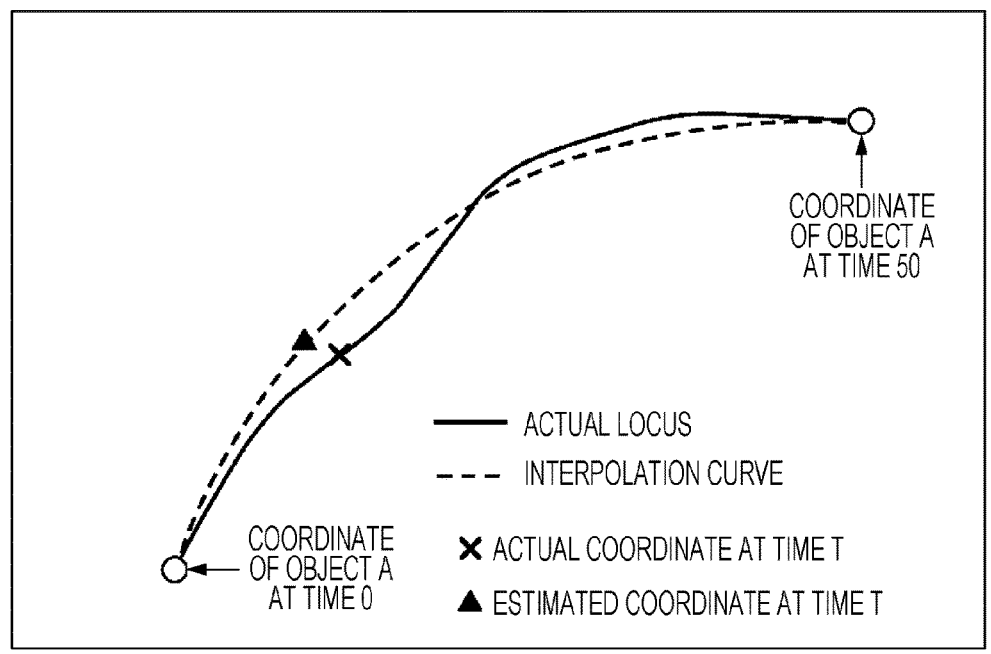
FIG. 17 is a view illustrating an example of a metadata estimation processing in which interpolation is used in the first exemplary embodiment.

FIG. 17 is a view illustrating an example of the metadata estimation processing in which the interpolation is used.

For example, in step S132b or S132d, tentative-code generator 130 performs the interpolation on the pieces of extracted metadata using the motion model information. That is, tentative-code generator 130 estimates the metadata at a time between different times from the pieces of metadata of the identical object at the different times.

Specifically, tentative-code generator 130 estimates the pieces of metadata of object A at times 1 to 49 from the pieces of metadata of object A at each of times 0 and 50. For example, the metadata is the coordinate information indicating the two-dimensional coordinate. Tentative-code generator 130 derives an interpolation curve from the coordinates of object A at times 0 and 50. Tentative-code generator 130 divides the interpolation curve into the number of frames to be estimated. Tentative-code generator 130 estimates the metadata indicated by an edge of a small curve obtained by the division as the metadata at the time corresponding to the edge. For example, tentative-code generator 130 divides the interpolation curve at equal intervals. Tentative-code generator 130 may estimate the metadata by the spline interpolation in which the past metadata is used. The information about the estimation technique is the information necessary for the decoding performed by the decoding apparatus, and the information about the interpolation technique. The information about the interpolation technique is the information assigning the interpolation technique such as the spline interpolation and the linear interpolation, or control point information about a Bezier curve. Therefore, the pieces of metadata can be generated at the plurality of times only by the information about the estimation technique indicated by a small amount of data. As a result, because the metadata is estimated, the metadata can be decreased and the coding efficiency can be improved.

Figure 18:
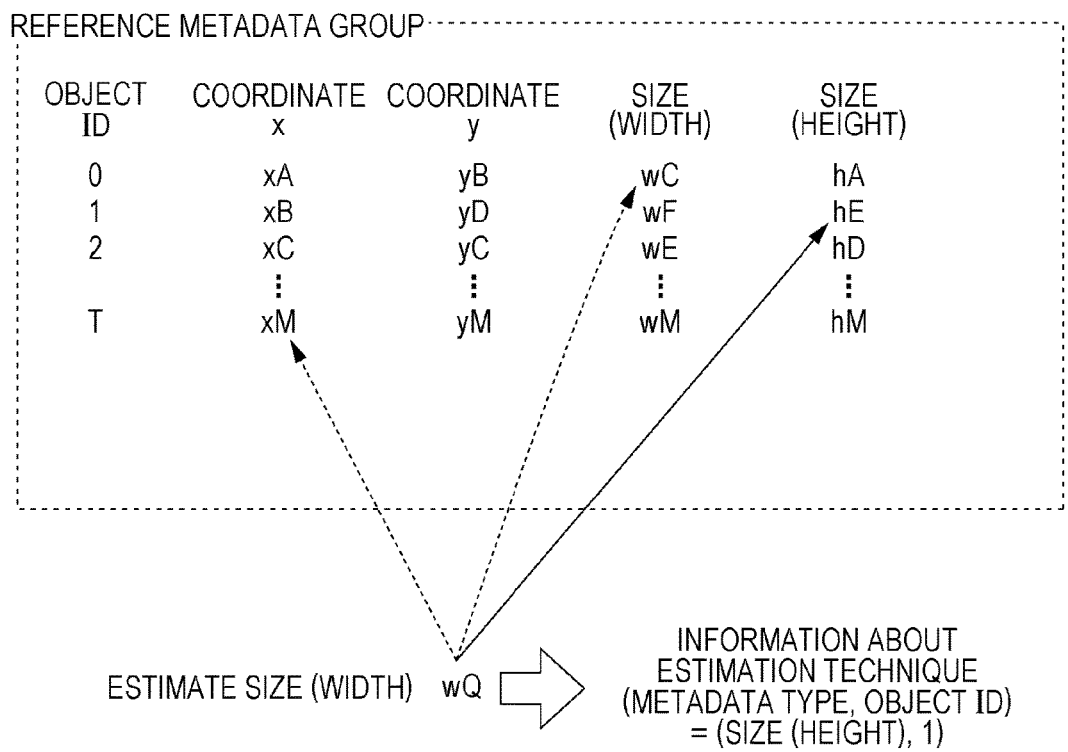
FIG. 18 is a view illustrating a metadata estimation technique in which only metadata of an identical frame is used in the first exemplary embodiment.

FIG. 18 is a view illustrating the metadata estimation technique in which only the metadata of the identical frame is used.

For example, tentative-code generator 130 estimates the size information indicating the size (width) out of the four kinds of pieces of metadata. The four kinds of pieces of metadata are coordinate x, coordinate y, the size (width), and the size (height). Specifically, tentative-code generator 130 does not generate new metadata from the metadata included in a reference metadata group. Tentative-code generator 130 estimates the estimation target metadata by selecting the metadata similar to the estimation target metadata from the reference metadata group. The reference metadata group includes four kinds of pieces of metadata of each object included in the processing target frame.

For example, when estimating size information "wQ" indicating the size (width), tentative-code generator 130 searches the metadata similar to "wQ" of the estimation target metadata from the reference metadata group. When similar metadata "hE" is found, tentative-code generator 130 adds "(metadata type, object ID)=(size (height), 1)" to the basic code sequence as the information about the estimation technique. Tentative-code generator 130 may search the metadata similar to "wQ" of the estimation target metadata from the plurality of pieces of metadata of the same kind as the estimation target metadata. In this case, when similar metadata "wC" is found, tentative-code generator 130 adds "object ID=0" to the basic code sequence as the information about the estimation technique. The estimation is performed from the metadata of the same kind as the estimation target metadata, so that the difference between the metadata obtained by the estimation and the estimation target metadata can be decreased. At this point, information about the estimation method may include only the object ID, the data amount of the basic code sequence can further be decreased, and the coding efficiency can be improved.

At this point, predetermined reference metadata may be added to the reference metadata group.

Figure 19:
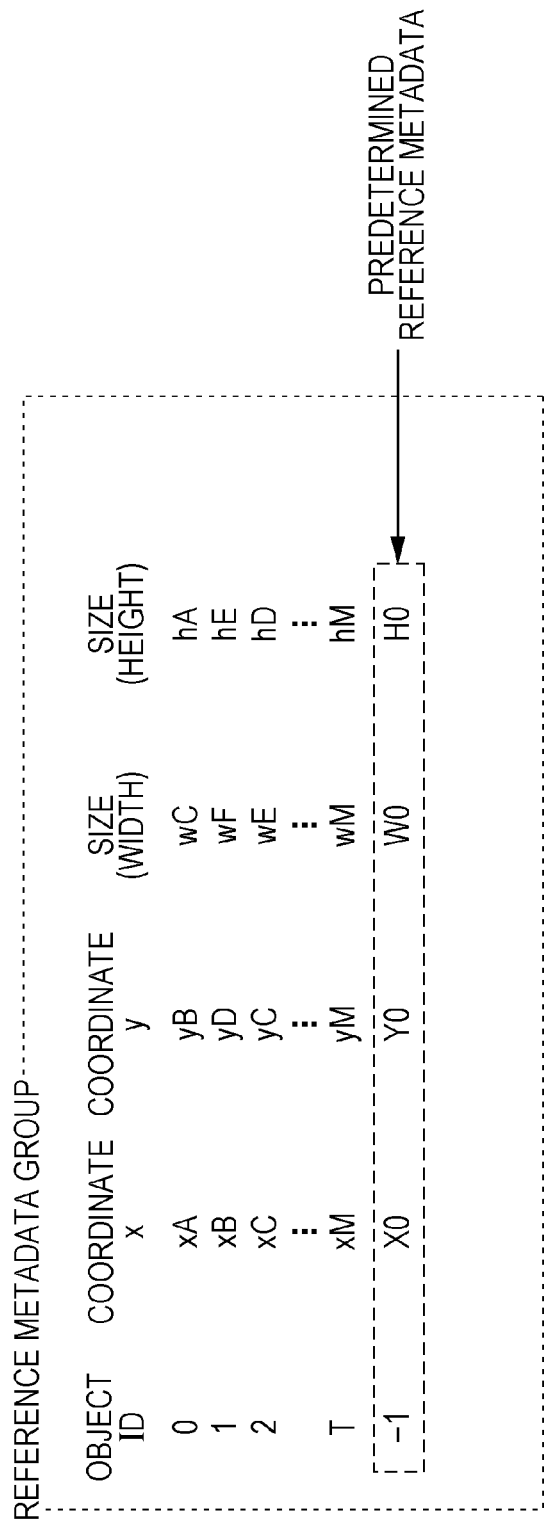
FIG. 19 is a view illustrating a reference metadata group to which predetermined reference metadata is added in the first exemplary embodiment.

FIG. 19 is a view illustrating the reference metadata group to which the predetermined reference metadata is added.

The predetermined reference metadata includes the object ID of the object that is not included in the input image and the four kinds of pieces of metadata of the object. The four kinds of pieces of metadata indicate predetermined specific values. For example, the predetermined reference metadata indicates (object ID, coordinate x, coordinate y, size (width), size (height))=(−1, X0, Y0, W0, H0). The object ID "−1" is an identifier that is not provided to the object of the metadata extracted from the input image. The specific value may be a fixed value such as 0 or a statistical value of the metadata such as an average value and a median. In the case where the specific value is the fixed value, the coding efficiency can be improved without increasing the processing amount in the coding processing. In the case where the specific value is the statistical value such as the average value, because the specific value is an adaptive value compared with the fixed value, the coding efficiency can further be improved. Thus, the metadata can properly be estimated by adding the predetermined reference metadata even if the proper metadata does not exist in the reference metadata group.

Figure 20:
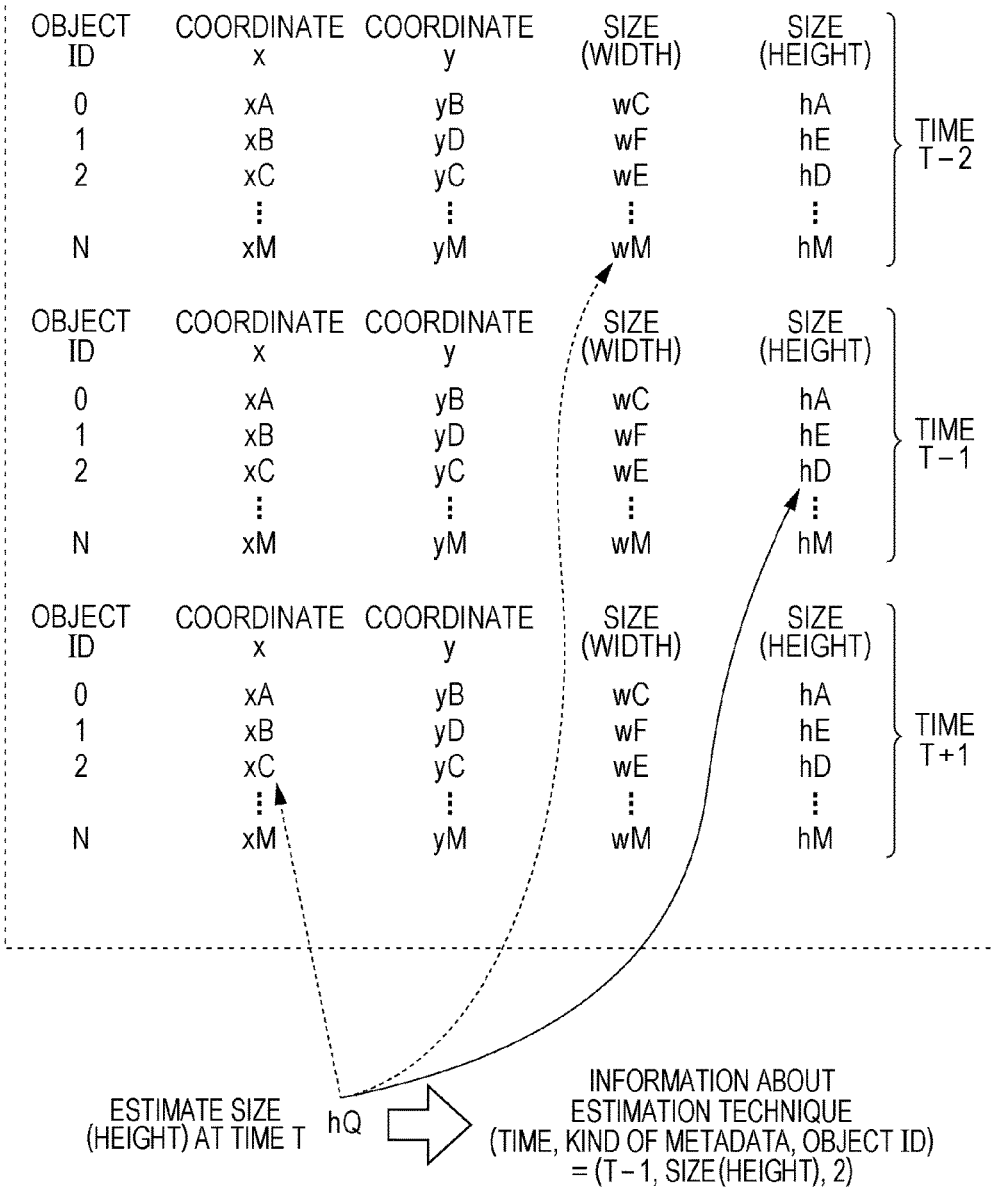
FIG. 20 is a view illustrating the metadata estimation technique in which the metadata of each of frames at different times is used in the first exemplary embodiment.

FIG. 20 is a view illustrating the metadata estimation technique in which the metadata of each of the frames at different times is used.

For example, tentative-code generator 130 estimates the size information indicating the size (height) at time T out of the four kinds of pieces of metadata. Specifically, tentative-code generator 130 does not generate new metadata from at least one piece of metadata included in the reference metadata group. Tentative-code generator 130 estimates the estimation target metadata by selecting the metadata similar to the estimation target metadata from the reference metadata group. The reference metadata group includes the four kinds of pieces of metadata of each of the objects included in the frames at times (T−2), (T−1), and (T+1) except for time T.

For example, when estimating size information "hQ" indicating the size (height) at time T, tentative-code generator 130 searches the metadata similar to "hQ" of the estimation target metadata from the reference metadata group. When similar metadata "hD" is found, tentative-code generator 130 adds "(time, metadata type, object ID)=(T−1, size (height), 2)" to the basic code sequence as the information about the estimation technique. Tentative-code generator 130 may search the metadata similar to "hQ" of the estimation target metadata only from the plurality of pieces of metadata of the same kind as the estimation target metadata. In this case, when similar metadata "hD" is found, tentative-code generator 130 adds "(time, object ID)=(T−1, 2)" to the basic code sequence as the information about the estimation technique. The estimation is performed from the metadata of the same kind as the estimation target metadata, so that the difference between the metadata (estimated metadata) obtained by the estimation and the estimation target metadata can be decreased. At this point, information about the estimation method may only need to include the time and the object ID, the data amount of the basic code sequence can further be decreased, and the coding efficiency can be improved. Particularly, in the case where the time of the processing target frame is close to the time of the frame in which the estimated metadata is extracted, various pieces of metadata change small between the frames. For this reason, an error decreases in the estimation of the same kind of metadata, and the coding efficiency can be improved. For example, the case where the times of both the frames are close to each other means the case where an interval of the time, which is indicated by POC, between the processing target frame and the frame in which the estimated metadata is extracted falls within a predetermined range.

The time included in the information about the estimation technique may be expressed as a difference in time between the processing target frame and the frame in which the estimated metadata is extracted.

Note that the four kinds of pieces of metadata at time T are not included in the reference metadata group in FIG. 20, but the four kinds of pieces of metadata may be included in the reference metadata group. In this case, the difference between the estimation target metadata and the estimated metadata can further be decreased, and the metadata can efficiently be estimated.

The time and object ID, which are included in the information about the estimation technique, may be expressed by one identifier in the case where the number of objects included in the frames at the times is known. Therefore, a number of dimensions of the information about the estimation technique can be decreased and the data amount can be decreased.

Figure 21:
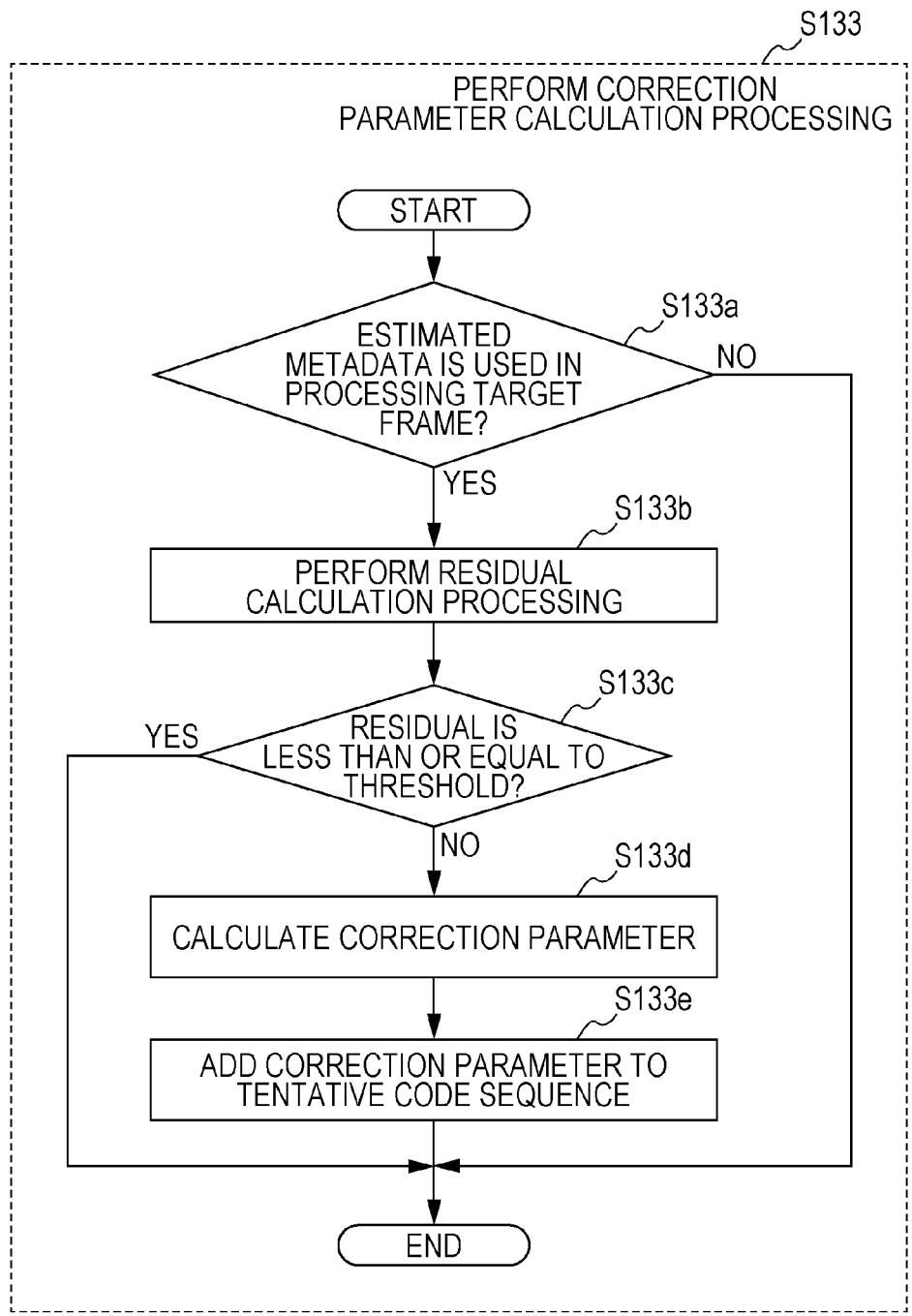
FIG. 21 is a detailed flowchart illustrating correction parameter calculation processing of the first exemplary embodiment.

FIG. 21 is a detailed flowchart illustrating the correction parameter calculation processing in step S133 of FIG. 11.

Tentative-code generator 130 determines whether the estimated metadata is used in the processing target frame (step S133a). When determining that the estimated metadata is not used (No in step S133a), tentative-code generator 130 ends the correction parameter calculation processing. On the other hand, when determining that the estimated metadata is used (Yes in step S133a), tentative-code generator 130 estimates the metadata using, for example, the information about the estimation technique. Tentative-code generator 130 calculates the residual by comparing the estimated metadata which is the metadata obtained by the estimation to the metadata extracted from the original image (processing target frame) (step S133b). Tentative-code generator 130 determines whether the residual is less than or equal to a threshold (step S133c). When determining that the residual is less than or equal to the threshold (Yes in step S133c), tentative-code generator 130 ends the correction parameter calculation processing. On the other hand, when determining that the residual is larger than the threshold (No in step S133c), tentative-code generator 130 calculates the correction parameter in order to compensate for the residual (step S133d). Tentative-code generator 130 adds the calculated correction parameter to the tentative code sequence (step S133e). The correction parameter calculation processing is performed on each piece of metadata of the processing target frame. As a result, the correction information including the plurality of correction parameters is added to the tentative code sequence.

After the determination that the residual is larger than the threshold is made in step S133c, the pieces of processing in steps S132g and S132h may be performed similarly to the pieces of processing from step S132f in FIG. 15. Therefore, the processing in step S133a or S133b can be eliminated, and the processing amount can be decreased during the coding.

Figure 22:
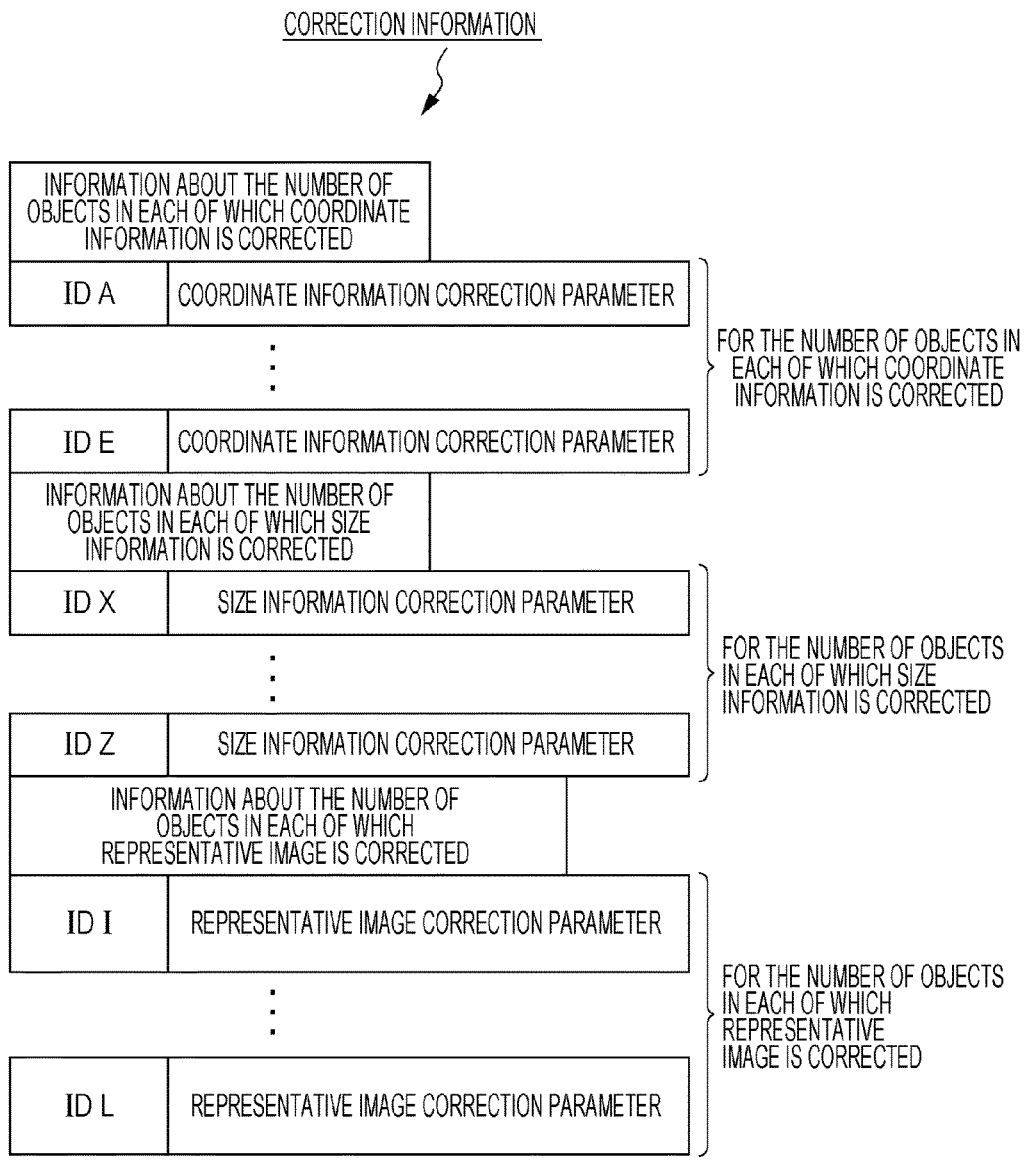
FIG. 22 is a view illustrating an example of correction information generated by the correction parameter calculation processing of the first exemplary embodiment.

FIG. 22 is a view illustrating an example of the correction information generated through the pieces of processing in steps S133a to S133e of FIG. 21.

The correction information includes the correction parameters for the number of pieces of metadata to be corrected. For example, the correction information includes the number of objects in each of which the coordinate information is corrected (information about the number of objects) and the correction parameter for each of the pieces of coordinate information having the same number as the number of objects. The correction information also includes the number of objects in each of which the size information is corrected (information about the number of objects) and the correction parameter for each of the pieces of size information having the same number as the number of objects. The correction information also includes the number of objects in each of which the representative image is corrected (information about the number of objects) and the correction parameter for each of the representative images having the same number as the number of objects. Because the correction information is the correction information with respect to the estimated metadata, the correction information is added to the tentative code sequence so as to be mainly provided to the basic code sequence that does not include the metadata extracted from the input image. The tentative code sequence includes the basic code sequence in FIG. 16 to which the information about the estimation technique is added and the correction information in FIG. 22. The correction information is not limited to the configuration in FIG. 22.

Figure 23:
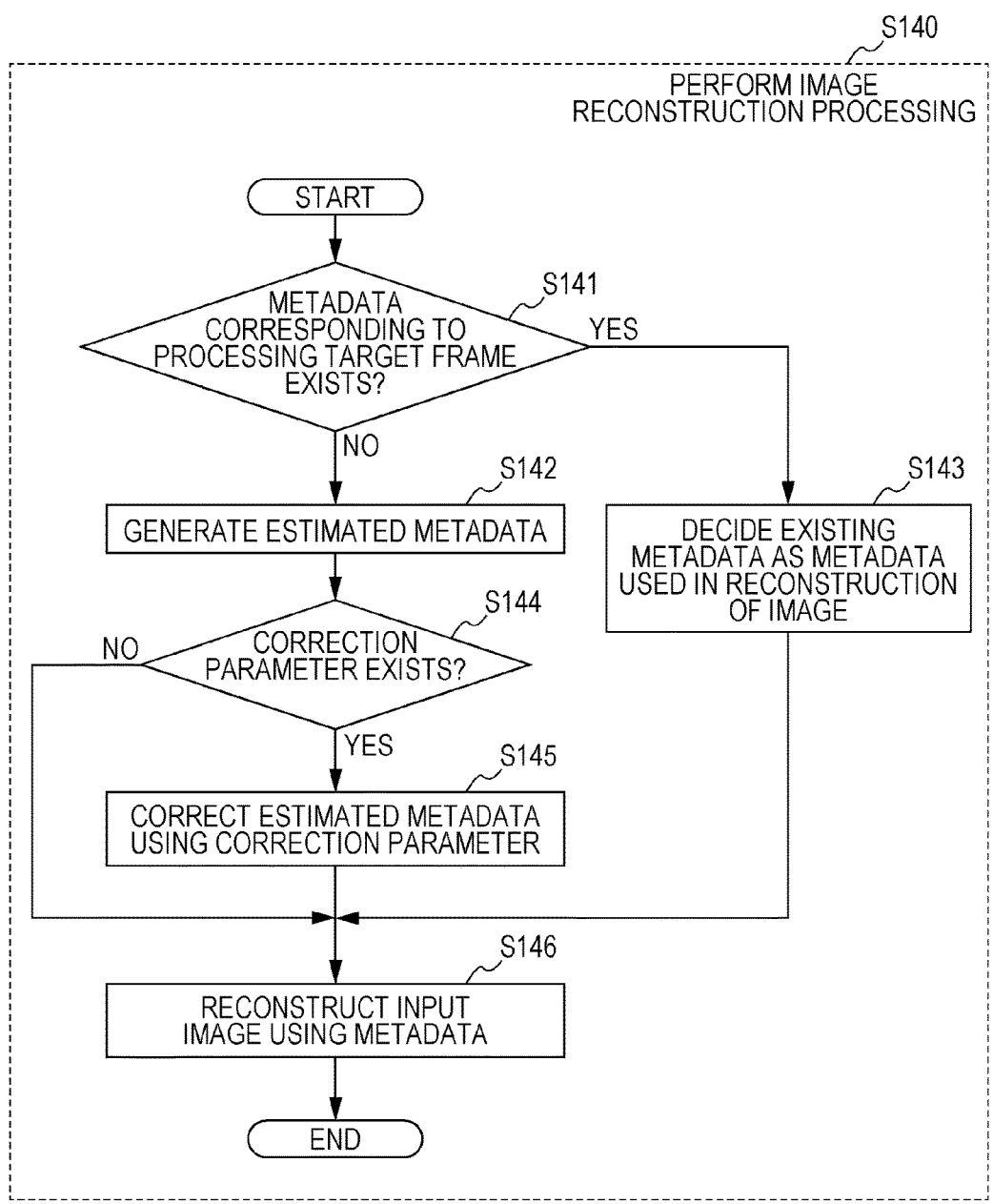
FIG. 23 is a detailed flowchart illustrating image reconstruction processing of the first exemplary embodiment.

FIG. 23 is a detailed flowchart illustrating the image reconstruction processing in step S140 of FIG. 8.

Image reconstructor 140 determines whether the metadata extracted from the processing target frame exists in the tentative code sequence of the processing target frame (step S141). When determining that the metadata exists (Yes in step S141), image reconstructor 140 decides the metadata existing in the tentative code sequence as the metadata used in the image reconstruction processing (step S143). On the other hand, when determining that the metadata exists (No in step S141), image reconstructor 140 generates the estimated metadata using the information about the estimation technique included in the tentative code sequence (step S142).

Image reconstructor 140 determines whether the correction parameter corresponding to the estimated metadata exists in the tentative code sequence (step S144). When determining that the correction parameter exists in the tentative code sequence (Yes in step S144), image reconstructor 140 corrects the estimated metadata using the correction parameter (step S145). The post-correction estimated metadata is the metadata used in the image reconstruction processing. When it is determined in step S144 that the correction parameter does not exist in the tentative code sequence (No in step S144), the estimated metadata is the metadata used in the image reconstruction processing.

Image reconstructor 140 performs the image reconstruction processing of reconstructing the input image using the metadata existing in the tentative code sequence, the post-correction estimated metadata, or the estimated metadata (step S146). In the image reconstruction processing, image reconstructor 140 scales the representative image out of the plurality of kinds of pieces of metadata of the object to the size indicated by the size information out of the plurality of kinds of pieces of metadata with respect to the background image. Image reconstructor 140 pastes the scaled representative image to the coordinate indicated by the coordinate information out of the plurality of kinds of pieces of metadata. The paste, namely, the superimposition is performed on each object to reconstruct the input image.

Figure 24:
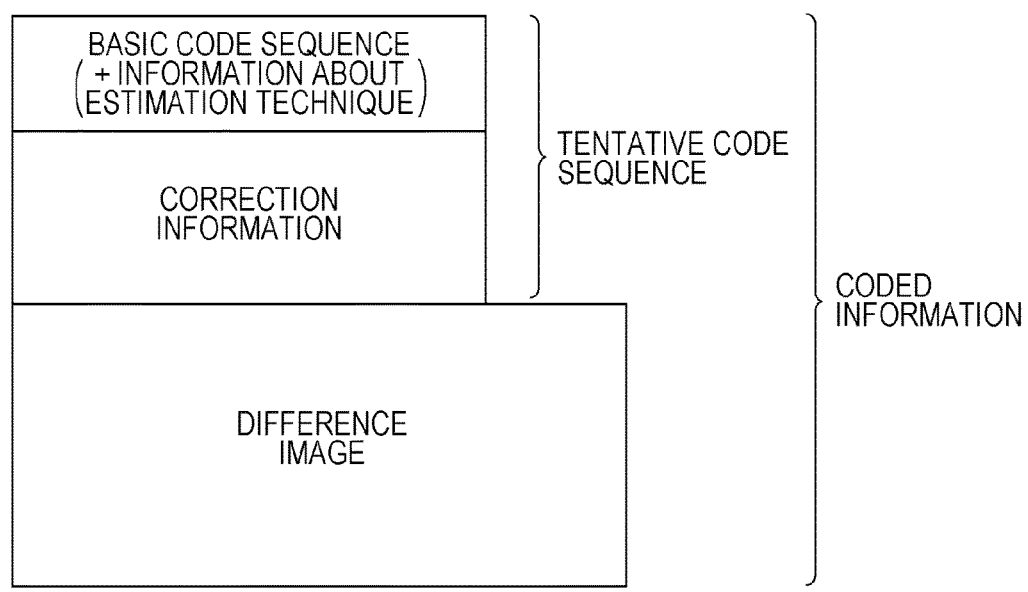
FIG. 24 is a view illustrating an example of coded information generated through the coded information generation processing of the first exemplary embodiment.

FIG. 24 is a view illustrating an example of the coded information generated through the coded information generation processing in step S160 of FIG. 8.

Code generator 160 generates and outputs the coded information including the tentative code sequence output from tentative-code generator 130 and the difference image generated through the difference image calculation processing in step S150 of FIG. 8. The tentative code sequence includes the basic code sequence including the information about the estimation technique and the correction information.

The coded information may be generated in each frame, or collectively be generated in each sequence.

Summary of First Exemplary Embodiment

As described above, the coding method of the present exemplary embodiment is the coding method for coding the moving image in each frame. In the coding method, the background image is extracted from the target frame (the processing target frame) included in the moving image. The plurality of kinds of pieces of metadata indicating the feature of at least one object included in the target frame are extracted from the target frame. Then, the plurality of kinds of pieces of metadata are hierarchically disposed in each kind. Then, the coded information is generated, the coded information including the background image information specifying the background image and the meta-information indicating the part of or all the pieces of metadata corresponding to the hierarchy selected from the plurality of kinds of pieces of metadata.

For example, the kind of the metadata belonging to the first hierarchy is the coordinate of the object in the target frame, and the kind of the metadata belonging to the second hierarchy is the size of the object in the target frame. For example, the kind of the metadata belonging to the third hierarchy is the classification name of the subject projected as the object in the target frame.

Each of the coordinate, size, and classification name is the kind of the metadata indicating the feature of the object. The coordinate of the object in the target frame is expressed by the metadata of the coordinate, and the size of the object located in the coordinate is expressed by the metadata of the size. A form of the object, which is located in the coordinate indicated by the metadata of the coordinate and adjusted to the size indicated by the metadata of the size, is expressed by the metadata of the classification name such as a vehicle type.

The generated coded information includes the background image information and the meta-information indicating the part of or all the pieces of metadata corresponding to the hierarchy selected from the plurality of kinds of pieces of metadata. Accordingly, when receiving the coded information, the decoding apparatus which is the reception apparatus specifies the background image using the background image information included in the coded information, and derives at least one kind of metadata using the meta-information. The decoding apparatus superimposes the object expressed by at least one kind of metadata on the specified background image. The object is superimposed on at least one object. Therefore, the decoded image close to the target frame can be generated, and the data amount of the coded information can be suppressed.

As illustrated in FIG. 13 or 16, the plurality of kinds of pieces of metadata are hierarchically disposed in each kind. That is, the pieces of metadata corresponding to the kind of at least one object are collectively disposed in each kind of metadata. For example, the pieces of metadata corresponding to the coordinate of at least one object are collectively disposed, and the pieces of metadata corresponding to the size of at least one object are collectively disposed. Also, the pieces of metadata corresponding to the classification name of the subject of at least one object are collectively disposed. Thus, the plurality of kinds of pieces of metadata are scalably constructed.

From among the plurality of kinds of pieces of metadata, only the metadata which is required by the decoding apparatus which is the reception apparatus, up to the hierarchy corresponding to a level at which the object is specifically expressed can easily be transmitted. For example, when the kind belonging to the hierarchy corresponding to the level required by the decoding apparatus is the coordinate, only the pieces of metadata corresponding to the coordinate of at least one object can collectively and easily be transmitted. Therefore, in the decoding apparatus, only the coordinate of the object can generate the decoded image expressed in the background image. For example, when the kind belonging to the hierarchy corresponding to the level required by the decoding apparatus is the size, only the pieces of metadata corresponding to the coordinate and size of at least one object can collectively and easily be transmitted. Therefore, in the decoding apparatus, only the coordinate and size of the object can generate the decoded image expressed in the background image. Accordingly, the picture analysis needs to be performed in response to the request of each decoding apparatus (reception apparatus), but the load on the processing can be reduced. Because all the plurality of kinds of pieces of metadata need not to be transmitted according to the level required by the decoding apparatus, the data amount of the transmitted information can further be suppressed.

In the present exemplary embodiment, using the plurality of kinds of pieces of metadata having the hierarchical structure, the content of the coded information to be transmitted can be changed according to a communication environment between the transmission apparatus and the reception apparatus or a demand of a receiver. That is, the moving image coded information indicating the metadata in which a display mode is switchable can be generated. Therefore, a user can switch the display mode according to the desired content from the plurality of kinds of pieces of metadata.

In the coding method of the present exemplary embodiment, the plurality of kinds of pieces of metadata also include the total number of objects included in the target frame. For example, as illustrated in FIG. 13 or 16, the total number of objects is included in the plurality of kinds of pieces of metadata as the information about the number of objects. Therefore, only the total number of objects can be transmitted to the decoding apparatus according to the level required by the decoding apparatus, and the data amount of the transmitted information can further be suppressed.

In the coding method of the present exemplary embodiment, the estimation target metadata which is the metadata of one of the kinds of the plurality of kinds of pieces of extracted metadata is estimated using one of the plurality of estimation techniques. In generating the coded information, the coded information is generated, the coded information including the information about the estimation technique used in the estimation of the estimation target metadata as the meta-information. For example, as illustrated in FIG. 14 or 17, in estimating the estimation target metadata, the coordinate of the estimation target metadata is estimated by performing interpolation or extrapolation on the coordinate of the identical object in at least one reference frame included in the moving image. The reference frame is the preceding or subsequent frame of the target frame (input image) in the display order or coding order. For example, in estimating the estimation target metadata, the motion model information indicating the changes in spatial position and size of the object in the moving image is generated as illustrated in FIG. 10. For example, as illustrated in FIG. 14, the coordinate which is the estimation target metadata and the size which is the metadata of another kind of the plurality of kinds of pieces of metadata are estimated based on the interpolation or extrapolation and the motion model information.

In the coded information, because the information about the estimation technique is included as the meta-information, the data amount of the information about the estimation technique can be decreased compared with the metadata, and therefore the data amount of the coded information can further be suppressed.

In the coding method of the present exemplary embodiment, as illustrated in FIG. 21, a determination is made whether the residual between the estimated metadata obtained by the estimation of the estimation target metadata and the estimation target metadata is less than or equal to the predetermined threshold. When the determination that the residual is larger than the predetermined threshold is made, the correction parameter is included in the coded information in order to compensate for the residual.

Because the correction parameter is included in the coded information, the estimated metadata can be corrected so as to be brought close to the estimation target metadata even for the large residual between the estimated metadata and the estimation target metadata.

The coding method of the present exemplary embodiment further includes: generating a reconstructed image by reconstructing the target frame based on the background image information and the meta-information; and including, in the coded information, a difference image indicating a difference between the target frame and the reconstructed image. For example, the reconstructed image is generated as illustrated in FIG. 23. More specifically, in generating the reconstructed image, the coordinate of the object is specified by the metadata belonging to the first hierarchy, and the size of the specified object is specified by the metadata belonging to the second hierarchy. The associated image associated with the classification name of the subject is specified by the metadata belonging to the third hierarchy, and the background image is specified by the background image information. In step S146 of FIG. 23, the reconstructed image is generated by superimposing the specified associated image having the specified size on the specified coordinate in the specified background image.

Because the difference image is included in the coded information, the decoded image close to the target frame can be obtained using the reconstructed image and the difference image even for the large difference between the reconstructed image and the target frame.

In generating the reconstructed image according to the coding method of the present exemplary embodiment, for example, the associated image is acquired from the server through the network.

Therefore, the associated image indicating the form of the vehicle, which is associated with the classification name such as the vehicle type, can easily be acquired, and the reconstructed image can properly be generated.

In the present exemplary embodiment, the difference image and the like are included in the coded information such that the input image is finally restored from the coded information to an original condition. Alternatively, the difference image and the like need not to be included in the coded information. That is, only the metadata (meta-information) is included in the coded information, but the input image needs not to be finally restored from the coded information to the original condition. For example, coding apparatus 100 of the present exemplary embodiment generates the coded information including only the metadata (meta-information) when the user of coding apparatus 100 does not want to restore the input image from the coded information to the original condition. Therefore, the processing amount of the coding apparatus 100 and the data amount of the generated coded information can be decreased.

Code generator 160 of coding apparatus 100 may further decrease the data amount of the coded information by compressing the coded information. At this point, code generator 160 compresses information such as the metadata through reversible compression processing such as entropy coding. Coding apparatus 100 may compress the difference image by a general image compression technique. Coding apparatus 100 may compress each piece of information included in the coded information by a compression technique suitable for the information. Therefore, the data amount of the coded information can properly be decreased.

In the present exemplary embodiment, the basic code sequence is generated in each frame which is the input image. Alternatively, the basic code sequence may be generated only with respect to the frame in which the metadata is extracted. In this case, the information about the estimation technique for the frame in which the metadata is not extracted is added to the basic code sequence of the frame in which the metadata is extracted.

Second Exemplary Embodiment

Figure 25:
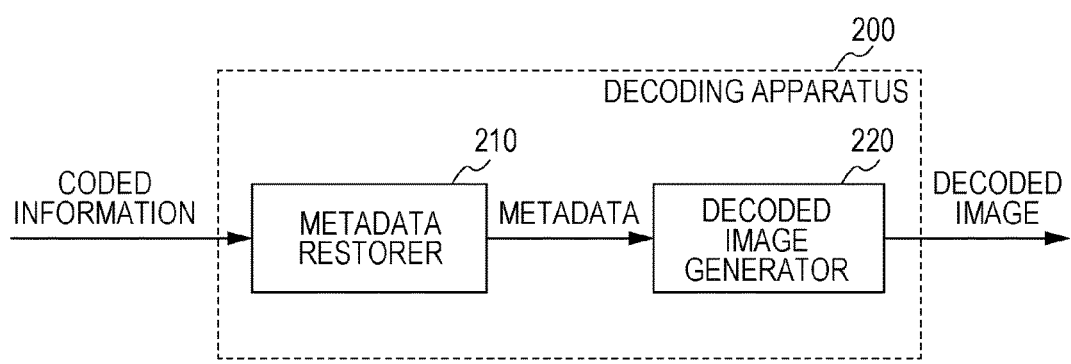
FIG. 25 is a block diagram illustrating a configuration of a decoding apparatus according to a second exemplary embodiment.

FIG. 25 is a block diagram illustrating a configuration of a decoding apparatus according to the present exemplary embodiment.

Decoding apparatus 200 generates the decoded image by decoding the coded information in FIG. 24 generated by coding apparatus 100. In the case where the coded information exists in each frame by coding the moving image, decoding apparatus 200 generates the decoded moving image by decoding each piece of coded information.

Decoding apparatus 200 includes metadata restorer 210 that restores the metadata from the coded information and decoded image generator 220 that generates the decoded image using the restored metadata.

Figure 26:
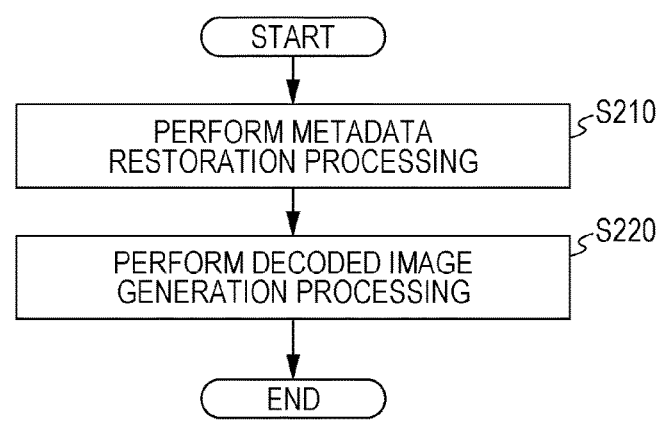
FIG. 26 is a flowchart illustrating a whole processing operation of the decoding apparatus of the second exemplary embodiment.

FIG. 26 is a flowchart illustrating a whole processing operation of decoding apparatus 200.

Metadata restorer 210 performs metadata restoration processing of restoring the metadata in each frame from a bit stream generated by coding at least one still image or moving image (step S210). The bit stream includes at least one piece of coded information of the first exemplary embodiment. Then, decoded image generator 220 performs decoded image generation processing of generating the decoded image according to the restored metadata (step S220).

Decoding apparatus 200 needs not to receive all the pieces of coded information in FIG. 24. In this case, decoding apparatus 200 can switch the display mode according to a stage (hierarchy) of the received information. That is, decoding apparatus 200 may receive only the information up to the necessary stage. In the case where only the information necessary for decoding apparatus 200 is transmitted to decoding apparatus 200 in the pieces of coded information, the data amount of the transmitted information can be decreased.

Figure 27:
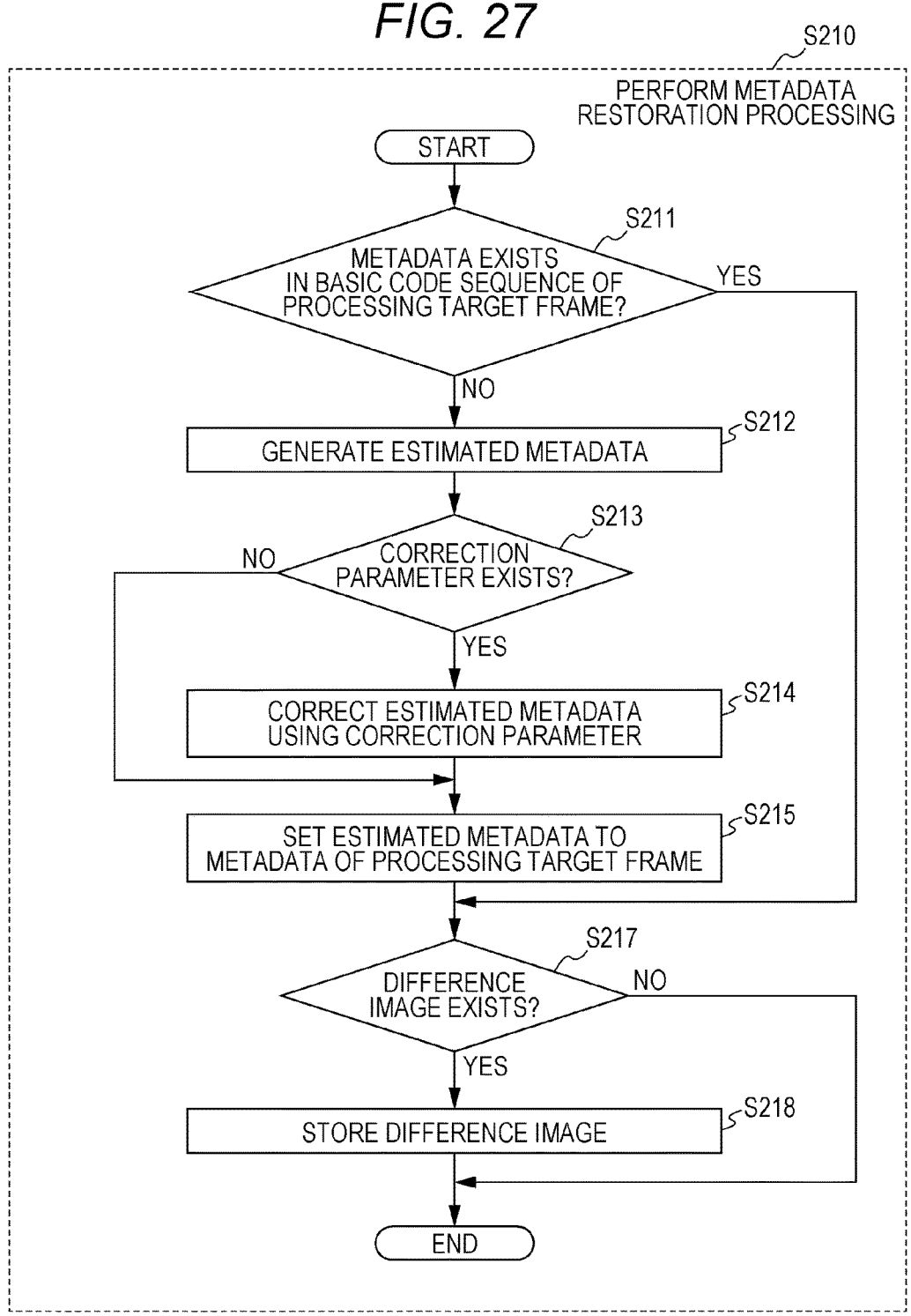
FIG. 27 is a detailed flowchart illustrating metadata restoration processing of the second exemplary embodiment.

FIG. 27 is a detailed flowchart illustrating the metadata restoration processing in step S210 of FIG. 26.

Metadata restorer 210 determines whether the metadata exists in the basic code sequence of a processing target frame included in the received coded information (step S211). When determining that the metadata does not exist in the basic code sequence (No in step S211), metadata restorer 210 estimates the metadata in the processing target frame based on the information about the estimation technique included in the basic code sequence (step S212). That is, metadata restorer 210 generates the estimated metadata. In other words, metadata restorer 210 derives at least one kind of metadata, which indicates the feature of the object included in the processing target frame and is hierarchically disposed in each kind, from the meta-information included in the coded information. The processing in step S212 is similar to the processing in step S142 of FIG. 23.

Metadata restorer 210 determines whether the correction parameter corresponding to the estimated metadata exists in the received coded information (step S213). When determining that the correction parameter exists (Yes in step S213), metadata restorer 210 corrects the estimated metadata using the correction parameter (step S214).

Metadata restorer 210 sets the estimated metadata generated in step S212 or the estimated metadata corrected in step S214 to the metadata used in the image reconstruction processing for the processing target frame (step S215). Therefore, the metadata is restored from the meta-information, which is included in the coded information (specifically, the basic code sequence) as the information about the estimation technique. When it is determined in step S211 that the metadata exists in the coded information (Yes in step S211), the metadata included in the coded information is set to the metadata used in the image reconstruction processing for the processing target frame without restoring the metadata.

Metadata restorer 210 determines whether the difference image associated with the processing target frame exists in the received coded information (step S217). When determining that the difference image exists (Yes in step S217), metadata restorer 210 stores the difference image in a memory of decoding apparatus 200 in order to use the difference image in the image reconstruction processing (step S218).

Figure 28:
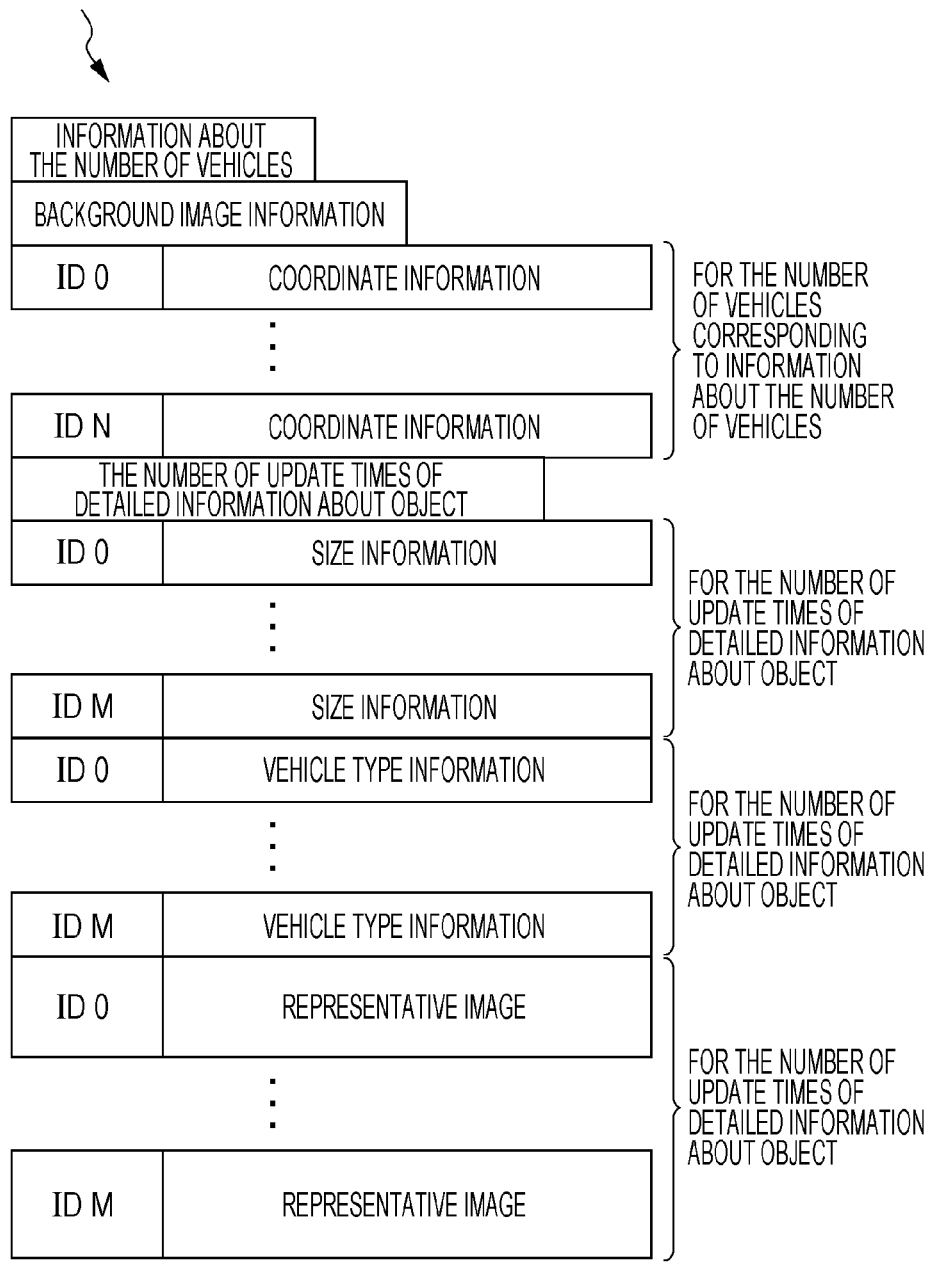
FIG. 28 is a view illustrating an example of a processing target frame metadata group restored through the metadata restoration processing of the second exemplary embodiment.

FIG. 28 is a view illustrating an example of the processing target frame metadata group restored through the pieces of processing in steps S211 to S218 of FIG. 27.

Similarly to the basic code sequence in FIG. 13, the metadata group includes the information about the number of vehicles, the background image information, the coordinate information, the size information, the vehicle type information, and the representative image as the metadata. The coordinate information, the size information, the vehicle type information, and the representative image are associated with each object ID. Similarly to the basic code sequence in FIG. 13, in the metadata group, the pieces of metadata corresponding to the kind of at least one object are collectively disposed in each hierarchical kind of metadata.

FIG. 29 is a detailed flowchart illustrating the decoded image generation processing in step S220 of FIG. 26.

Decoded image generator 220 determines whether the pieces of metadata from the information about the number of vehicles which is located at the top to the coordinate information exist in the metadata group restored in each processing target frame (step S221a). When determining that the coordinate information does not exist (No in step S221), decoded image generator 220 generates the decoded image in which the number of vehicles is presented (step S221b). On the other hand, when determining that the coordinate information exists (Yes in step S221), decoded image generator 220 determines whether the size information is included in the metadata group (step S222a). When determining that the size information is not included (No in step S222a), for example, decoded image generator 220 generates the decoded image indicating the coordinate of the object as illustrated in FIG. 3 using the background image and the pieces of metadata up to the coordinate information (step S222b). On the other hand, when determining that the size information is included (Yes in step S222a), decoded image generator 220 determines whether the vehicle type information is included in the metadata group (step S223a).

When determining that the vehicle type information is not included (No in step S223a), for example, decoded image generator 220 generates the decoded image indicating the size of the object as illustrated in FIG. 4 using the background image and the pieces of metadata up to the size information (step S223b). On the other hand, when determining that the vehicle type information is included (Yes in step S223a), decoded image generator 220 determines whether the representative image is included in the metadata group (step S224a). When determining that the representative image is not included (No in step S224a), for example, decoded image generator 220 generates the decoded image indicating the vehicle type of the object as illustrated in FIG. 5 using the background image and the pieces of metadata up to the vehicle type information (step S224b).

On the other hand, when determining that the representative image is included (Yes in step S224a), decoded image generator 220 determines whether the difference image exists in the memory (step S225). When determining that the difference image exists (Yes in step S225), decoded image generator 220 generates the decoded image using the background image, the difference image, and the pieces of metadata up to the representative image (step S227). On the other hand, when determining that the difference image does not exist (No in step S225), decoded image generator 220 generates the decoded image using the background image and the pieces of metadata up to the representative image (step S226).

In step S222b, decoded image generator 220 can use the background image, the number of objects (information about the number of objects), and the coordinate information. As illustrated in FIG. 3, decoded image generator 220 generates the decoded image in which the coordinate of the object is indicated by a mark and the like on the background image. Therefore, the detailed congestion degree on the road (which traffic lane is congested) can be visualized by the coordinate information, and the realistic decoded image can be generated compared with the decoded image in which only the information about the number of objects is presented.

In step S223b, decoded image generator 220 can further use the size information about the object. Therefore, as illustrated in FIG. 4, decoded image generator 220 generates the decoded image by superimposing a graphic having the size indicated by the size information on the coordinate of the object on the background image. At this point, for example, decoded image generator 220 superimposes the graphic such that a center of the graphic is matched with the coordinate indicated by the coordinate information. Therefore, whether the congestion on the road is caused by a large vehicle such as a truck or a compact passenger car such as a light automobile can visually be estimated from the size of the graphic in the decoded image.

In step S224b, decoded image generator 220 can further use the vehicle type information about the object. Therefore, as illustrated in FIG. 5, decoded image generator 220 generates the decoded image by superimposing a graphic, which has a size indicated by the size information and the form indicated by the vehicle type information, on the coordinate of the object on the background image. The user who sees the display of the decoded image can roughly recognize the form of the vehicle running on the road. At this point, it is not necessary that the graphic based on the vehicle type indicated by the vehicle type information agree with the image of the actually running vehicle, but the graphic may only need to be similar to the image. Therefore, decoding apparatus 200 stores the image of the vehicle corresponding to the vehicle type indicated by the vehicle type information once the image of the vehicle is used. When the vehicle type information is included in the metadata group, decoded image generator 220 selects the image of the vehicle corresponding to the vehicle type indicated by the vehicle type information from the plurality of stored images to use the image of the vehicle in the generation of the decoded image. Alternatively, decoded image generator 220 may acquire, as the associated image from the external storage such as the cloud storage, the image associated with the vehicle type indicated by the vehicle type information, and use the associated image in the generation of the decoded image. That is, decoded image generator 220 acquires the associated image from the server through the network.

In this case, the image of the vehicle corresponding to the vehicle type indicated by the vehicle type information may be stored in decoding apparatus 200 or the external storage in each travel direction or size of the vehicle. Alternatively, one image common to the travel direction and the size may be stored. In this case, decoded image generator 220 transforms the one common image according to the travel direction or size, and uses the transformed image in the generation of the decoded image. The image is used according to the travel direction or size in the technique of storing the image in each travel direction or size, so that the quality of the reconstructed image can be improved. The number of stored images can be decreased in the technique of storing the image common to each travel direction or size, so that an amount of stored information can be decreased. Unless acquiring the image or graphic according to the vehicle type information, decoded image generator 220 may superimpose the rectangular graphic on the background image as illustrated in FIG. 4. At this point, decoded image generator 220 may change a shape or color of the graphic in each vehicle type indicated by the vehicle type information irrespective of the actual form of the vehicle type.

In step S226, decoded image generator 220 can further use the representative image of the object. Therefore, as illustrated in FIG. 2, decoded image generator 220 generates the decoded image by superimposing the representative image having the size indicated by the size information on the coordinate of the object on the background image. The user who sees the display of the decoded image can more properly recognize the congestion situation on the road or the running vehicle.

When the motion model information is included in the coded information (such as basic code sequence), the decoded image may be generated using the motion model information in steps S222b, S223b, S224b, and S226. Thus, the quality of the decoded image may be improved.

For example, in the case where the processing target frame is reconstructed using the coordinate information in step S222b, namely, in the case where the decoded image is generated, decoded image generator 220 uses the motion model information. The motion model information is the information indicating that the size of the object changes according to the coordinate such that the size of the object is reduced toward the depth of the image. Using the motion model information together with the coordinate information, decoded image generator 220 generates the decoded image including the rectangular image in which the size varies according to the coordinate as illustrated in FIG. 6.

A system that detects a face can be cited as another specific example. In the system, the coding apparatus transmits the image, and the coordinate information obtained by detecting the face from the image, and the decoding apparatus displays a quadrangular frame indicating a face area in the coordinate indicated by the coordinate information on the image. In this case, it is necessary for the coding apparatus to transmit four kinds of pieces of metadata (coordinate x, coordinate y, width, and height) indicating the coordinate information and a face size (size information). In the image obtained by imaging using the fixed camera, there is a motion model in which the size of the subject is reduced toward the depth of the image. In transmitting the information indicating the motion model, namely, the motion model information, when the four kinds of pieces of metadata in the predetermined face area are transmitted once, the coding apparatus may only need to transmit only the coordinate information which is the two kinds of the pieces of metadata with respect to the face area. In this case, the decoding apparatus calculates the size (width and height) of the face area using the coordinate information and the motion model information. Therefore, the data amount of the coded information transmitted from the coding apparatus can be decreased.

For the width and the height, any fixed value is stored in the motion model information according to the coordinate information, which allows the transmission of only the coordinate information as the metadata. As a result, the data amount of the coded information can further be decreased. Additionally, a context of each object can be estimated in superimposition of the image. As a result, it is not necessary to transmit the information about the context in units of objects or frames, so that the data amount of the coded information can be decreased. In the case where the graphic such as the rectangle is displayed as illustrated in FIG. 7, the graphic may be displayed by drawing the graphic in different colors according to another piece of metadata such as the congestion situation or the information estimable from the metadata. Therefore, the information, such as a congestion area or a dangerous area, which is to be particularly recognized by the user, can be displayed with emphasis. As a result, the time for the user to see the image necessary for understanding of the situation can be shortened. That is, the user can be notified of the information even in an environment, such as display of a car navigation system, in which gaze of the image is not recommended.

Summary of Second Exemplary Embodiment

As described above, the decoding method of the present exemplary embodiment is the decoding method for decoding the coded moving image in each piece of coded information corresponding to the frame. In the decoding method, the background image of the target frame (the above processing target frame) is specified from the background image information included in the coded information. At least one kind of metadata, which indicates the feature of the object included in the target frame and is hierarchically disposed in each kind, is derived from the meta-information included in the coded information. For example, the at least one kind of metadata is the metadata group. Specifically, as described above, metadata restorer 210 restores the metadata group to derive the at least one kind of metadata. In the decoding method of the present exemplary embodiment, the decoded image is generated by superimposing the one object expressed by the at least one kind of metadata on the specified background image. At this point, the metadata indicates the feature of the at least one object included in the target frame.

For example, the kind belonging to the first hierarchy in the coded information is the coordinate of the object in the target frame, and the kind belonging to the second hierarchy is the size of the object in the target frame. For example, the kind belonging to a third hierarchy in the coded information is a classification name of a subject that is projected as the object in the target frame.

Therefore, the coded information in which the data amount is suppressed, namely, what is called scalability is ensured can properly be decoded according to the level required for the decoded image.

In the decoding method of the present exemplary embodiment, for example, as illustrated in FIGS. 2 to 7, the decoded image is generated by superimposing the object having a different abstraction level in each hierarchy of the metadata on the background image. In the decoding method of the present exemplary embodiment, for example, as illustrated in FIG. 28, the meta-information further includes the total number of objects included in the target frame.

In deriving the at least one kind of metadata of the present exemplary embodiment, the metadata is derived by estimating the metadata using the information about the estimation technique, the information being included in the coded information as the meta-information. For example, in estimating the metadata, the coordinate of the metadata is estimated by performing the interpolation or extrapolation on the coordinate of the identical object in at least one reference frame included in the coded moving image. For example, in estimating the metadata, the motion model information indicating the changes in spatial position and size of the object in the coded moving image is extracted from the coded information. The coordinate which is the metadata and the size which is the metadata of another kind of the at least one kind of metadata are estimated based on the interpolation or extrapolation and the motion model information.

Therefore, the coded information in which the data amount is further decreased can properly be decoded.

In deriving the at least one kind of metadata of the present exemplary embodiment, as illustrated in FIG. 27, whether the correction parameter exists in the coded information is determined, and the metadata is derived by correcting the estimated metadata obtained by estimating the metadata based on the correction parameter when it is determined that the correction parameter exists in the coded information.

Therefore, the metadata can correctly be derived.

In the decoding method of the present exemplary embodiment, whether the difference image exists in the coded information is determined as illustrated in FIG. 27. In generating the decoded image, the reconstructed image is generated by superimposing the at least one object on the background image, and the difference image is added to the reconstructed image, thereby generating the decoded image. More specifically, in generating the reconstructed image, the coordinate of the object is specified by the metadata belonging to the first hierarchy, and the size of the object is specified by the metadata belonging to the second hierarchy. The associated image associated with the classification name of the subject is specified by the metadata belonging to the third hierarchy, and the background image is specified by the background image information. The reconstructed image is generated by superimposing the specified associated image having the specified size on the specified coordinate in the specified background image.

Therefore, the decoded image can be brought closer to the original image.

In generating the reconstructed image of the present exemplary embodiment, for example, the associated image is acquired from the server through the network.

Therefore, the associated image indicating the form of the vehicle, which is associated with the classification name such as the vehicle type, can easily be acquired, and the reconstructed image can properly be generated.

Thus, in the present exemplary embodiment, the coded information including the meta-information (metadata) can be decoded. The form of the object projected on the decoded image can be switched according to the content of the received coded information. As a result, the decoded image can be changed according to the environment of decoding apparatus 200 which is the reception apparatus. The data amount of the coded information about the metadata can be decreased by the interpolation processing between the pieces of metadata. The object can be changed into various display modes according to the metadata or the demand of the user. Therefore, the information that the user wants to know can properly be displayed.

It is not necessary that the motion model information be included in the coded information. For example, decoding apparatus 200 may externally acquire a parameter associated with the motion model information. For the already-known moving image dealt with by the coding apparatus 100 that generates the coded information to be input to decoding apparatus 200, the motion model information about the moving image may previously be set in decoding apparatus 200. Therefore, because the motion model information is not included in the coded information, the data amount of the coded information can be decreased.

Other Examples

While the coding method, the decoding method, the coding apparatus, and the decoding apparatus according to one or a plurality of aspects of the present disclosure have been described above based on the first and second exemplary embodiments, the present disclosure is not limited to these exemplary embodiments. The exemplary embodiments to which various modifications conceivable by a person skilled in the art are made and aspects that are made by combining elements of different exemplary embodiments may also be within the scope of the one or the plurality of aspects of the present disclosure as long as such aspects do not depart from the gist of the present disclosure.

Figure 30A:
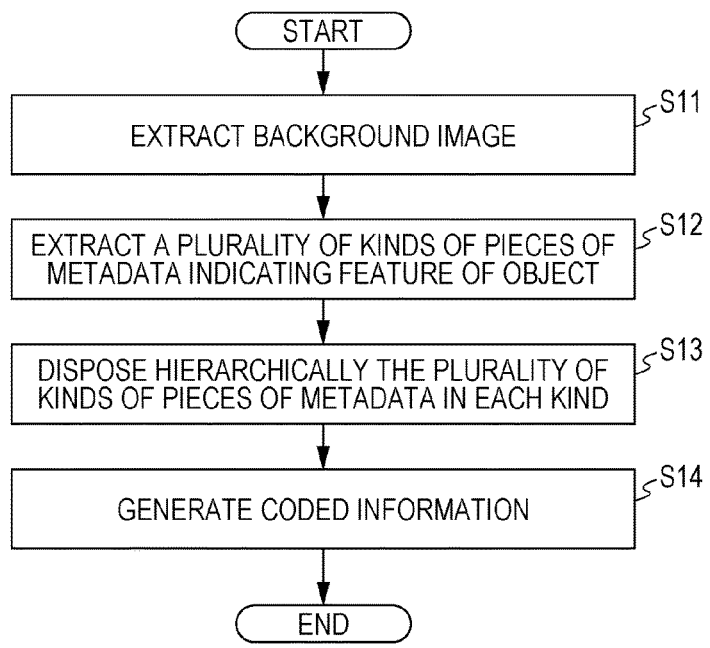
FIG. 30A is a flowchart illustrating a coding method according to one aspect of the present disclosure.
Figure 30B:
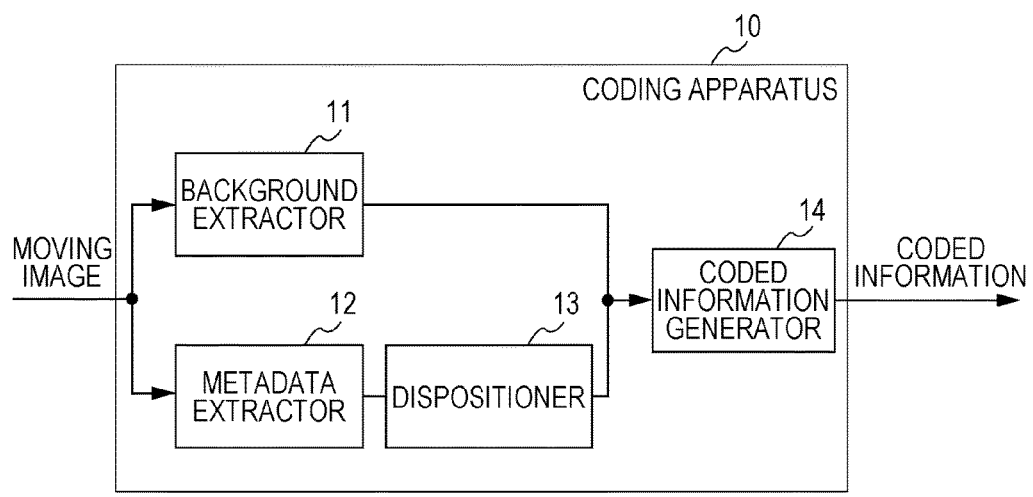
FIG. 30B is a block diagram illustrating a configuration of the coding apparatus of one aspect of the present disclosure.

The coding method and the coding apparatus according to one aspect of the present disclosure may be implemented by processing in FIG. 30A and a configuration in FIG. 30B.

FIG. 30A is a flowchart illustrating the coding method according to one aspect of the present disclosure.

The coding method according to one aspect of the present disclosure is a coding method for coding the moving image in each frame, and includes steps S11 to S14 as illustrated in FIG. 30A. In step S11, the background image is extracted from the target frame included in the moving image. In step S12, the plurality of kinds of pieces of metadata indicating the feature of at least one object included in the target frame are extracted from the target frame. In step S13, the plurality of kinds of pieces of metadata are hierarchically disposed in each kind. In step S14, the coded information is generated, the coded information including the background image information specifying the background image and the meta-information indicating the part of or all the pieces of metadata corresponding to the hierarchy selected from the plurality of kinds of pieces of metadata.

FIG. 30B is a block diagram illustrating the configuration of the coding apparatus of one aspect of the present disclosure.

Coding apparatus 10 of one aspect of the present disclosure is a coding apparatus that codes the moving image in each frame, and includes background extractor 11, metadata extractor 12, dispositioner 13, and coded information generator 14. Background extractor 11 extracts the background image from the processing target frame included in the moving image. Metadata extractor 12 extracts the plurality of kinds of pieces of metadata indicating the feature of at least one object included in the target frame from the target frame. Dispositioner 13 hierarchically disposes the plurality of kinds of pieces of metadata in each kind. Coded information generator 13 generates the coded information including the background image information specifying the background image, and the meta-information indicating the part of or all the pieces of metadata corresponding to the hierarchy selected from the plurality of kinds of pieces of metadata.

The processing in FIG. 30A and the configuration in FIG. 30B can also demonstrate the advantageous effect similar to that in the first exemplary embodiment can be obtained.

Figure 31A:
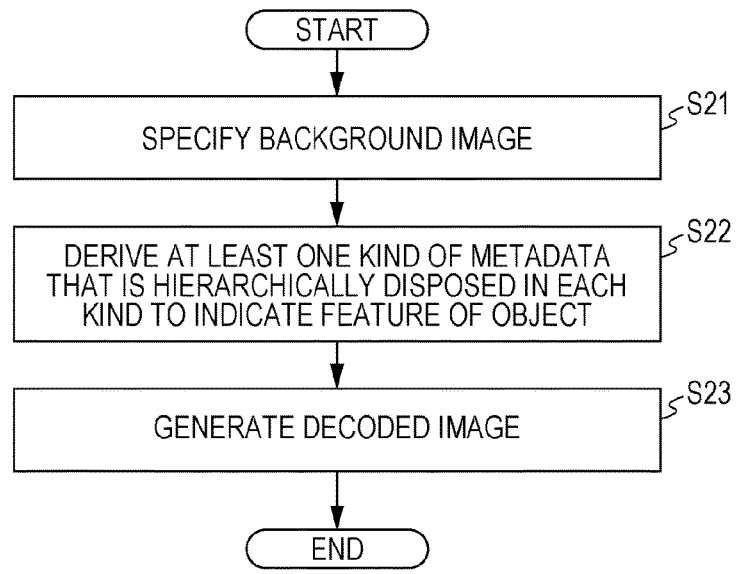
FIG. 31A is a flowchart illustrating a decoding method according to one aspect of the present disclosure.
Figure 31B:
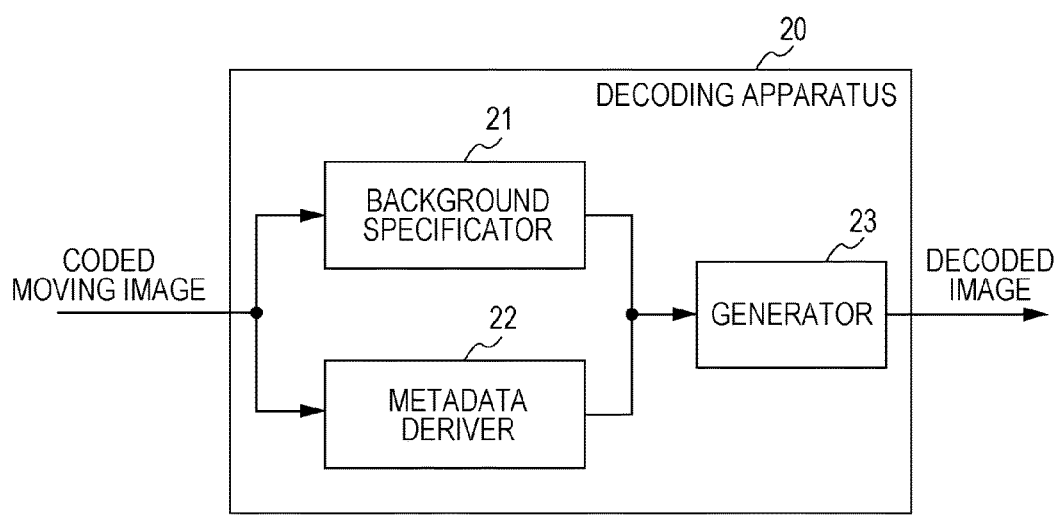
FIG. 31B is a block diagram illustrating a configuration of the decoding apparatus of one aspect of the present disclosure.

The decoding method and the decoding apparatus according to one aspect of the present disclosure are also implemented by processing in FIG. 31A and a configuration in FIG. 31B.

FIG. 31A is a flowchart illustrating the decoding method according to one aspect of the present disclosure.

The decoding method of one aspect of the present disclosure is a decoding method for decoding the coded moving image in each piece of coded information corresponding to the frame, and includes steps S21 to S23. In step S21, the background image of the target frame is specified from the background image information included in the coded information. In step S22, at least one kind of metadata, which indicates the feature of the object included in the target frame and is hierarchically disposed in each kind, is derived from the meta-information included in the coded information. In step S23, the decoded image is generated by superimposing the one object expressed by the at least one kind of metadata on the specified background image. At this point, the metadata indicates the feature of the at least one object included in the target frame.

FIG. 31B is a block diagram illustrating a configuration of the decoding apparatus according to one aspect of the present disclosure.

Decoding apparatus 20 of one aspect of the present disclosure is a decoding apparatus that decodes the coded moving image in each piece of coded information corresponding to the frame, and includes background specificator 21, metadata deriver 22, and generator 23. Background specificator 21 specifies the background image of the target frame from the background image information included in the coded information. Metadata deriver 22 derives at least one kind of metadata, which indicates the feature of the object included in the target frame and is hierarchically disposed in each kind, from the meta-information included in the coded information. Generator 23 generates the decoded image by superimposing the one object expressed by the at least one kind of metadata on the specified background image. At this point, the metadata indicates the feature of the at least one object included in the target frame.

The processing in FIG. 31A and the configuration in FIG. 31B can also demonstrate the advantageous effect similar to that in the second exemplary embodiment.

The present disclosure is not limited to the exemplary embodiments or the aspects.

For example, the present disclosure may be implemented as a content distribution method or a content distribution system for distributing the content subjected to the coding method. That is, in the content distribution method and the content distribution system, a content distribution request is received, and the content subjected to the coding method is transmitted based on the content distribution request.

Also, individual processing units included in the above coding apparatus or the decoding apparatus according to the exemplary embodiments are typically implemented as an LSI, which is an integrated circuit. These processing units may be formed as separate chips, or some or all of the processing units may be included in one chip.

Also, the circuit integration is not limited to LSI, and may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used.

In the exemplary embodiment described above, individual components may be implemented with dedicated hardware or by executing a software program suitable for the components. The individual components may be implemented as a result of a program executor such as a CPU (Central Processing Unit) or processor loading and executing a software program recorded on a recording medium, such as a hard disk or a semiconductor memory.

In other words, the coding apparatus or the decoding apparatus include processing circuitry and storage electrically connected to the processing circuitry (accessible from the processing circuitry). The processing circuitry includes at least one of dedicated hardware and a program executor. Also, the storage stores a software program to be executed by the program executor in the case where the processing circuitry includes the program executor. The processing circuitry executes the above coding method or decoding method according to the exemplary embodiments by using the storage.

Further, the exemplary embodiment of the present disclosure may be implemented by a software program or a non-transitory computer-readable recording medium storing the program thereon. Obviously, the program can be distributed via a transmission medium such as the Internet.

Also, numerical values used above are merely illustrative ones used to describe the embodiments of the present disclosure specifically, and thus the present disclosure is not limited to the illustrative numerical values.

Also, how functional blocks are divided in block diagrams is merely an example, and thus a plurality of functional blocks may be implemented as one functional block, one functional block may be divided into a plurality of functional blocks, or part of the function may be transferred to another functional block. Also, functions of a plurality of functional blocks having similar functions may be processed in parallel or in a time-divided manner by using hardware or software.

Also, the order in which steps included in the above coding method or decoding method are executed is merely an illustrative one used to describe the exemplary embodiments of the present disclosure specifically, and thus the steps may be executed in an order other than the above order. Also, some of the above steps may be executed simultaneously (in parallel) with another step.

Third Exemplary Embodiment

The processing described in each of the exemplary embodiments above can be implemented easily in a standalone computer system by recording a program for implementing the configuration of a video coding method (image coding method) or video decoding method (image decoding method) described in each exemplary embodiment on a storage medium. The storage medium may be any given type of medium capable of storing the program, such as a magnetic disk, an optical disc, a magneto-optical disk, an IC (Integrated Circuit) card, or a semiconductor memory.

Now, exemplary applications of the video coding method (image coding method) or the video decoding method (image decoding method) described in each of the exemplary embodiments and systems using them will be further described. The systems include an image coding/decoding apparatus which includes an image coding apparatus that employs the image coding method and an image decoding apparatus that employs the image decoding method. Other configurations of the systems can be changed as appropriate in accordance with the circumstances.

Figure 32:
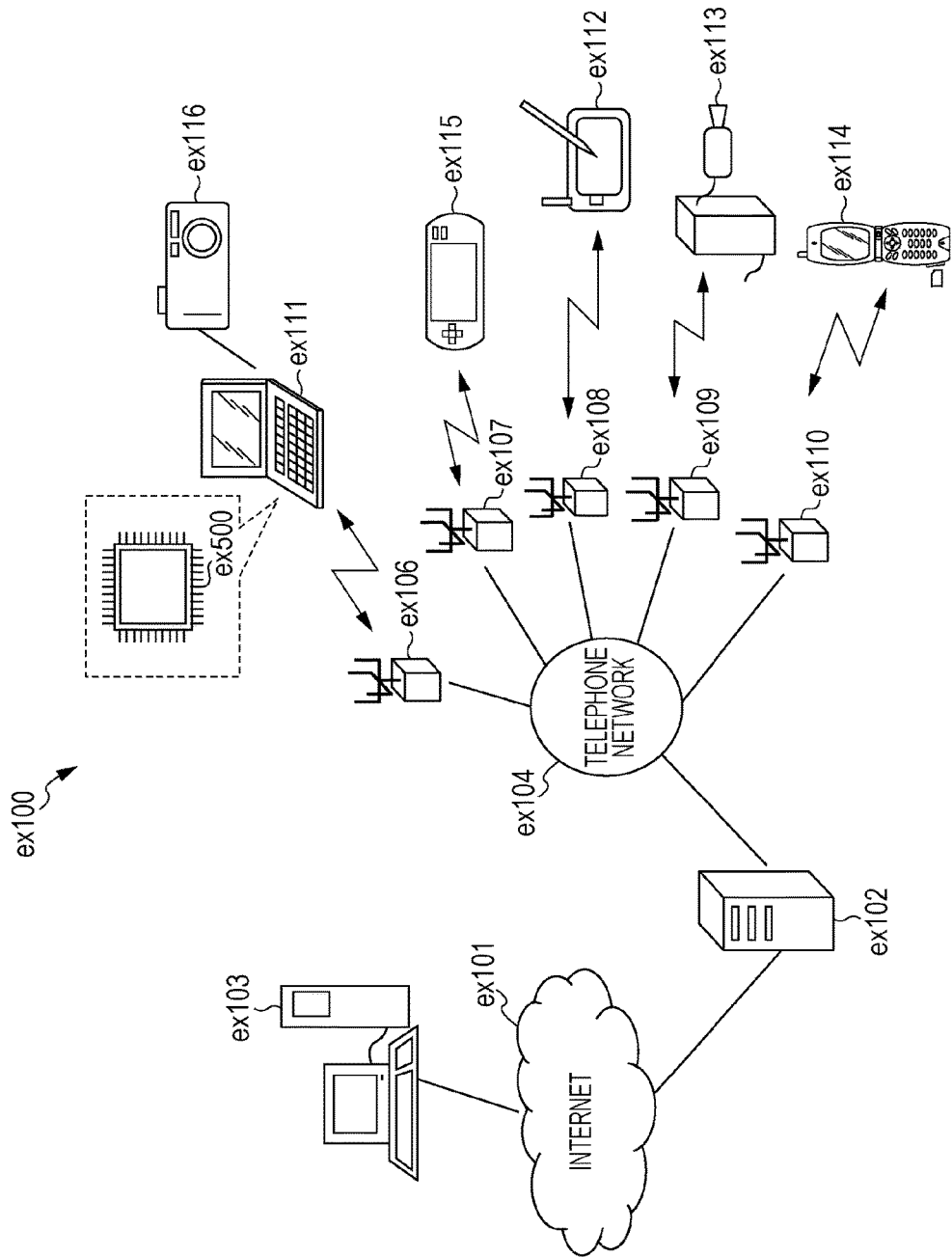
FIG. 32 is a diagram illustrating the overall configuration of a content providing system that implements content distribution services.

FIG. 32 is a diagram illustrating an overall configuration of content providing system ex100 that implements content distribution services. An area in which communication services are provided is divided into cells of a desired size. Base stations ex106, ex107, ex108, ex109, and ex110, which are fixed wireless stations, are installed in the respective cells.

In this content providing system ex100, various devices, such as computer ex111, PDA (Personal Digital Assistant) ex112, camera ex113, mobile phone ex114, game machine ex115 are connected to Internet ex101 via Internet service provider ex102, telephone network ex104, and base stations ex106 to ex110.

Note that the configuration of content providing system ex100 is not limited to the configuration illustrated in FIG. 32, and any given combination of the elements may be connected. Also, the individual devices may be directly connected to telephone network ex104 instead of via base stations ex106 to ex110 which are fixed wireless stations. Alternatively, the individual devices may be directly interconnected via near field communication or the like.

Camera ex113 is a device capable of capturing moving images, such as a digital camcorder. Camera ex116 is a device capable of capturing still images and moving images, such as a digital camera. Also, mobile phone ex114 may be any of a mobile phone based on the GSM (registered trademark) (Global System for Mobile Communications) scheme, CDMA (Code Division Multiple Access) scheme, W-CDMA (Wideband-Code Division Multiple Access) scheme, LTE (Long Term Evolution) scheme, or HSPA (High Speed Packet Access) scheme; a PHS (Personal Handyphone System); and so forth.

In content providing system ex100, camera ex113 or the like is connected to streaming server ex103 via base station ex109 and telephone network ex104. In this way, live streaming is implemented. During live streaming, the coding processing is performed on content (for example, video of a music event) obtained by the user using camera ex113 in a manner as described in each of the above-described exemplary embodiments (that is, camera ex113 functions as an image coding apparatus according to one aspect of the present disclosure) and the resulting content is transmitted to streaming server ex103. Streaming server ex103 in turn distributes the received content as a stream to a client that has made a request. Examples of the client include computer ex111, PDA ex112, camera ex113, mobile phone ex114, and game machine ex115 capable of decoding the data that has undergone the coding processing. Each device that has received the distributed data performs the decoding processing on the received data to reproduce the data (that is, the device functions as an image decoding apparatus according to one aspect of the present disclosure).

Note that the coding processing may be performed on the obtained data by camera ex113, by streaming server ex103 that performs data transmission processing, or by both of them on a processing-sharing basis. Similarly, the decoding processing may be performed on the distributed data by the client, by streaming server ex103, or by both of them on a processing-sharing basis. Also, in addition to still and/or moving image data obtained by camera ex113, still and/or moving image data obtained by camera ex116 may be transmitted to streaming server ex103 via computer ex111. In this case, the coding processing may be performed by any of camera ex116, computer ex111, and streaming server ex103, or by all of them on a processing-sharing basis.

The coding processing and the decoding processing are performed in general by LSI ex500 included in computer ex111 or each device. LSI ex500 may be formed as a single chip or a plurality of chips. Alternatively, software for video coding/decoding may be recorded on a recording medium (such as a CD-ROM, a flexible disk, or a hard disk) that is readable by computer ex111 or the like, and the coding processing and the decoding processing may be performed using the software. Further, in the case where mobile phone ex114 is equipped with a camera, moving image data obtained with the camera may be transmitted. This moving image data is data that has been coded by LSI ex500 included in mobile phone ex114.

Also, streaming server ex103 may be constituted by a plurality of servers or a plurality of computers that process, record, and distribute data in a distributed manner.

In the above-described manner, content providing system ex100 allows the client to receive and reproduce coded data. Accordingly, content providing system ex100 allows the client to receive, decode, and reproduce information transmitted by a user in real time, and thus allows a user not having a special right or equipment to implement personal broadcasting.

Figure 33:
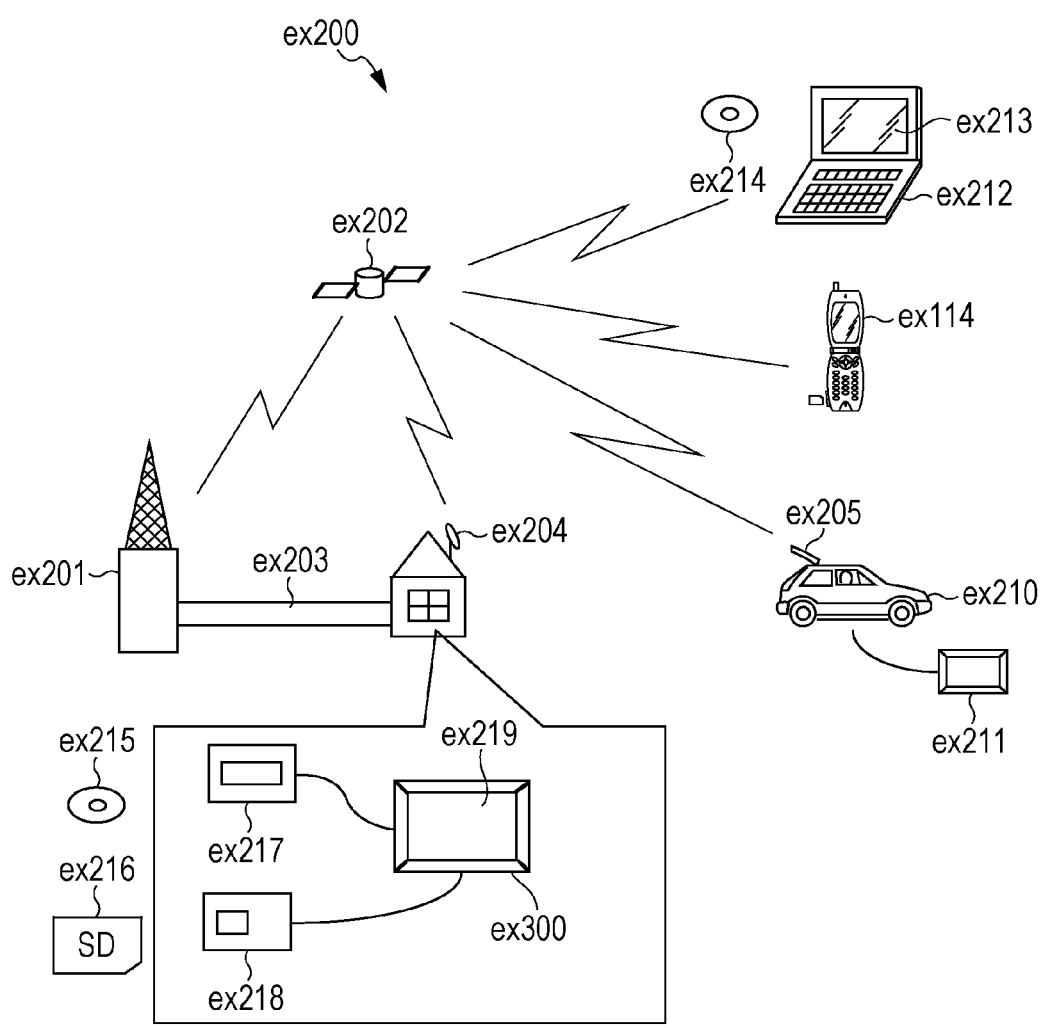
FIG. 33 is a diagram illustrating the overall configuration of a digital broadcasting system.

In addition to the example of content providing system ex100, at least one of the video coding apparatus (image coding apparatus) and the video decoding apparatus (image decoding apparatus) according to each of the above-described exemplary embodiments can be incorporated in digital broadcasting system ex200 as illustrated in FIG. 33. Specifically, broadcasting station ex201 transmits a radio wave of multiplexed data obtained by multiplexing video data, music data, and the like, via communication to broadcasting satellite ex202. This video data is data coded using the video coding method described in each of the above-described exemplary embodiments (that is, data coded by the image coding apparatus according to one aspect of the present disclosure). Upon receipt of this data, broadcasting satellite ex202 transmits a broadcasting radio wave, and home antenna ex204 capable of receiving satellite broadcasting receives this radio wave. An apparatus such as television (receiver) ex300 or set top box (STB) ex217 decodes and reproduces the received multiplexed data (that is, the apparatus functions as the image decoding apparatus according to one aspect of the present disclosure).

Also, the video decoding apparatus or the video coding apparatus described in each of the above-described exemplary embodiments can be implemented in reader/recorder ex218 that reads and decodes the multiplexed data recorded on recording medium ex215 such as a DVD (Digital Versatile Disc) or a BD (Blu-ray Disc); or that codes a video signal and further multiplexes a music signal with the video signal depending on circumstances, and writes the resulting signal on recording medium ex215. In this case, the reproduced video signal is displayed on monitor ex219, and the video signal can be reproduced by another apparatus or system using recording medium ex215 having the multiplexed data recorded thereon. Alternatively, the video decoding apparatus may be implemented in set top box ex217 connected to cable ex203 for cable television or home antenna ex204 for satellite/terrestrial broadcasting, and the video signal may be displayed on monitor ex219 of television ex300. At this time, the video decoding apparatus may be incorporated into television ex300 instead of set top box ex217.

Figure 34:
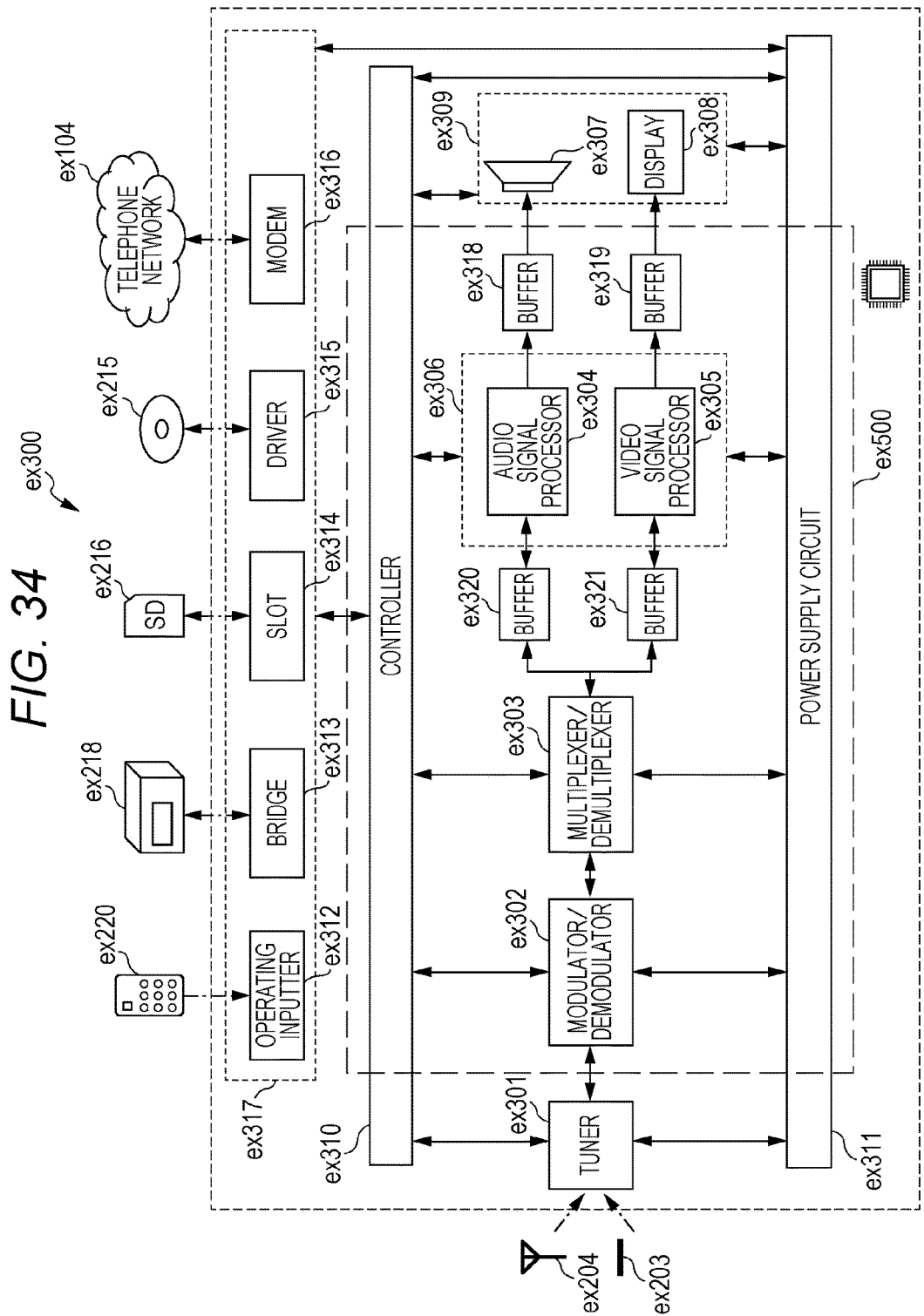
FIG. 34 is a block diagram illustrating an example of a configuration of a television.

FIG. 34 is a diagram illustrating television (receiver) ex300 that employs the video decoding method and the video coding method described in each of the exemplary embodiments above. Television ex300 includes tuner ex301 that obtains or outputs, via antenna ex204 or cable ex203 that receives broadcasting, multiplexed data in which video data and audio data are multiplexed together; modulator/demodulator ex302 that performs demodulation on the received multiplexed data or modulation on multiplexed data to be transmitted to outside; and multiplexer/demultiplexer ex303 that demultiplexes the demodulated multiplexed data into video data and audio data, or multiplexes video data and audio data that have been coded by signal processor ex306.

Television ex300 also includes signal processor ex306 and outputter ex309. Signal processor ex306 includes audio signal processor ex304 that decodes or codes audio data, and video signal processor ex305 that decodes or codes video data (video signal processor ex305 functions as the image coding apparatus or the image decoding apparatus according to one aspect of the present disclosure). Outputter ex309 includes speaker ex307 that outputs the decoded audio signal, and display ex308, such as a display, that displays the decoded video signal. Television ex300 further includes interface ex317 which includes operation inputter ex312 that accepts input of a user operation. Television ex300 further includes controller ex310 that controls the individual units in an integrated manner, and power supply circuit ex311 that supplies electric power to the individual units. Interface ex317 may include bridge ex313 to be connected to an external device, such as reader/recorder ex218; slot ex314 that enables connection of recording medium ex216 such as an SD card; driver ex315 for connection to external recording medium ex215, such as a hard disk; and modem ex316 for connection to telephone network ex104 as well as operation inputter ex312. Note that recording medium ex216 is capable of electrically storing information by using a nonvolatile/volatile semiconductor memory included therein. The individual units of television ex300 are connected to one another via a synchronization bus.

First, a configuration that allows television ex300 to decode and reproduce multiplexed data obtained from outside with antenna ex204 or the like will be described. Television ex300 receives a user operation from remote control ex220 or the like. Based on control performed by controller ex310 including a CPU or the like, multiplexer/demultiplexer ex303 demultiplexes multiplexed data that has been demodulated by modulator/demodulator ex302. Further, in television ex300, audio signal processor ex304 decodes the separated audio data and video signal processor ex305 decodes the separated video data by using the image decoding method described in each of the above exemplary embodiments. Further, the decoded audio signal and video signal are output to outside from outputter ex309. When the audio signal and the video signal are output, these signals may be temporarily stored in buffers ex318 and ex319 or the like so that they are reproduced in synchronization with each other. Also, television ex300 may read multiplexed data from recording media ex215 and ex216 such as a magnetic/optical disc and an SD card as well as from broadcasting. Next, a configuration that allows television ex300 to code an audio signal and a video signal and to transmit the resulting signals to outside or write the resulting signals on a recording medium or the like will be described. Television ex300 receives a user operation from remote control ex220 or the like. Based on control performed by controller ex310, audio signal processor ex304 codes the audio signal, and video signal processor ex305 codes the video signal by using the image coding method described in each of the above exemplary embodiments. The coded audio signal and video signal are multiplexed by multiplexer/demultiplexer ex303 and the resulting multiplexed signal is output to outside. When the audio signal and the video signal are multiplexed, these signals may be temporarily stored in buffers ex320 and ex321 or the like so that they are synchronized with each other. Note that a plurality of buffers may be provided as illustrated as buffers ex318, ex319, ex320, and ex321; or one or more buffers may be shared. Further, in addition to the illustrated buffers, for example, data may be stored in a buffer that serves as a buffering member for avoiding an overflow or underflow in the system between modulator/demodulator ex302 and multiplexer/demultiplexer ex303 or the like.

Television ex300 may also include a configuration for receiving audio/video input of a microphone or a camera in addition to the configuration for obtaining audio data and video data from broadcasting, a recording medium, or the like; and may perform the coding processing on the data obtained therefrom. Although television ex300 has been described as the configuration capable of performing the above-described coding processing, multiplexing, and outputting to outside, television ex300 may be a configuration incapable of performing these pieces of processing and only capable of the reception, decoding processing, and outputting to outside.

In the case where multiplexed data is read from and written to a recording medium by reader/recorder ex218, the decoding processing or the coding processing may be performed by television ex300, by reader/recorder ex218, or by both television ex300 and reader/recorder ex218 on a processing-sharing basis.

Figure 35:
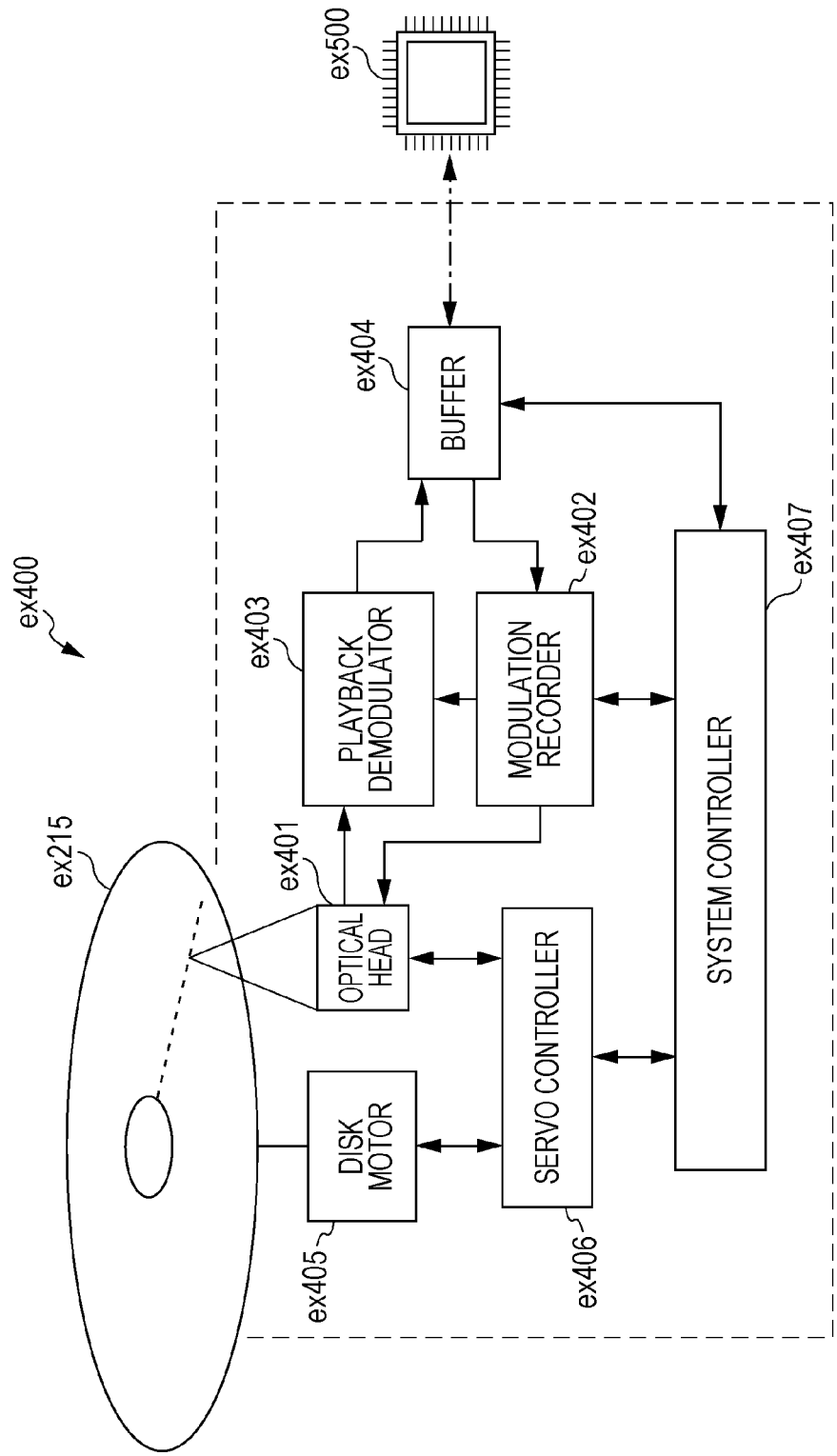
FIG. 35 is a block diagram illustrating an example of a configuration of an information reproducer/recorder that reads information from and writes information to a recording medium which is an optical disc.

FIG. 35 illustrates an example of a configuration of information reproducer/recorder ex400 in the case of reading data from and writing data to an optical disc. Information reproducer/recorder ex400 includes optical head ex401, modulation recorder ex402, reproduction demodulator ex403, buffer ex404, disc motor ex405, survo controller ex406, and system controller ex407. Optical head ex401 irradiates a recording surface of recording medium ex215, which is an optical disc, with a laser spot to write information thereon; and detects reflected light from the recording surface of recording medium ex215 to read information. Modulation recorder ex402 electrically drives a semiconductor laser included in optical head ex401 to modulate a laser beam in accordance with to-be-recorded data. Reproduction demodulator ex403 amplifies a reproduced signal which is obtained by electrically detecting reflected light from the recording surface by a photodetector included in optical head ex401, separates and demodulates signal components recorded on recording medium ex215, and reproduces necessary information. Buffer ex404 temporarily stores information to be recorded on recording medium ex215 and information reproduced from recording medium ex215. Disc motor ex405 rotates recording medium ex215. Survo controller ex406 moves optical head ex401 to a certain information track while controlling rotational driving of disc motor ex405 to perform laser spot tracking processing. System controller ex407 controls information reproducer/recorder ex400. The above-described reading processing and writing processing are implemented as a result of system controller ex407 performing recording/reproduction of information via optical head ex401 while causing modulation recorder ex402, reproduction demodulator ex403, and survo controller ex406 to operate in cooperation with one another and using various pieces of information held in buffer ex404 and generating/adding new information as needed. System controller ex407 includes, for example, a microprocessor and performs the pieces of processing by executing a read/write program.

Although optical head ex401 that irradiates the recording surface with a laser spot has been described above, optical head ex401 may include a configuration for performing high-density recording using near field light.

Figure 36:
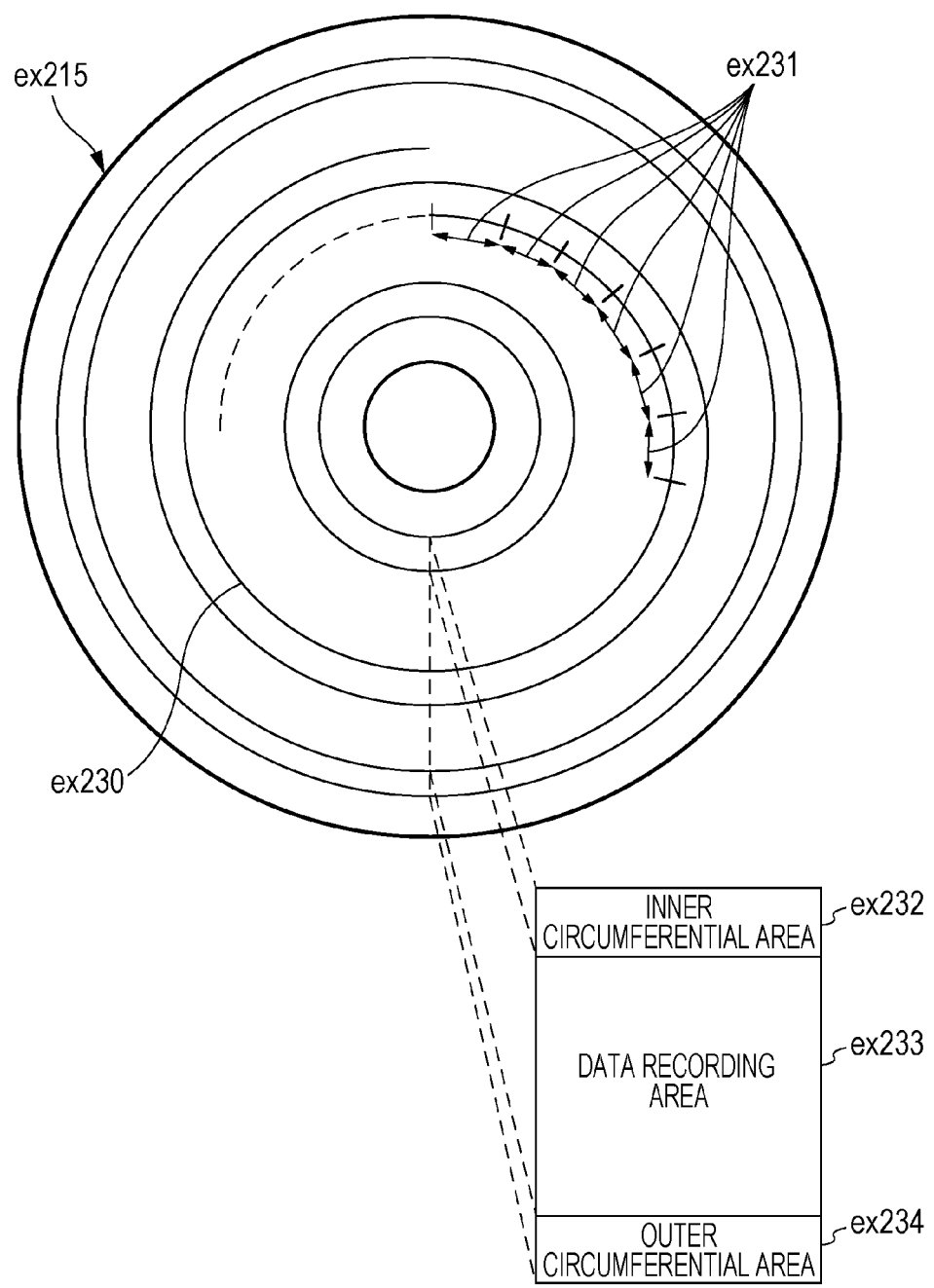
FIG. 36 is a diagram illustrating an example of a structure of an optical disc recording medium.

FIG. 36 is a schematic diagram of recording medium ex215 which is an optical disc. On the recording surface of recording medium ex215, a guide groove (groove) is spirally formed. In information track ex230, address information that represents an absolute position on the disc is pre-recorded by a change in the shape of the groove. This address information includes information identifying positions of recording blocks ex231 which are units in which data is recorded. A recording/reproducing apparatus can identify a recording block by reproducing information track ex230 and reading the address information. Also, recording medium ex215 includes data recording area ex233, inner circumference area ex232, and outer circumference area ex234. Data recording area ex233 is an area used for recording user data. Inner circumference area ex232 and outer circumference area ex234 that are located on the inner side and the outer side of data recording area ex233, respectively, are used for purposes other than recording of user data. Information reproducer/recorder ex400 performs reading/writing of coded audio data, coded video data, or multiplexed data of these pieces of data on data recording area ex233 of recording medium ex215 thus configured.

The description has been given using a single-layer optical disc such as a DVD or BD by way of example above, the optical disc used is not limited to such a disc and may be a multi-layered optical disc for which recording can be performed on part other than the surface. Alternatively, the optical disc used may be an optical disc on which multi-dimensional recording/reproduction can be performed by recording information at the same position of the disc using light of various waveforms different from one another, by recording information on different layers at various angles, or the like.

In addition, in digital broadcasting system ex200, data may be received by vehicle ex210 equipped with antenna ex205 from broadcasting satellite ex202 or the like and a moving image may be reproduced on a display device of car navigation system ex211 mounted on vehicle ex210. Note that the configuration illustrated in FIG. 34 additionally including a GPS receiver is conceivable as the configuration of car navigation system ex211, and the same applies to computer ex111, mobile phone ex114, or the like.

Figure 37A:
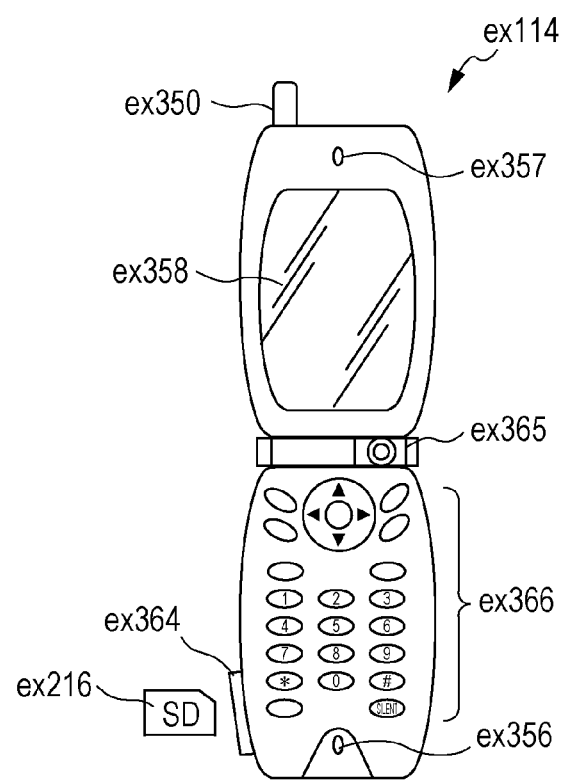
FIG. 37A is a diagram illustrating an example of a mobile phone.

FIG. 37A is a diagram illustrating mobile phone ex114 that employs the video decoding method and the video coding method described in the above exemplary embodiments. Mobile phone ex114 includes antenna ex350 that transmits and receives a radio wave to and from base station ex110; camera ex365 capable of capturing video and still images; and display ex358, such as a liquid crystal display, that displays the video captured by camera ex365 and data obtained by decoding video or the like received with antenna ex350. Mobile phone ex114 further includes a body including operation key ex366; audio outputter ex357 such as a speaker for outputting audio; audio inputter ex356 such as a microphone for inputting audio; memory ex367 that stores coded data or decoded data of captured video, captured still images, recorded audio, received video, received still images, or received emails; and slot ex364 which is an interface to a recording medium which similarly stores data thereon.

Figure 37B:
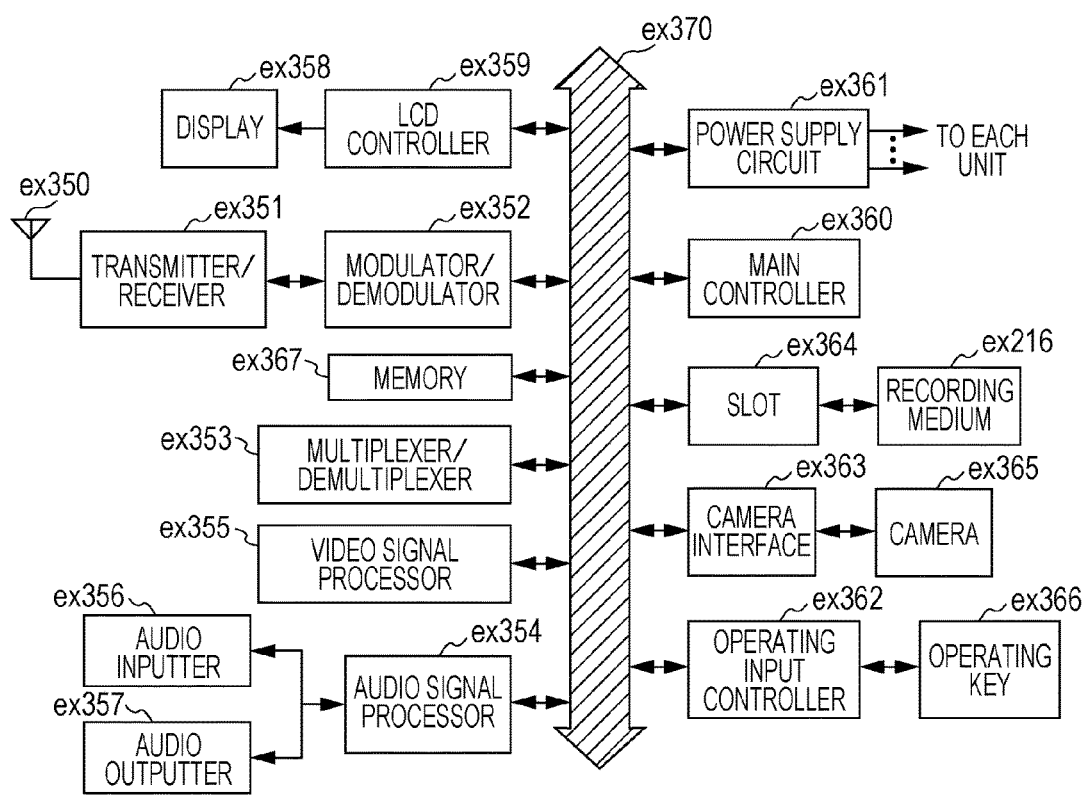
FIG. 37B is a block diagram illustrating an example of a configuration of the mobile phone.

Further, an example of a configuration of mobile phone ex114 will be described with reference to FIG. 37B. Mobile phone ex114 includes main controller ex360 that controls individual units of the body which includes display ex358 and operation key ex366 in an integrated manner. Mobile phone ex114 also includes power supply circuit ex361, operation input controller ex362, video signal processor ex355, camera interface ex363, LCD (Liquid Crystal Display) controller ex359, modulator/demodulator ex352, multiplexer/demultiplexer ex353, audio signal processor ex354, slot ex364, and memory ex367 which are connected to main controller ex360 via bus ex370.

When an on-hook/power key is turned on through a user operation, power supply circuit ex361 supplies electric power to individual units from a battery pack to activate mobile phone ex114 into an operable state.

In mobile phone ex114, in a voice call mode, audio signal processor ex354 converts an audio signal obtained by audio inputter ex356 into a digital audio signal, modulator/demodulator ex352 performs spread spectrum processing on this digital audio signal, and transmitter/receiver ex351 performs digital-to-analog conversion processing and frequency conversion processing on this signal and then transmits the resulting signal via antenna ex350 in accordance with control performed by main controller ex360 which includes a CPU, a ROM, and a RAM. Also, in mobile phone ex114, in the voice call mode, transmitter/receiver ex351 amplifies reception data received via antenna ex350 and performs frequency conversion processing and analog-to-digital conversion processing, modulator/demodulator ex352 performs spread spectrum processing on the resulting signal, audio signal processor ex354 converts the resulting signal into an analog audio signal. The analog audio signal is then output from audio outputter ex357.

In the case where an email is transmitted in a data communication mode, text data of the email input through operation of operation key ex366 of the body or the like is sent to main controller ex360 via operation input controller ex362. Main controller ex360 performs control such that modulator/demodulator ex352 performs spread spectrum processing on the text data and transmitter/receiver ex351 performs digital-to-analog conversion processing and frequency conversion processing on the text data and then transmits the resulting text data to base station ex110 via antenna ex350. In the case of receiving an email, substantially the opposite processing is performed on the received data, and the resulting text data is output to display ex358.

In the case where video, a still image, or a combination of video and audio are transmitted in the data communication mode, video signal processor ex355 compresses and codes a video signal supplied from camera ex365 by using the video coding method described in each of the above exemplary embodiments (that is, video signal processor ex355 functions as the image coding apparatus according to one aspect of the present disclosure), and sends the coded video data to multiplexer/demultiplexer ex353. Also, audio signal processor ex354 codes an audio signal obtained by audio inputter ex356 while the video, still image, or the like is being captured by camera ex365, and sends the coded audio data to multiplexer/demultiplexer ex353.

Multiplexer/demultiplexer ex353 multiplexes the coded video data supplied from video signal processor ex355 and the coded audio data supplied from audio signal processor ex354 in accordance with a certain scheme. Modulator/demodulator (modulation/demodulation circuit) ex352 performs spread spectrum processing on the resulting multiplexed data. Transmitter/receiver ex351 performs digital-to-analog conversion processing and frequency conversion processing on the multiplexed data, and then transmits the resulting data via antenna ex350.

In the case of receiving data of a moving image file linked to a website or the like or an email attached with video or audio in the data communication mode, multiplexer/demultiplexer ex353 demultiplexes multiplexed data into a bitstream of video data and a bitstream of audio data in order to decode the multiplexed data received via antenna ex350. Multiplexer/demultiplexer ex353 supplies the coded video data to video signal processor ex355 and the coded audio data to audio signal processor ex354 via synchronization bus ex370. Video signal processor ex355 performs decoding using a video decoding method corresponding to the video coding method described in each of the above exemplary embodiments to decode the video signal (that is, video signal processor ex355 functions as the image decoding apparatus according to one aspect of the present disclosure). Then, for example, video or still image included in the moving image file linked to the website is displayed on display ex358 via LCD controller ex359. Also, audio signal processor ex354 decodes the audio signal, and the resulting audio is output by audio outputter ex357.

Like television ex300, three implementation forms, that is, a transmission/reception terminal including both an encoder and a decoder, a transmission terminal only including an encoder, and a reception terminal only including a decoder, are conceivable for a terminal such as mobile phone ex114. Further, the case has been described in which multiplexed data in which video data, audio data, and so forth are multiplexed is received and transmitted in digital broadcasting system ex200; however, the multiplexed data may be data in which text data related to the video is multiplexed other than audio data or video data alone may be used instead of the multiplexed data.

As described above, the video coding method or the video decoding method described in each of the above exemplary embodiments is applicable to any of the aforementioned devices and systems. In such a way, advantages described in each of the above exemplary embodiments can be obtained.

Also, the present disclosure is not limited to the exemplary embodiments above, and various modifications and corrections can be made without departing from the scope of the present disclosure.

Fourth Exemplary Embodiment

Video data can also be generated by switching between the video coding method or apparatus described in each of the above exemplary embodiments and a video coding method or apparatus based on a different standard, such as MPEG-2, MPEG-4 AVC, or VC-1 as appropriate.

In the case where a plurality of pieces of video data based on different standards are generated, a decoding method corresponding to each of the standards needs to be selected at the time of decoding. However, because which standard the to-be-decoded video data is based on is not identifiable, it is challenging to select an appropriate decoding method.

To deal with such a challenge, multiplexed data in which audio data or the like is multiplexed with video data is configured to include identification information that indicates which standard the video data is based on. A specific structure of multiplexed data including video data that is generated using the video coding method or apparatus described in each of the above exemplary embodiments will be described below. Multiplexed data is a digital stream in the MPEG-2 transport stream formant.

FIG. 38 is a diagram illustrating a structure of multiplexed data. As illustrated in FIG. 38, multiplexed data is obtained by multiplexing one or more of a video stream, an audio stream, a presentation graphics stream (PG), and an interactive graphics stream. The video stream represents a main video and a sub video of a movie. The audio stream (IG) represents a main audio part of the movie and sub audio to be mixed with the main audio. The presentation graphics stream represents the subtitle of the movie. Here, the main video refers to a video usually displayed on a window, whereas the sub video refers to a video displayed within the main video as a small window. The interactive graphics stream represents a dialog window created by placing GUI components on the window. The video stream is coded using the video coding method or apparatus described in each of the above exemplary embodiments and using the video coding method or apparatus compliant with an existing standard, such as MPEG-2, MPEG-4 AVC, or VC-1. The audio stream is coded using a standard, such as Dolby AC-3 (Audio Code number 3), Dolby Digital Plus, MLP (Meridian Lossless Packing), DTS (Digital Theater Systems), DTS-HD, or linear PCM (Pulse Code Modulation).

Each stream included in multiplexed data is identified by a PID (Packet Identifier). For example, a video stream to be used as video of a movie is assigned 0x1011. An audio stream is assigned any one of 0x1100 to 0x111F. A presentation graphics stream is assigned any one of 0x1200 to 0x121F. An interactive graphics stream is assigned any one of 0x1400 to 0x141F. A video stream to be used as sub video of the movie is assigned any one of 0x1B00 to 0x1B1F. An audio stream to be used as sub audio to be mixed with main audio is assigned any one of 0x1A00 to 0x1A1F.

Figure 39:
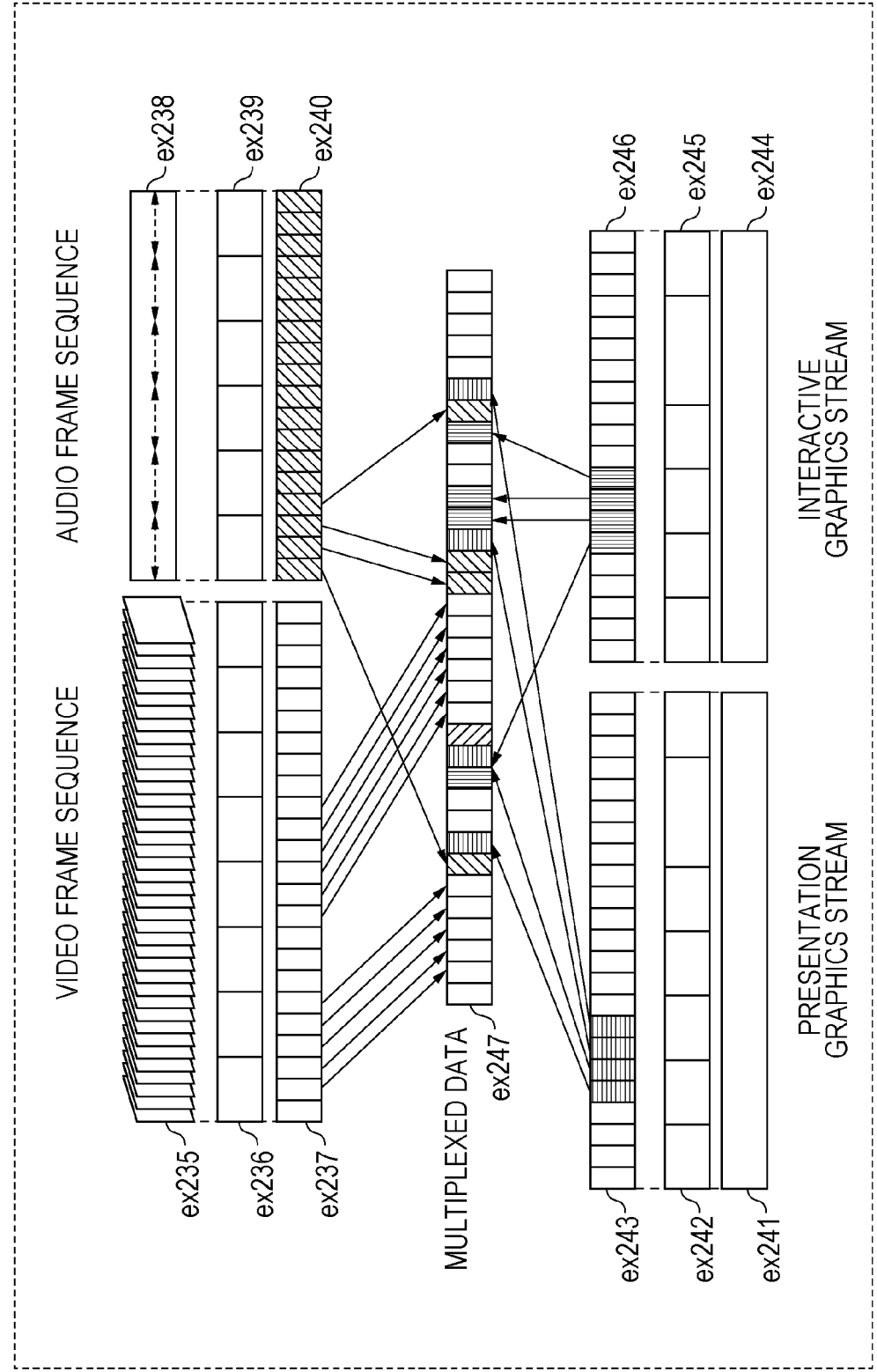
FIG. 39 is a diagram schematically illustrating how individual streams are multiplexed into multiplexed data.

FIG. 39 is a diagram schematically illustrating how individual streams are multiplexed into multiplexed data. Video stream ex235 made up of a plurality of video frames and audio stream ex238 made up of a plurality of audio frames are converted into PES (Packetized Elementary Stream) packet sequences ex236 and ex239, and then into TS (Transport Stream) packets ex237 and ex240, respectively. Likewise, data of presentation graphics stream ex241 and data of interactive graphics stream ex244 are converted into PES packet sequences ex242 and ex245, and further into TS packets ex243 and ex246, respectively. Multiplexed data ex247 is formed by multiplexing these TS packets into one stream.

Figure 40:
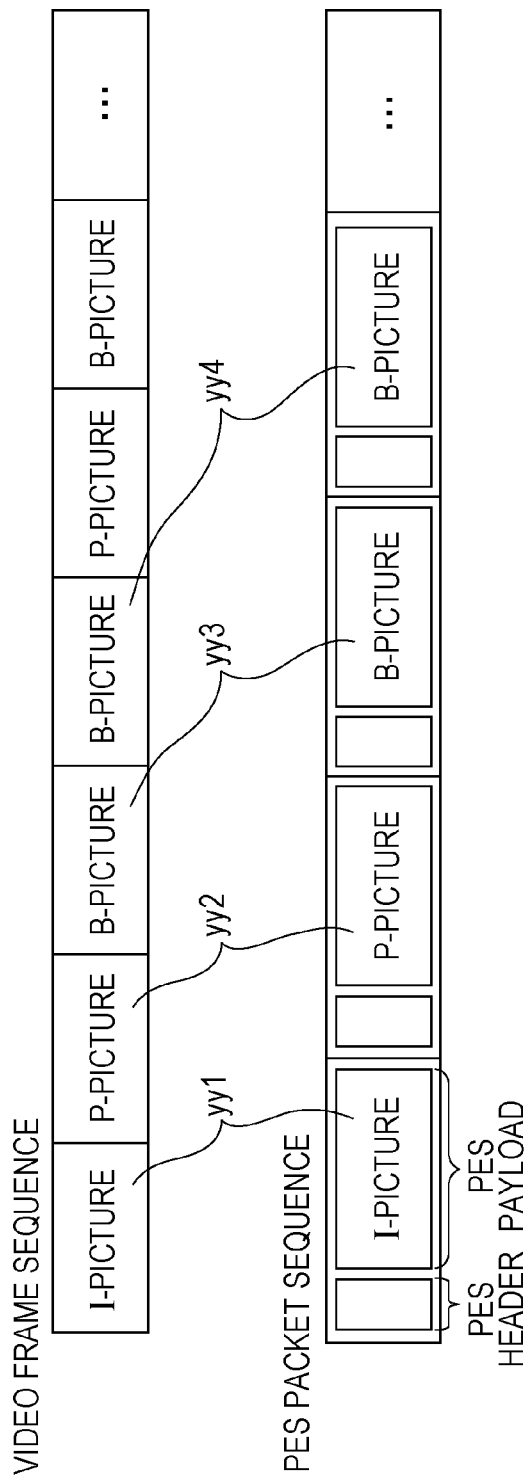
FIG. 40 is a diagram illustrating how a video stream is stored in a PES (Packetized Elementary Stream) packet sequence in a more detailed manner.

FIG. 40 illustrates how a video stream is stored in a PES packet sequence in detail. The upper row in FIG. 40 illustrates a video frame sequence of the video stream. The lower row illustrates a PES packet sequence. As denoted by arrows yy1, yy2, yy3, and yy4 in FIG. 40, I (intra)-pictures, B (bidirectional)-pictures, and P (predicted)-pictures which are a plurality of video presentation units in a video stream are separated on a picture-by-picture basis, and are stored in the payload of respective PES packets. Each PES packet includes a PES header in which PTS (Presentation Time-Stamp) that represents display time of the picture and DTS (Decoding Time-Stamp) that represents decoding time of the picture are stored.

Figure 41:
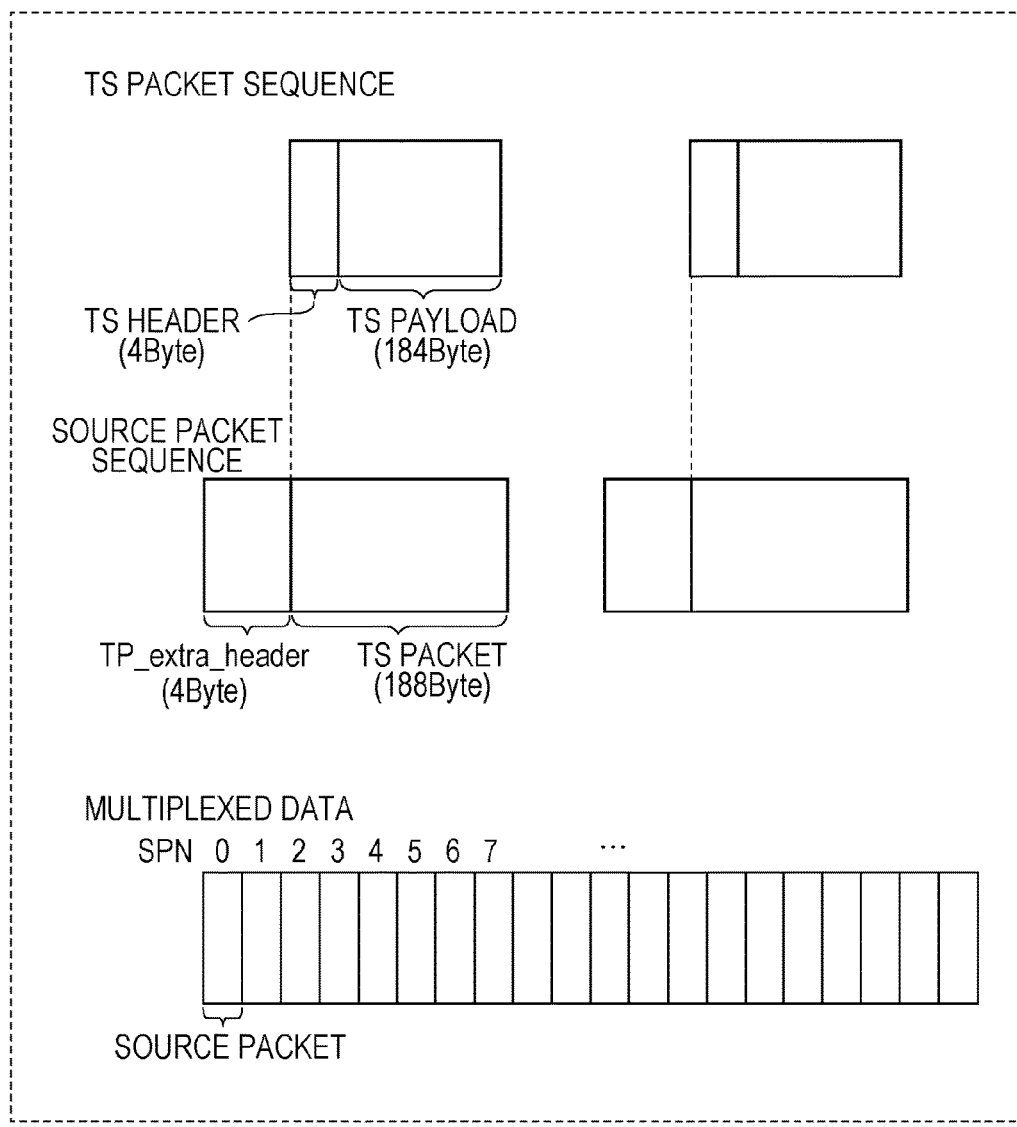
FIG. 41 is a diagram illustrating structures of a TS (Transport Stream) packet and a source packet in multiplexed data.

FIG. 41 illustrates the format of TS packets which are ultimately written in multiplexed data. A TS packet is a 188-byte fixed-length packet made up of a 4-byte TS header which includes information such as PID for identifying a stream, and a 184-byte TS payload which stores data. A PES packet is divided into portions, and these portions are stored in respective TS payloads. In the case of BD-ROM, a TS packet is attached with a 4-byte TP_Extra_Header to form a 192-byte source packet, and the source packet is written in the multiplexed data. The TP_Extra_Header includes information such as ATS (Arrival_Time_Stamp). The ATS represents the transfer start time at which transfer of the TS packet to a PID filter of a decoder is to be started. As illustrated by the lowest row in FIG. 41, source packets are arranged in the multiplexed data. The number that is incremented from the start of the multiplexed data is called SPN (Source Packet Number).

TS packets included in the multiplexed data include a PAT (Program Association Table), a PMT (Program Map Table), and a PCR (Program Clock Reference) in addition to individual streams of video, audio, subtitle, and so forth. The PAT represents the PID of the PMT used in the multiplexed data, and 0 is registered as the PID of the PAT. The PMT includes PIDs of individual streams of video, audio, subtitle, and so forth included in the multiplexed data; pieces of attribute information of the streams corresponding to the individual PIDs; and various descriptors regarding the multiplexed data. Examples of the descriptors include copy control information that indicates whether or not copying of the multiplexed data is permitted. The PCR includes information regarding STC (System Time Clock) time corresponding to the ATS at which the PCR packet is transferred to a decoder in order to achieve synchronization between ATC (Arrival Time Clock) which is the time axis for ATS and STC (System Time Clock) which is the time axis for PTS and DTS.

Figure 42:
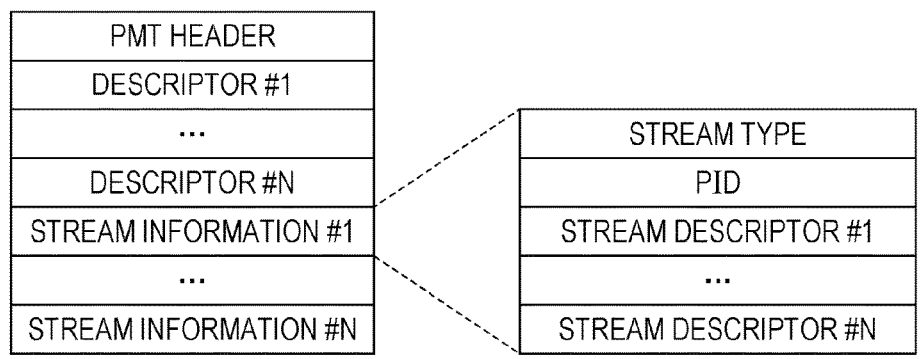
FIG. 42 is a diagram illustrating a data structure of a PMT (Program Map Table)

FIG. 42 is a diagram that describes the data structure of the PMT in detail. At the start of the PMT, a PMT header which describes the length of data included in the PMT is placed. The PMT header is followed by a plurality of descriptors regarding the multiplexed data. The copy control information and so forth are described as the descriptors. The descriptors are followed by a plurality of pieces of stream information regarding individual streams included in the multiplexed data. The stream information is made up of a stream type for identifying the compression codec of the stream or the like, the PID of the stream, and stream descriptors that describe the attribute information (such as a frame rate and an aspect ratio) of the stream. The PMT includes as many stream descriptors as the number of streams included in the multiplexed data.

In the case where the multiplexed data is recorded on a recording medium or the like, the multiplexed data is recorded together with a multiplexed data information file.

Figure 43:
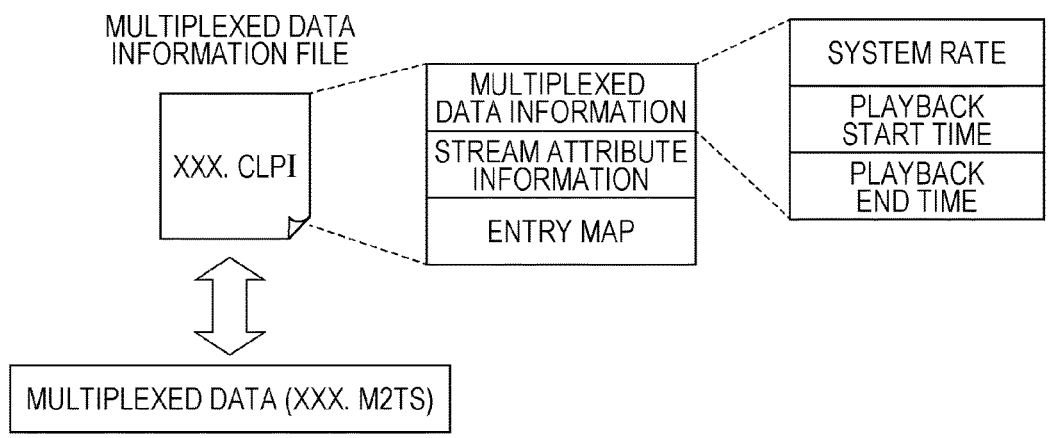
FIG. 43 is a diagram illustrating an internal structure of multiplexed data information.

As illustrated in FIG. 43, a multiplexed data information file (clip information file) contains management information of the multiplexed data, has one-to-one correspondence with the multiplexed data, and is made up of multiplexed data information (clip information), stream attribute information, and an entry map.

The multiplexed data information (clip information) is made up of the system rate, the playback start time, and the playback end time as illustrated in FIG. 43. The system rate represents the maximum transfer rate at which the multiplexed data is transferred to the PID filter of a system target decoder (described later). Intervals of the ATS included in the multiplexed data are set to be lower than or equal to the system rate. The playback start time represents the PTS of the first video frame of the multiplexed data. As the playback end time, a result obtained by adding a playback duration of one frame to the PTS of the last video frame of the multiplexed data is set.

Figure 44:
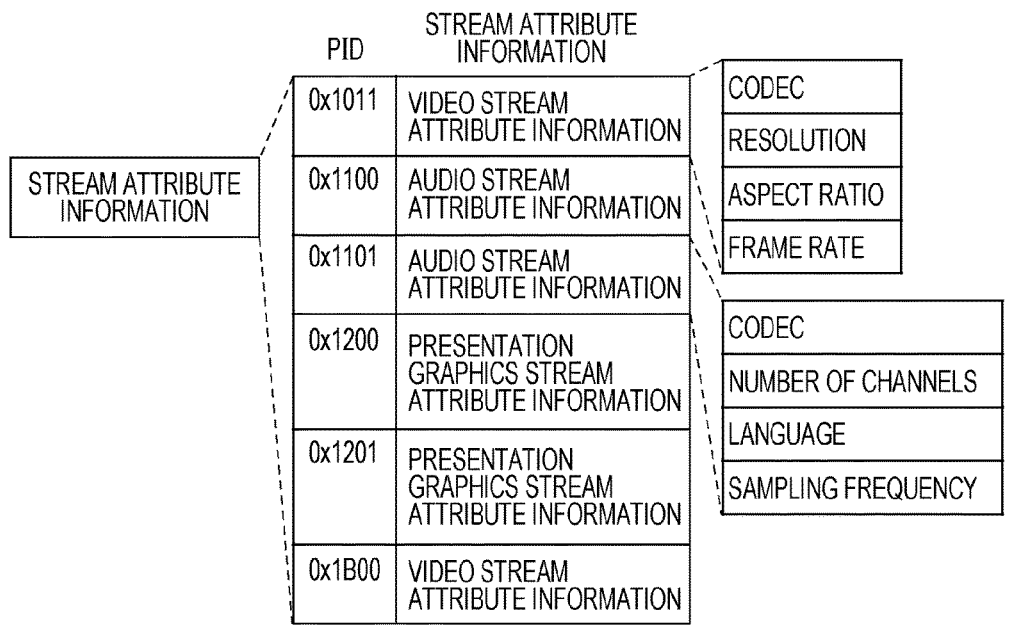
FIG. 44 is a diagram illustrating an internal structure of stream attribute information.

For each PID, attribute information of a corresponding stream included in the multiplexed data is registered in the stream attribute information as illustrated in FIG. 44. The attribute information has different pieces of information for the video stream, the audio stream, the presentation graphics stream, and the interactive graphics stream. Video stream attribute information includes pieces of information such as those regarding a compression codec used to compress the video stream, a resolution of individual picture data of the video stream, an aspect ratio, and a frame rate. Audio stream attribute information includes pieces of information such as those regarding a compression codec used to compress the audio stream, the number of channels included in the audio stream, a supported language, and a sampling frequency. These pieces of information are used in initialization of the decoder before a player performs reproduction, for example.

In the present exemplary embodiment, the stream type contained in the PMT is used among the multiplexed data. Also, in the case where the multiplexed data is recorded on a recording medium, the video stream attribute information contained in the multiplexed data information is used. Specifically, the video coding method or apparatus described in each of the above exemplary embodiments includes a step or unit for setting unique information which indicates whether or not this video data has been generated by the video coding method or apparatus described in each of the above exemplary embodiments, in the stream type contained in the PMT or the video stream attribute information. With this configuration, video data generated using the video coding method or apparatus described in each of the above exemplary embodiments and video data based on another standard can be distinguished from each other.

Figure 45:
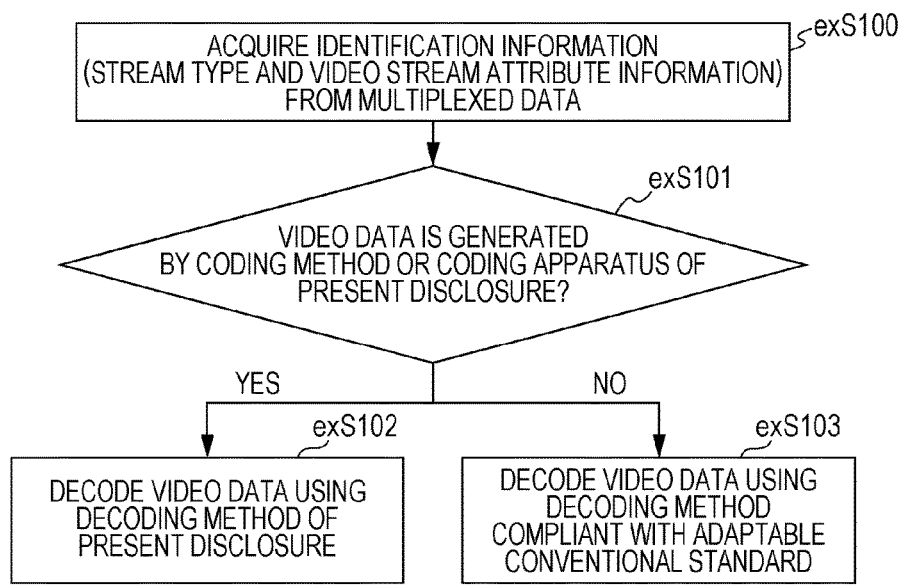
FIG. 45 is a diagram illustrating steps for identifying video data.

FIG. 45 illustrates steps included in a video decoding method in accordance with the present exemplary embodiment. In step exS100, the stream type contained in the PMT or the video stream attribute information contained in the multiplexed data information is obtained from the multiplexed data. Then, in step exS101, it is determined whether or not the stream type or the video stream attribute information indicates that this multiplexed data is data that has been generated using the video coding method or apparatus described in each of the above exemplary embodiments. If it is determined from the stream type or the video stream attribute information that this multiplexed data has been generated using the video coding method or apparatus described in each of the above exemplary embodiments, decoding is performed using the video decoding method described in each of the above exemplary embodiments in step exS102. If the stream type or the video stream attribute information indicates that the multiplexed data is based on an existing standard, such as MPEG-2, MPEG-4 AVC, or VC-1, decoding is performed using a video decoding method based on the existing standard in step exS103.

By setting a new unique value in the steam type or the video stream attribute information in this way, it can be determined whether or not decoding can be performed using the video decoding method or apparatus described in each of the above exemplary embodiments at the time of decoding. Accordingly, even in the case where multiplexed data based on a different standard is input, an appropriate decoding method or apparatus can be selected, and thus decoding can be performed without causing an error. Also, the video coding method or apparatus or the video decoding method or apparatus described in the present exemplary embodiment is applicable to any of the aforementioned devices and systems.

Fifth Exemplary Embodiment

Figure 46:
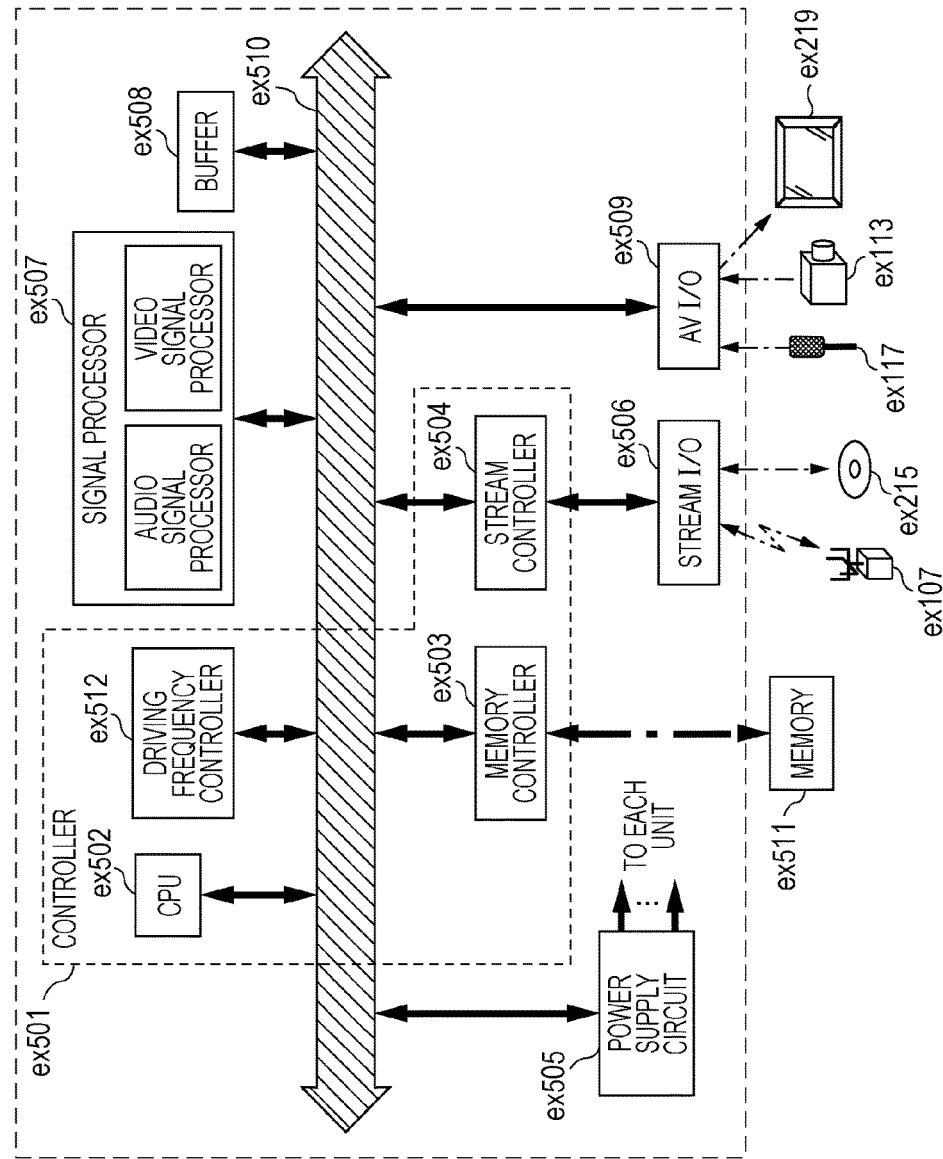
FIG. 46 is a block diagram illustrating an example of a configuration of an integrated circuit that implements a video coding method and a video decoding method according to each of the exemplary embodiments.

The video coding method and apparatus and the video decoding method and apparatus described in each of the above exemplary embodiments are typically implemented using an LSI which is an integrated circuit. FIG. 46 illustrates an example of a configuration of LSI ex500 which is formed as one chip. LSI ex500 includes controller ex501, CPU ex502, memory controller ex503, stream controller ex504, power supply circuit ex505, stream input/output (I/O) ex506, signal processor ex507, buffer ex508, and audio/video (AV) I/O ex509, which are connected to one another via bus ex510. Upon power-on, power supply circuit ex505 supplies electric power to the individual units to activate the individual units into an operable state.

For example, in the case of performing coding processing, LSI ex500 receives an AV signal from microphone ex117, camera ex113, or the like via AV I/O ex509 in accordance with control performed by controller ex501 which includes CPU ex502, memory controller ex503, stream controller ex504, and driving frequency controller ex512. The input AV signal is temporarily stored in external memory ex511, such as an SDRAM (Synchronous Dynamic Random Access Memory). In accordance with control performed by controller ex501, the stored data is divided into a plurality of portions in accordance with an amount of processing or a processing speed, and the plurality of portions are sent to signal processor ex507. Then, signal processor ex507 codes the audio signal and/or the video signal. The coding processing performed on the video signal here is the coding processing described in each of the above exemplary embodiments. Signal processor ex507 performs processing such as multiplexing of the coded audio data and the coded video data depending on circumstances, and outputs the multiplexed data to outside via stream I/O ex506. This output multiplexed data is transmitted to base station ex107 or written to recording medium ex215. Note that the audio data and the video data may be temporarily stored in buffer ex508 at the time of multiplexing so that these pieces of data are synchronized with each other.

Note that although memory ex511 has been described as a device provided outside LSI ex500 above, memory ex511 may be included in LSI ex500. The number of buffers ex508 is not limited to one and LSI ex500 may include a plurality of buffers. Also, LSI ex500 may be formed as a single chip or a plurality of chips.

Although controller ex501 includes CPU ex502, memory controller ex503, stream controller ex504, and driving frequency controller ex512 above, the configuration of controller ex501 is not limited to this one. For example, signal processor ex507 may further include a CPU. By providing a CPU within signal processor ex507, the processing speed can be further improved. Alternatively, CPU ex502 may include signal processor ex507 or, for example, an audio signal processor which is part of signal processor ex507. In such a case, controller ex501 includes CPU ex502 which includes signal processor ex507 or part of signal processor ex507.

Note that the term "LSI" is used here; however, the configuration may be referred to as an IC, a system LSI, a super LSI, or an ultra LSI depending on the degree of integration.

Also, the circuit integration technique is not limited to LSI, and circuit integration may be implemented using a dedicated circuit or general-purpose processor. An FPGA (Field Programmable Gate Array) that is programmable after manufacturing of an LSI or a reconfigurable processor in which connections and settings of circuit cells within the LSI are reconfigurable may be used. Such a programmable logic device can execute the video coding method or the video decoding method described in each of the above exemplary embodiments typically by loading or reading from a memory or the like a program constituting software or firmware.

Furthermore, if an advance in the semiconductor technology or another related technology yields a circuit integration technology that may substitute for LSI, the functional blocks may be integrated using such a technology obviously. Adaptation of the biotechnology may be possible.

Sixth Exemplary Embodiment

It is considered that an amount of processing increases in the case of decoding video data generated using the video coding method or apparatus described in each of the above exemplary embodiments, compared with the case of decoding video data based on an existing standard, such as MPEG-2, MPEG-4 AVC, or VC-1. Accordingly, in LSI ex500, a higher driving frequency needs to be set in CPU ex502 than that used when video data based on an existing standard is decoded. However, making the driving frequency higher undesirably increases power consumption.

Figure 47:
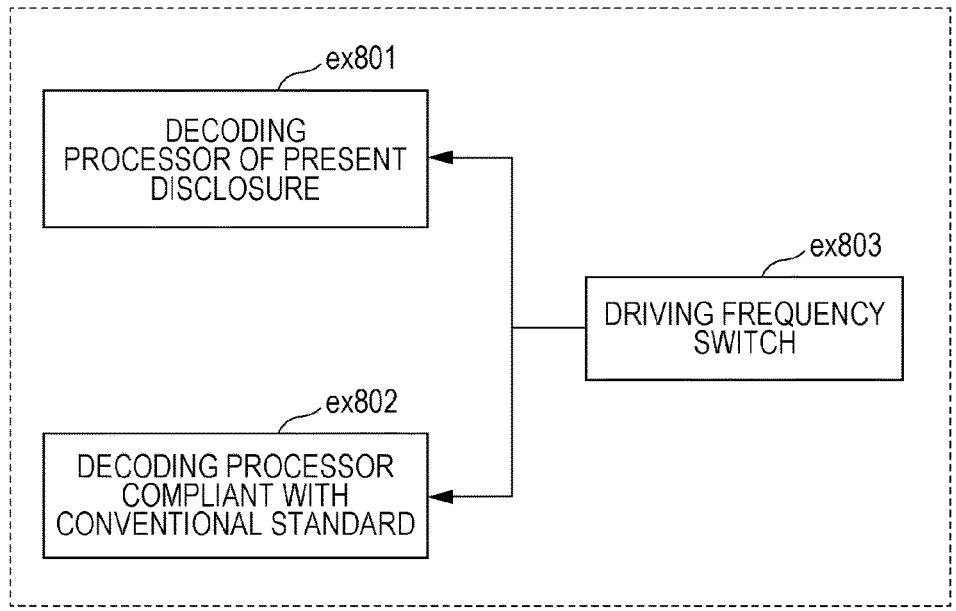
FIG. 47 is a diagram illustrating a configuration for switching between driving frequencies.

To address this issue, the video decoding apparatus, such as television ex300 or LSI ex500, is configured to identify a standard which video data is based on, and to switch between the driving frequencies in accordance with the standard. FIG. 47 illustrates configuration ex800 in accordance with the present exemplary embodiment. Driving frequency switch ex803 sets the driving frequency high in the case where video data is data that has been generated using the video coding method or apparatus described in each of the above exemplary embodiments. Driving frequency switch ex803 also instructs decoding processor ex801 which executes the video decoding method described in each of the above exemplary embodiments to decode the video data. On the other hand, in the case where the video data is data based on an existing standard, driving frequency switch ex803 sets the driving frequency lower than that of the case where the video data is data that has been generated using the video coding method or apparatus described in each of the above exemplary embodiments. Then, driving frequency switch ex803 instructs decoding processor ex802 compliant with the existing standard to decode the video data.

More specifically, driving frequency switch ex803 includes CPU ex502 and driving frequency controller ex512 illustrated in FIG. 46. Decoding processor ex801 that executes the video decoding method described in each of the above exemplary embodiments and decoding processor ex802 compliant with an existing standard correspond to signal processor ex507 illustrated in FIG. 46. CPU ex502 identifies a standard which video data is based on. Then, based on a signal from CPU ex502, driving frequency controller ex512 sets the driving frequency. Also, based on a signal from CPU ex502, signal processor ex507 decodes the video data. Here, the use of the identification information described in the fourth exemplary embodiment, for example, in identification of the video data is conceivable. The identification information is not limited to the one described in the fourth exemplary embodiment and may be any type of information with which a standard which the video data is based on is identifiable. For example, in the case where a standard which video data is based on is identifiable on the basis of an external signal that identifies whether the video data is used for the television or for a disc, the identification can be made on the basis of such an external signal. It is also conceivable to select the driving frequency of CPU ex502 in accordance with a lookup table in which the standard for the video data and the driving frequency are associated with each other as illustrated in FIG. 49, for example. The lookup table is stored in buffer ex508 or an internal memory of LSI ex500, and CPU ex502 refers to this lookup table. In this way, the driving frequency can be selected.

Figure 48:
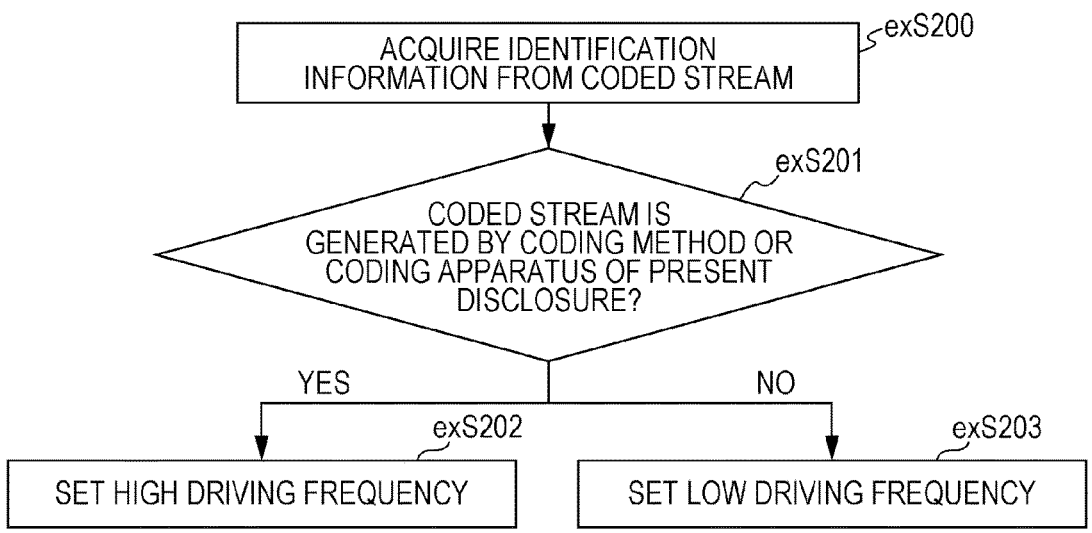
FIG. 48 is a diagram illustrating steps for identifying video data and switching between driving frequencies.

FIG. 48 illustrates steps for performing the method according to the present exemplary embodiment. First, in step exS200, signal processor ex507 obtains identification information from multiplexed data. Then, in step exS201, based on the identification information, CPU ex502 identifies whether or not video data is video data that has been generated using the video coding method or apparatus described in each of the above exemplary embodiments. If the video data is video data that has been generated using the video coding method or apparatus described in each of the above exemplary embodiments, CPU ex502 sends a signal for setting a high driving frequency to driving frequency controller ex512 in step exS202. Then, driving frequency controller ex512 sets a high driving frequency. On the other hand, if the identification information indicates that the video data is video data based on an existing standard, such as MPEG-2, MPEG-4 AVC, or VC-1, CPU ex502 sends a signal for setting a low driving frequency to driving frequency controller ex512 in step exS203. Then, driving frequency controller ex512 sets a lower driving frequency than that used when the video data is video data that has been generated using the video coding method or apparatus described in each of the above exemplary embodiments.

Further, by changing a voltage supplied to LSI ex500 or an apparatus including LSI ex500 in conjunction with switching of the driving frequency, the power-saving effect can be further increased. For example, it is conceivable that in the case where a low driving frequency is set, a voltage supplied to LSI ex500 or an apparatus including LSI ex500 is set to be lower in response to this setting than that of the case where a high driving frequency is set.

It is sufficient that the driving frequency is set to be higher in the case where an amount of decoding processing is large and set to be lower in the case where an amount of decoding processing is small. Accordingly, the driving frequency setting method is not limited to the above-described setting method. For example, in the case where an amount of processing for decoding video data based on the MPEG-4 AVC standard is larger than an amount of processing for decoding video data generated using the video coding method or apparatus described in each of the above exemplary embodiments, settings of the driving frequency can be made opposite to the settings of the above-described case.

Further, the driving frequency setting method is not limited to a configuration for setting the driving frequency low. For example, in the case where the identification information indicates that the video data is video data that has been generated using the video coding method or apparatus described in each of the above exemplary embodiments, a voltage supplied to LSI ex500 or an apparatus including LSI ex500 may be set to be high. In the case where the identification information indicates that the video data is video data based on an existing standard, such as MPEG-2, MPEG-4 AVC, or VC-1, a voltage supplied to LSI ex500 or an apparatus including LSI ex500 may be set to be low. Alternatively, in another example, in the case where the identification information indicates that the video data is video data that has been generated using the video coding method or apparatus described in each of the above exemplary embodiments, driving of CPU ex502 is not stopped. In the case where the identification information indicates that the video data is video data based on an existing standard, such as MPEG-2, MPEG-4 AVC, or VC-1, driving of CPU ex502 may be temporarily stopped because there is a surplus of capacity relative to the processing load. When there is a surplus of capacity relative to the processing load in the case where the identification information indicates that the video data is video data that has been generated using the video coding method or apparatus described in each of the above exemplary embodiments, driving of CPU ex502 may be temporarily stopped. In this case, a period over which CPU ex502 is stopped may be set to be shorter than that of the case where the identification information indicates that the video data is video data based on an existing standard, such as MPEG-2, MPEG-4 AVC, or VC-1.

By switching between the driving frequencies in accordance with the standard which the video data is based on in this manner, electric power can be saved. Also, in the case where LSI ex500 or an apparatus including LSI ex500 is driven with a battery, the battery can be made last longer as a result of power-saving.

Seventh Exemplary Embodiment

A plurality of pieces of video data based on different standards are sometimes input to the aforementioned devices and systems, such as television ex300 and mobile phone ex114. In order to enable decoding even in the case where a plurality of pieces of video data based on different standards are input, signal processor ex507 of LSI ex500 needs to support the plurality of standards. However, the use of signal processors ex507 for the respective standards undesirably makes the circuit scale of LSI ex500 larger and increases the cost.

Figure 50A:
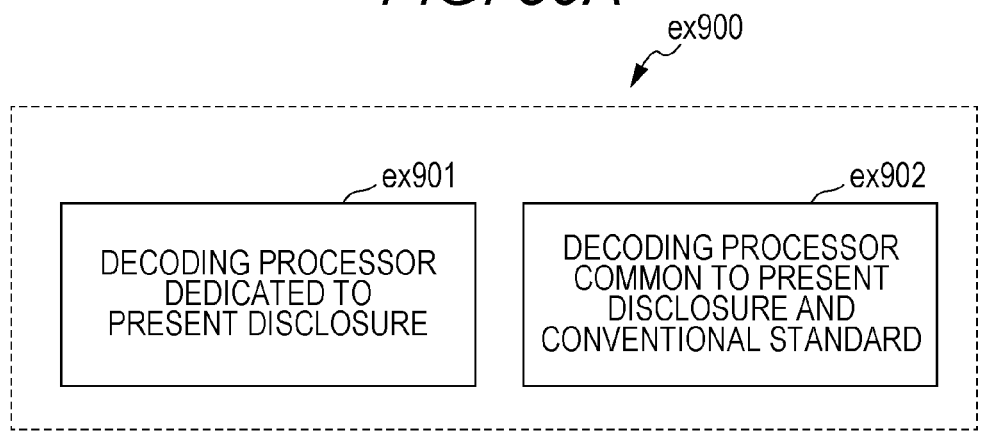
FIG. 50A is a diagram illustrating an example of a configuration that enables sharing of modules among signal processors.

To address this issue, a decoding processor that executes the video decoding method described in each of the above embodiments and a decoding processor compliant with an existing standard, such as MPEG-2, MPEG-4 AVC, or VC-1, share some of their components. FIG. 50A illustrates an example of this configuration ex900. For example, the video decoding method described in each of the above exemplary embodiments and the video decoding method compliant with the MPEG-4 AVC standard share some of contents of processing, such as entropy decoding, inverse quantization, deblocking filtering, and motion compensation. Accordingly, the following configuration is conceivable. For the shared processing contents, decoding processor ex902 compliant with the MPEG-4 AVC standard in used in common. For other processing contents that are not compliant with the MPEG-4 AVC standard and are unique to an aspect of the present disclosure, dedicated decoding processor ex901 may be used. In particular, an aspect of the present disclosure includes a feature in switching of the processing scheme. Thus, for example, dedicated decoding processor ex901 may be used for switching of the processing scheme and decoding processor ex902 may be used in common for any of or all of entropy decoding, inverse quantization, deblocking filtering and motion compensation. Alternatively, as for sharing of the decoding processor, a configuration may be used in which a decoding processor that executes the video decoding method described in each of the above embodiments is used for the common processing contents and a dedicated decoding processor is used for processing contents unique to the MPEG-4 AVC standard.

Figure 50B:
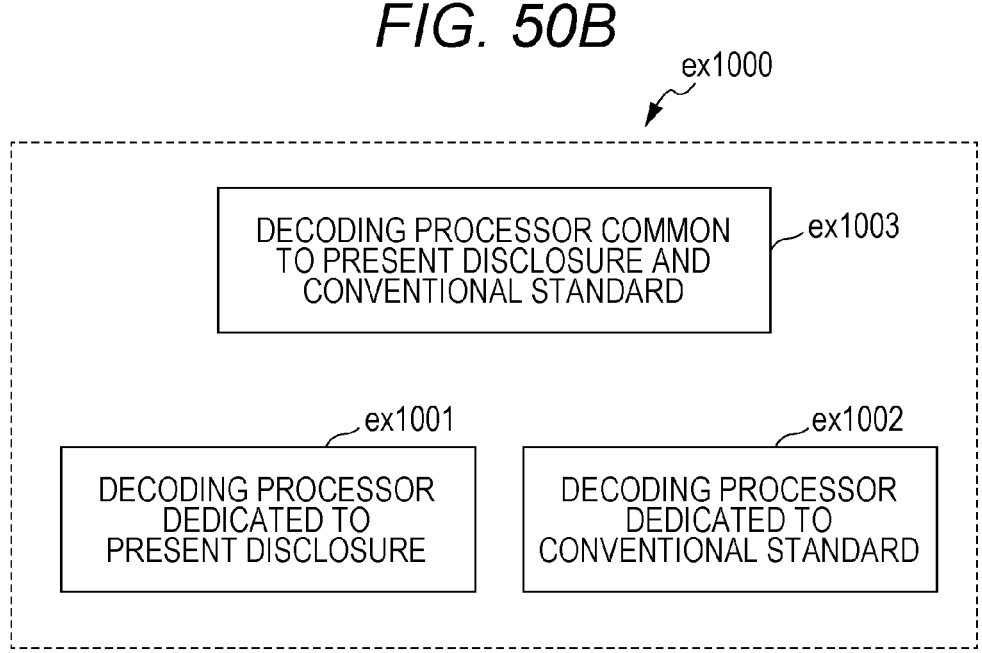
FIG. 50B is a diagram illustrating another example of a configuration that enables sharing of modules among signal processors.

FIG. 50B illustrates another example ex1000 that implements sharing of part of processing. In this example, dedicated decoding processor ex1001 that handles processing contents unique to an aspect of the present disclosure, dedicated decoding processor ex1002 that handles processing contents unique to an existing standard, and shared decoding processor ex1003 that handles processing contents that are common to the video decoding method according to the aspect of the present disclosure and the video decoding method according to the existing standard are used. Here, dedicated decoding processors ex1001 and ex1002 are not necessarily specialized for the processing contents unique to the aspect of the present disclosure and the existing standard, respectively, and may be also capable of executing other general processing. Also, the configuration according to the present exemplary embodiment can be implemented using LSI ex500.

By sharing a decoding processor for processing contents that are common to the video decoding method according to an aspect of the present disclosure and the video decoding method according to an existing standard, the circuit scale and cost of LSI ex500 can be reduced.

The present disclosure can be applied to an image processing device, an imaging device, and an image playback device. Specifically, the present disclosure can be applied to a digital still camera, a camcorder, a camera-equipped mobile phone, a smartphone, and the like.

What is claimed is:

1. A computer-implemented coding method, comprising:
    extracting a background image from a target frame included in a moving image;
    extracting, from the target frame, a plurality of kinds of pieces of metadata indicating a feature of at least one object included in the target frame;
    disposing hierarchically the plurality of kinds of pieces of metadata with respect to each kind; and
    generating coded information including background image information specifying the background image and meta-information, which is information about an estimation technique for estimating at least a part of all the pieces of metadata corresponding to a selected hierarchy.

2. The computer-implemented decoding method according to claim 1,
    wherein, in deriving the at least one kind of metadata, whether a correction parameter exists in the coded information is determined, and the metadata is derived by correcting the estimated metadata obtained by estimating the metadata based on the correction parameter when it is determined that the correction parameter exists in the coded information.

3. The computer-implemented decoding method according to claim 1,
    wherein, in estimating the metadata, a coordinate of the metadata is estimated by performing interpolation or extrapolation on a coordinate of the identical object in at least a reference frame included in the coded moving image.

4. The computer-implemented decoding method according to claim 3,
wherein, in estimating the metadata, motion model information indicating changes in spatial position and size of the object in the coded moving image is extracted from the coded information, and
the coordinate of the metadata and the size of another kind of metadata in the at least one kind of metadata are estimated based on the interpolation or extrapolation and the motion model information.

5. A computer-implemented decoding method, comprising:
specifying a background image of a target frame from background image information included in coded information corresponding to a frame in a coded moving image;
deriving at least one kind of metadata from meta-information included in the coded information, the metadata indicating a feature of one object included in the target frame and being hierarchically disposed with respect to each kind; and
generating decoded image by superimposing the one object represented by the at least one kind of metadata on the specified background image;
wherein the metadata indicates the feature of the object with respect to at least the one object included in the target frame, and
in deriving the at least one kind of metadata, the metadata is derived by estimating the metadata using information about an estimation technique, the information being included as the meta-information.

6. The computer-implemented decoding method according to claim 5,
wherein the decoded image is generated by superimposing the object having a different abstraction level in each hierarchy of the metadata on the background image.

7. The computer-implemented decoding method according to claim 5,
wherein the meta-information further includes a total number of objects included in the target frame.

8. The computer-implemented decoding method according to claim 5,
wherein the kind belonging to a first hierarchy in the coded information is a coordinate of the object in the target frame.

9. The computer-implemented decoding method according to claim 8,
wherein the kind belonging to a second hierarchy in the coded information is a size of the object in the target frame.

10. The computer-implemented decoding method according to claim 9,
wherein the kind belonging to a third hierarchy in the coded information is a classification name of a subject that is projected as the object in the target frame.

11. The computer-implemented decoding method according to claim 10, further comprising:
determining whether a difference image exists in the coded information,
wherein, in generating the decoded image, a reconstructed image is generated by superimposing the at least one object on the background image, and the decoded image is generated by adding the difference image to the reconstructed image.

12. The computer-implemented decoding method according to claim 11,
wherein, in generating the reconstructed image, the coordinate of the object is specified using the metadata belonging to the first hierarchy,
the size of the object is specified using the metadata belonging to the second hierarchy,
an associated image associated with the classification name of the subject is specified using the metadata belonging to the third hierarchy,
the background image is specified using the background image information, and
the reconstructed image is generated by superimposing the specified associated image having the specified size on the specified coordinate in the specified background image.

13. The computer-implemented decoding method according to claim 12,
wherein, in generating the reconstructed image, the associated image is acquired from a server through a network.

14. A decoding device comprising:
a processor; and
a memory having a program stored thereon, the program causing the processor to execute operations including
specifying a background image of a target frame from background image information included in coded information corresponding to a frame in a coded moving image;
deriving at least one kind of metadata from meta-information included in the coded information, the metadata indicating a feature of one object included in the target frame and being hierarchically disposed with respect to each kind; and
generating decoded image by superimposing the one object represented by the at least one kind of metadata on the specified background image;
wherein the metadata indicates the feature of the object with respect to at least the one object included in the target frame, and
in deriving the at least one kind of metadata, the metadata is derived by estimating the metadata using information about an estimation technique, the information being included as the meta-information.

* * * * *